(12) United States Patent
Westphal

(10) Patent No.: US 7,254,304 B2
(45) Date of Patent: Aug. 7, 2007

(54) DEVICES AND TECHNIQUES FOR LOGICAL PROCESSING

(76) Inventor: Jonathan Westphal, 7620 Valley Vista Rd., Pocatello, ID (US) 83201

( * ) Notice: Subject to any disclaimer, the term of this patent is extended or adjusted under 35 U.S.C. 154(b) by 531 days.

(21) Appl. No.: 10/398,312

(22) PCT Filed: Oct. 5, 2001

(86) PCT No.: PCT/US01/31217

§ 371 (c)(1),
(2), (4) Date: Sep. 9, 2003

(87) PCT Pub. No.: WO02/29520

PCT Pub. Date: Apr. 11, 2002

(65) Prior Publication Data

US 2004/0075885 A1    Apr. 22, 2004

Related U.S. Application Data

(60) Provisional application No. 60/238,007, filed on Oct. 6, 2000.

(51) Int. Cl.
*G02F 3/00*       (2006.01)
(52) U.S. Cl. ........................ 385/122; 359/108
(58) Field of Classification Search ........ 385/122; 706/40; 701/117; 382/276; 359/108
See application file for complete search history.

(56) References Cited

U.S. PATENT DOCUMENTS

| | | | |
|---|---|---|---|
| 5,131,055 A | 7/1992 | Chao | 382/32 |
| 5,220,642 A * | 6/1993 | Takahashi et al. | 706/40 |
| 5,414,789 A | 5/1995 | Tamil et al. | 385/122 |
| 5,448,484 A * | 9/1995 | Bullock et al. | 701/117 |
| 5,544,280 A | 8/1996 | Liu et al. | 395/24 |
| 6,272,261 B1 * | 8/2001 | Matsuoka | 382/276 |
| 6,424,773 B1 * | 7/2002 | Watanabe | 385/122 |

OTHER PUBLICATIONS

Kunihuro Ichimura, "Photochromic Polymers", John C. Crano and Robert J. Gugilelmetti,, eds., *Organic Photochromic and Thermochromic Compounds*, vol. 2, Kluwer, New York, 1999, pp. 9-63.

* cited by examiner

*Primary Examiner*—Mark Hellner
(74) *Attorney, Agent, or Firm*—Allen, Dyer, Doppelt Milbrath & Gilchrist, P.A.

(57) ABSTRACT

The invention is directed to apparatus, methods, systems and computer programs which permit a simplification or reduction of the description of a complex digital circuit. This is accomplished by using a completely new system of propositional logic (13B), representing the logic of a logical circuit to be designed as points and vectors in a vector space, simplifying the logic so represented to a simpler form using vector transformations, and designing the circuit using the simpler form. The invention is also directed to apparatus, methods, systems and devices which will implement the vector logic system in optical forms, including free-space optical methods, flat-optical methods, colorimetric methods, and methods using a polarization-based AND-gate.

1 Claim, 63 Drawing Sheets

A Space for Propositions

The Propositions p and q v q

Two-Letter Alternational Clauses

The ANS-plane

Modus Ponens in the CNS-plane

Modus Tollens in the CNS-plane

The Disjunctive Syllogism in the CNS-plane

Harmony of ANS-and CNS-planes pp +, pq v pq

2D Representation of the 3D ANS-Space

The CNS-space with Three Variables:
the Hypothetical Syllogism

|  | p | q | r |  |  |
|---|---|---|---|---|---|
| Premise 1 | -1 | 1 | 0 | + | p̄vq |
| Premise 2 | 0 | -1 | 0 |  | q̄vr |
| Conclusion = | -1 | 0 | 1 |  | p̄vr |

Hypothetical Syllogism in a 3D CNS-Space $pq \lor p\bar{q} \longleftrightarrow p$ A Four-Clause Schema Simplified
pqr v pqr̄ v p̄qr v p̄q̄r̄. ←→ .qr v p̄r̄ pqr v pq̄r v p̄qr v p̄q̄r. ↔ .qr v pr

| | | |
|---|---|---|
| 1. | pqr | T |
| 2. | pqr̄ | T |
| 3. | pq̄r | T |
| 4. | pq̄r̄ | T |
| 5. | p̄qr | |
| 6. | p̄qr̄ | |
| 7. | p̄q̄r | |
| 8. | p̄q̄r̄ | |

Four-Variable V-diagram with Simplification of
p̄qrs̄ v pqr̄s̄ v pq̄rs̄ v p̄qr̄s̄ v pq̄r̄s̄ v p̄q̄r̄s̄ ∴ p̄rs v q̄s̄

Fix Rule d = 2
pqr v pqr̄ v pq̄r v p̄qr v p̄qr v p̄q̄r v p̄q̄r̄ ⋯ p v q v r

```
p    q    r
1    1   -1    +
1   -1   -1
───────────
1    0    0
```

Fix Rule d = 3
pqrs ∨ pqr̄s̄ ∨ pq̄r̄s ∨ pq̄rs̄ ∨ p̄qrs ∨ p̄qr̄s̄ ∨ p̄q̄r̄s ∨ p̄q̄rs̄. p Undeveloped pq v p̄q̄r v p̄q̄r̄. . pq v pr v p̄q̄r̄

Simplification of Developed p̄q ∨ pq̄ ∨ q̄r ∨ qr̄:
p̄qr ∨ p̄q̄r ∨ p̄qr̄ ∨ pqr̄ ∨ pq̄r̄ ∨ pq̄r.∙∙. pq̄ ∨ p̄r ∨ pr̄

Simplification of Undeveloped p̄q ∨ q̄r ∨ pq̄ ∨ qr̄

Simplification of pqr v p̄r̄ v pqs̄ v p̄r v p̄q̄r̄s̄

Equivalence of pqr and pq in pqr v p̄r

Consensus Theorem

Consensus Theorem:
the Dual of qp v p̄r v qr is (q v p)(p̄ v r)(q v r)

: Superfluity of pqs̄ in pqr v pr̄ v pqs̄

Target Circuit: $ABC + A\bar{C} + AB\bar{D} + \bar{A}C + \bar{A}\bar{B}\bar{C}\bar{D}$
G=5, I=12, R=7

A Simplest Circuit Equivalent to the Target Circuit
$(ABC + A\bar{C} + AB\bar{D} + \bar{A}C + \bar{A}\bar{B}\bar{C}\bar{D}) =$
$(AB + A\bar{C} + \bar{A}C + \bar{A}B\bar{D})$
G=4, I=9, R=2

Optical Computation of modus ponens
———▶ Implication
— — —▶ Half-implication

Interferometric Processing for modus ponens p and pq nodes in (p,q) space

Displacement of O to p̄ v q; p is q

Colorimetric Computation of modus ponens

Colorimetric Simplification of pq v p$\bar{q}$

| pq | (p v q) | (p v -q) | (-p v q) | ↔ | p & q | |
|----|---------|----------|----------|---|-------|---|
| TT | T | T | T | | T | 1 |
| TF | T | T | F | | F | 2 |
| FT | T | F | T | | F | 3 |
| FF | F | T | T | | F | 4 |

Figure 64

DEVICES AND TECHNIQUES FOR LOGICAL PROCESSING

CROSS REFERENCE TO RELATED APPLICATIONS

This application claims priority from and is related to U.S. provisional application Ser. No. 60/238,007, filed Oct. 6, 2000, entitled: OPTICAL AND GATE AND SWITCHING DEVICE USING POLARIZATION PHOTOCHROMISM. The contents of that provisional are hereby incorporated by reference in their entirety.

BACKGROUND OF THE INVENTION

1. Field of the Invention

This invention relates to the field of logical processing and, more particularly to devices and techniques for implementing and for simplifying digital logic.

The invention relates to the field of logical processing, to devices and techniques for simplifying two- and multi-level digital logic, using the proposed vector form of the digital logic, and to devices and techniques for implementing the said vector logic in the form of optical processors, circuits composed of optical logic gates or switches, including therefore both optical multiplexers and optical demultiplexers, as well as integrated optical circuits.

2. Description of Related Art

Logic can be described as techniques and operations by which one moves from what one knows to be true to new truths. The principles of logic have been applied in the design and operation of digital logic circuits. Modern-day computers and other processing devices have utilized digital logic extensively. Many of the problems to which digital logic can be applied are complex, involving many independent variables. This results in extremely complex logical circuits in which large numbers of operations are performed. The cost associated with manufacturing and fabrication of such complex digital circuits is great. It would be highly desirable to reduce the size of these circuits while preserving the same functionality, and thereby to reduce the manufacturing cost of their fabrication and to improve their performance and speed.

A number of optically active materials are known in the art. Among these are photochromic polymers as described in an article by Kunihuro Ichimura, "Photochromic Polymers", in a text by John C. Crano and Robert J. Gugilelmetti, eds., entitled *Organic Photochromic and Thermochromic Compounds*, Vol. 2, Kluwer, New York, 1999, pp. 9-63, the contents of which are incorporated herein by reference thereto.

Digital computers are of course well known, but more recently optical computers have been developed which can perform logical functions using optical elements. These logical processors can in principle perform logical switching functions as fast as is physically possible, and there is also no expensive optical-electric-optical ("OEO") conversion process required to link them with present-day optical telecommunications systems. To date, however, they have not been feasible largely on account of lack of scalability and the absence of fully scalable AND- and NAND- and other logic gates. The invention disclosed here makes up this lack.

SUMMARY OF THE INVENTION

It is an object of this invention to provide new digital 2-level and multi-level simplification methods using vector logic.

It is another object of this invention to provide plans for all-optical processors and circuits using vector logic.

It is yet another object of this invention to provide plans for optical Multiplexers, Demultiplexers, flip-flops, AND gates and other similar devices The invention is directed to apparatus, methods, systems and computer program products which permit a simplification of the logic required for performing a certain function to a minimum set of logical elements of operations. This permits the complexity of digital circuitry to be reduced and the speed of the computation to be increased correspondingly. It also improves reliability and diminishes material costs.

The logical application is accomplished using a system of propositional logic in which propositions are represented as vectors or displacements in a space. This is applied to the simplification problem, the problem of finding a method for reducing logical schema to a shortest equivalent. Specifically, an exemplary novel feature of the present invention includes placement of an origin within a Boolean cube, and thus making the Boolean cube into a vector space in which vectors can be translated, added and multiplied, rather than a static structure of bit representations in 1s and 0s.

The techniques given here are applied to the simplification or minimization problem, the problem of finding a method for reducing logical schemata to their shortest equivalents, in both two-level and multi-level forms. Applications of the system of vector logic to problems of electronic circuit minimization, to free-space optical processing, to flat-optical processing, to logical processing using color images, and to the design of logic gates, including the AND-gate and NAND-gates, using a polarization implementation of the vector logic are described. The polarization implementation is fully scalable as it requires only four passive elements: beamsplitters, reflectors, polarizers and retarders.

The present invention provides various exemplary methods for implementing the vector principles for propositional logic for optical computation. The first exemplary implementation is flat-optical, wherein a Mach-Zehnder interferometer-like device is used to operate in either SOP or POS-form, which is the basic "cell" in the Karnaugh map sense for an all-optical processor. AND-, XOR-, XNOR- and NAND-gates may be constructed from these cells using the vector optical implementation. A second exemplary implementation includes a system wherein the logic is implemented in sequences of spatial light modifiers. In a third exemplary implementation of the present invention, basic principles of colorimetry are used for a simple colorimetric optical processing system. A fourth exemplary implementation of the present invention includes a Mach-Zehnder "cell" used for a device which does not depend on a bistable 'and' sum sigmoid filter.

In general, in one aspect, the invention features a novel logic system.

In another aspect, the invention features an optical implementation of the novel logic system to produce all types of optical logic circuits.

Additional advantages of the present invention will become apparent to those skilled in the art from the following detailed description of exemplary embodiments of the present invention. The invention itself, together with further objects and advantages, can be better understood by reference to the following detailed description and the accompanying drawings.

BRIEF DESCRIPTION OF THE DRAWINGS

The objects, features and advantages of the system of the present invention will be apparent from the following description in which:

FIG. 64 shows a Conjunctional Normal Form Truth-Table.

DESCRIPTION OF THE PREFERRED EMBODIMENTS

In the following description, for the purposes of explanation, numerous specific details are set forth in order to provide a more thorough understanding of the present invention. It will be apparent, however, to one skilled in the art that the present invention may be practiced without these specific details.

Part I describes a system of propositional logic in which propositions are represented as vectors or displacements in a space. Part II gives the application of the system to the simplification problem, the problem of finding a method for reducing a truth-functional schemata in alternational normal form to a shortest equivalent. Part III is about applications: (i) to problems of electrical circuit minimization; (ii) to free-space optical processing; (iii) to "flat" optical processing; (iv) to logical processing using colorimetry; and (v) to polarization based processing.

Part I

Figure 1:
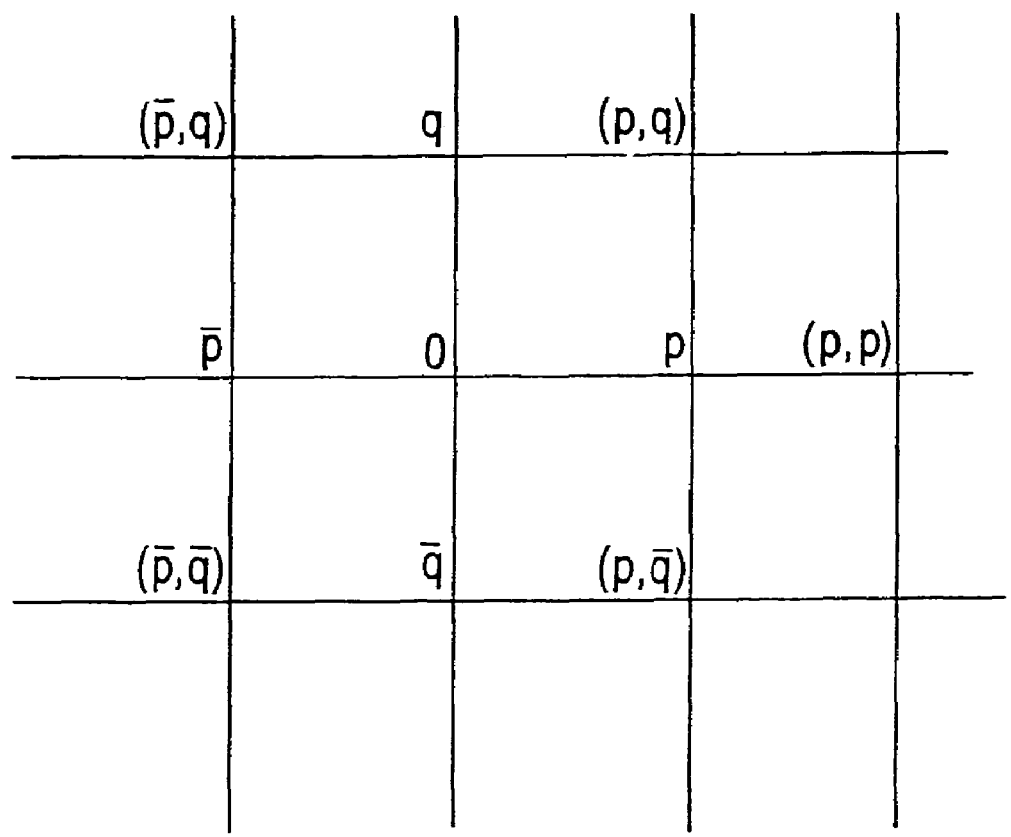
FIG. 1 represents two-dimensional space for propositions.

Imagine a space in which the co-ordinates from the origin 0 are propositional addresses or possibilities, for example as depicted in FIG. 1. Let (1, 0) be the propositional address p, and (0,1) the propositional address q. Then (1, 1) is the point p, q, and we can let the sign "+" be an operation on p and q which is defined by distance and direction from the origin, by which 'p+q+p+q' is an instruction to go two units in a p-ward direction, and two units in a q-ward direction. The operation performed by someone obeying this instruction is commutative and associative.

We can now represent the proposition that p as a directed line-segment or vector along the p- or x-axis from the origin 0 to the point or propositional address p in the space, representing the vector p in boldface as is standardly done to distinguish it from the possibility p which is represented as the point at the arrowhead of p. We can also let the vector q be the proposition q, represented in the space as the vector pointing straight up the q- or y-axis to the point q.

Now if we build up the space interpreting the operation "+" as "v", the x- and y-axes will obviously represent lines of logical equivalence. At (2, 0), or p, p, for example, we will find the arrowhead of p v p, and at (3, 0) the arrowhead of p v p v p. These and the rest of the proposition vectors along the p-axis are logically equivalent to the base vector p. At (0, 2), or q, q, we will find the arrowhead of q v q. Thus p and q will stand in for the usual unit vectors i and j. (The vector space of propositions can however have infinitely many directions such as s, t, u, v . . . , which will become important later on when a technique is given to simplify propositions with large numbers of literals.)

We are also now in a position to represent the proposition p v q in the space as p+q, the vector resultant of the vectors p and q, which travels from the origin to p, q. Then p v q is itself a vector.

Figure 2:
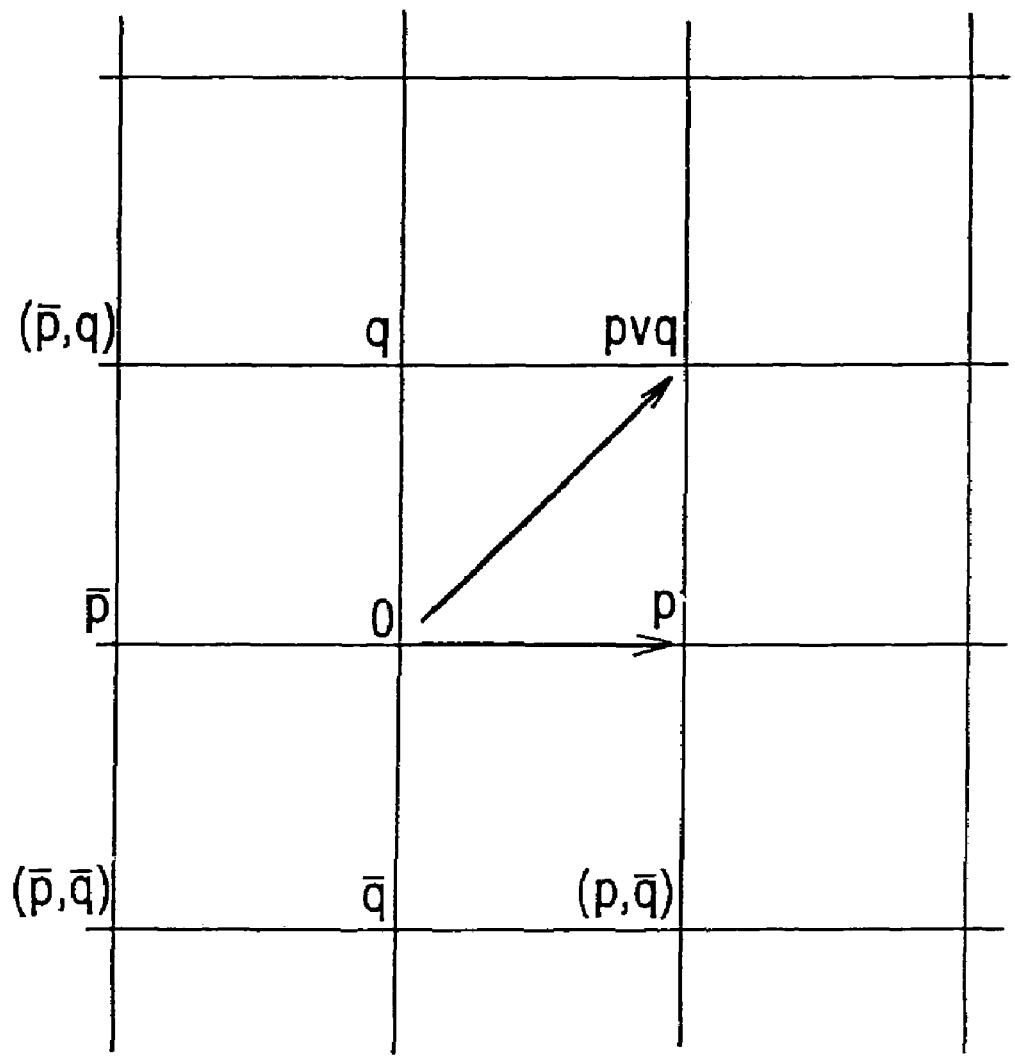
FIG. 2 illustrates the propositions p and p v q. in the space of FIG. 1.

I will call a vector diagram for the propositional calculus such as FIG. 2 a V-Diagram for the proposition or schema. The V-diagram can be further built up by adding the negation symbols for the negative vectors $\bar{p}$ and $\bar{q}$ in the negative or reverse directions along their respective axes. So we arrive at all of the literals, which are single letters and negations of single letters, and we can also find pairs of single negated or unnegated letters, the propositions p v $\bar{q}$, and $\bar{p}$ v $\bar{q}$.

Figure 3:
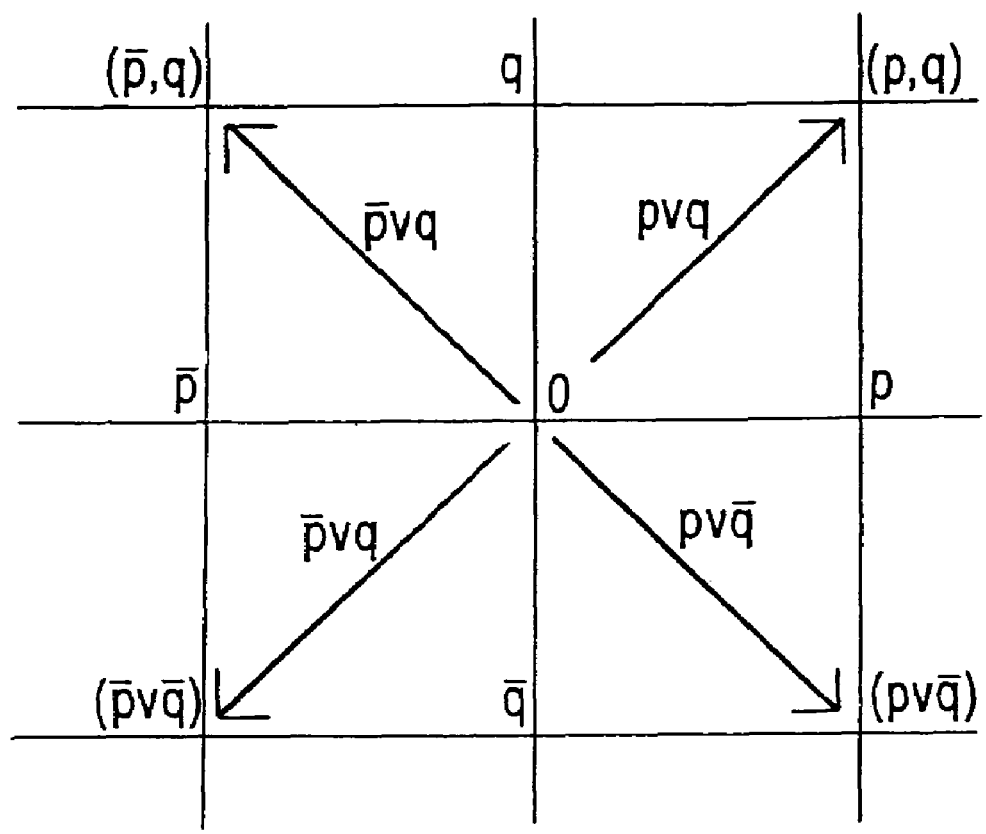
FIG. 3 is a diagram of the vector two-dimensional space showing the conjunctional normal schemata normal schemata or CNS-plane.

Let us call the vector two-space in FIG. 3 the CNS-plane for the plane of the "conjunctional normal schemata".

Figure 4:
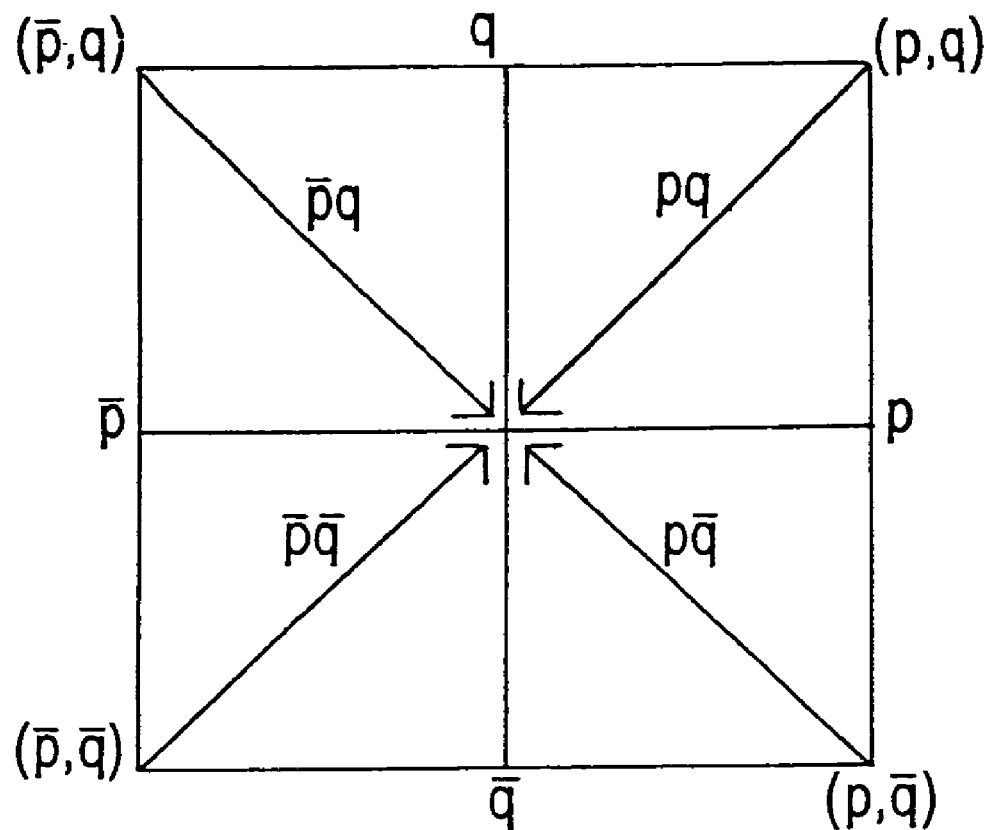
FIG. 4 is a diagram of the vector two-dimensional space showing the alternational normal schemata or the ANS-plane.
Figure 5:
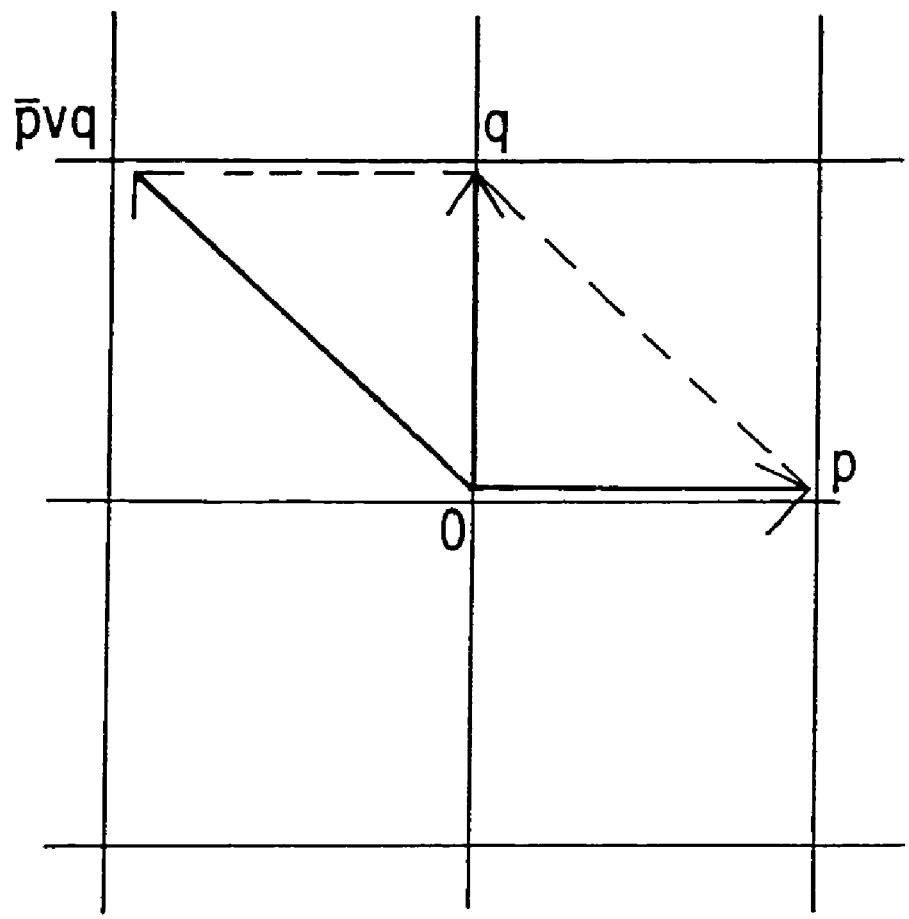
FIG. 5 is a diagram showing modus ponens in the CNS-plane.
Figure 6:
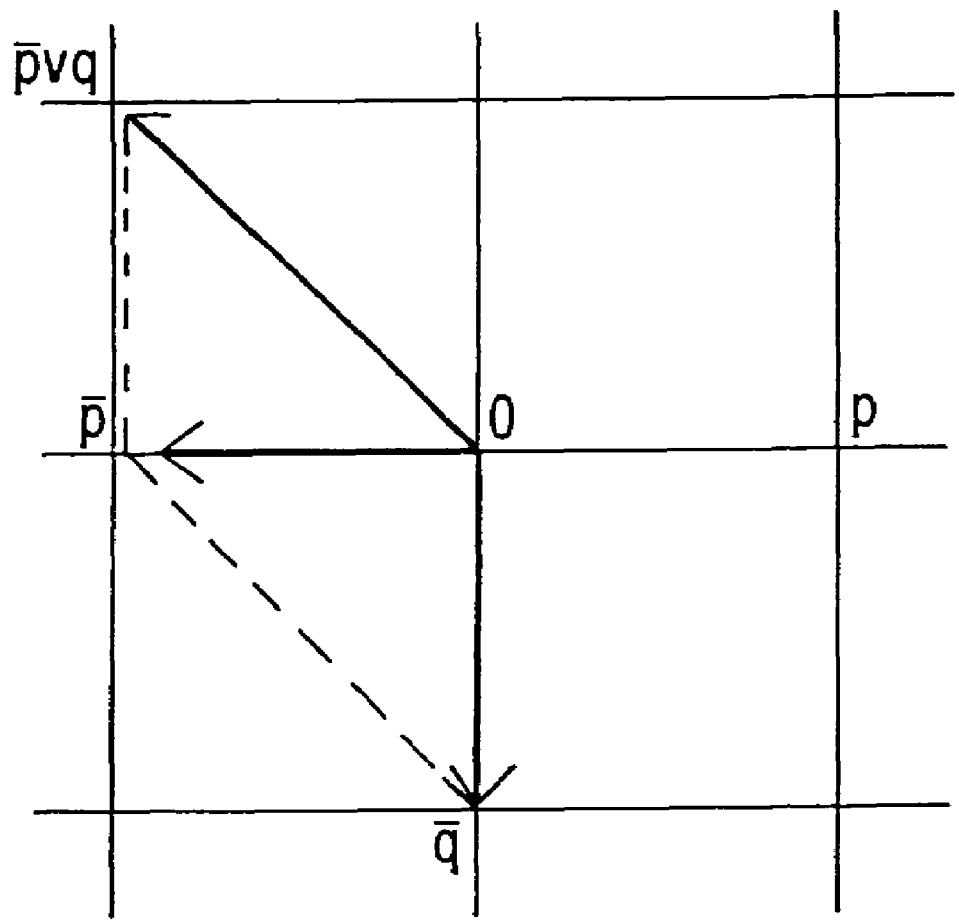
FIG. 6 is a diagram showing modus tollens in the CNS-plane
Figure 7:
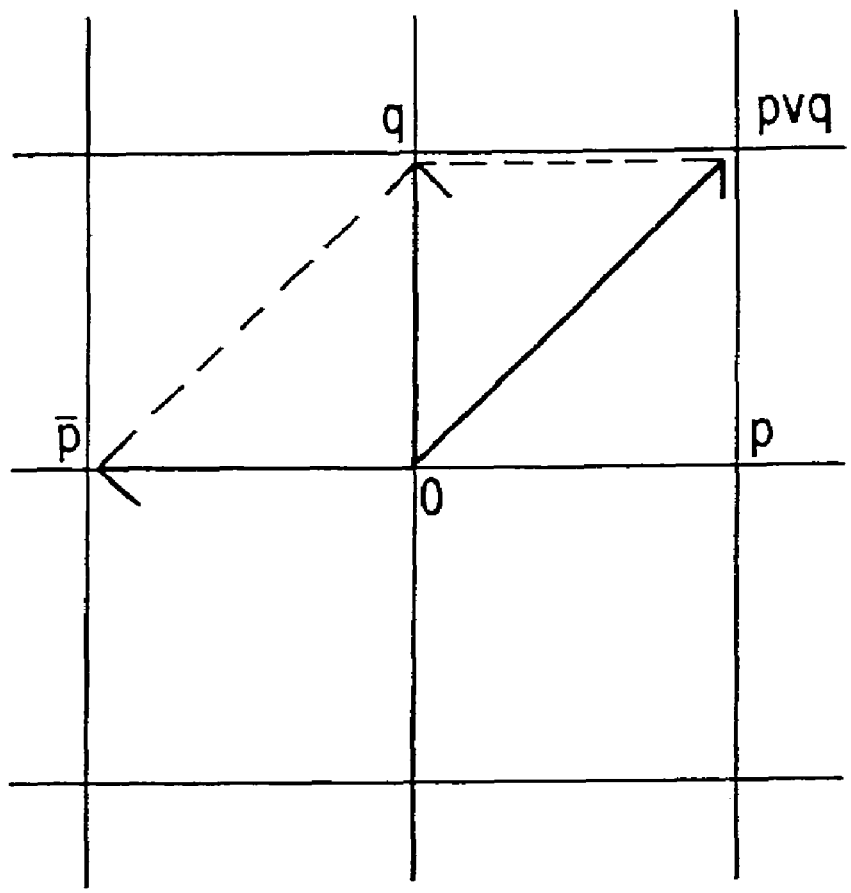
FIG. 7 is a diagram showing the disjunctive syllogism in the CNS-plane.

We are now free to explore another plane, for example as illustrated in FIG. 4, the plane of the alternational normal schemata, or the ANS-plane, in which the points are not alternations but conjunctions, and the vector operation "+" within the space is interpreted as alternation. The ANS-plane and the CNS-plane are duals, so that each point in each plane correspond to its dual in the other plane. This also means that the uniting operation in the CNS-plane is related to the dual of the operation in the ANS-plane, and vice versa. In the CNS-plane "+" is alternation, and so in the ANS-plane it is conjunction. The operation "→" in "α→β" in the CNS-plane is to be read as implication or the assertion of the conditional. In the ANS-plane "→" is to be read as the denial of the negation of implication, which is the denial of the conjunction of the antecedent with the negation of the consequent. The whole ANS-plane is to be read as a systematic set of denials, the denials that the propositions given at the base of the vector arrowheads imply a contradiction. This will be obvious if we remember that arrows ending at the origin rather than those issuing from it, as in the CNS-plane, are assertions in the ANS-plane.

In both of the planes certain familiar truths appear as expressions of the main principle which governs "+" or vector addition, the so-called parallelogram law of Galileo. In the CNS-plane we can think of the premises of an argument as component vectors, and the resultant as the conclusion. Then an elementary valid argument-form in the CNS-plane is a parallelogram starting at the origin 0 in that plane. The conjunction of the alternations yields the conclusion, and we get modus ponens appearing as in Diagram 5. If the vectors are represented as displacements around 0 in the V-diagram, the modus ponens in the CNS-plane is the set of displacements

|  | p | q |  |  |
|---|---|---|---|---|
| Premise 1 | −1 | 1 | + | $\bar{p}$ v q |
| Premise 2 | 1 | 0 |  | p |
| Conclusion = | 0 | 1 |  | q |

Modus tollens, as illustrated in Diagram 6, appears as:

|  | p | q |  |  |
|---|---|---|---|---|
| Premise 1 | −1 | 1 | + | $\bar{p}$ v q |
| Premise 2 | 0 | −1 |  | $\bar{q}$ |
| Conclusion = | −1 | 0 |  | $\bar{p}$ |

The disjunctive syllogism, as illustrated in Diagram 7, appears, with its displacement matrix, as:

|  | p | q |  |  |
|---|---|---|---|---|
| Premise 1 | 1 | 1 | + | p v q |
| Premise 2 | −1 | 0 |  | $\bar{p}$ |
| Conclusion = | 0 | 1 |  | q |

Consider now the relation between the CNS-plane and the ANS-plane. There clearly is one, as they share the literals and the all-important origin 0. The two planes can be brought into harmony if we represent them, arbitrarily, as lying above and below the origin in a space whose third dimension runs along the conjunction-alternation axis, putting alternation at the top and conjunction at the bottom.

Figure 8:
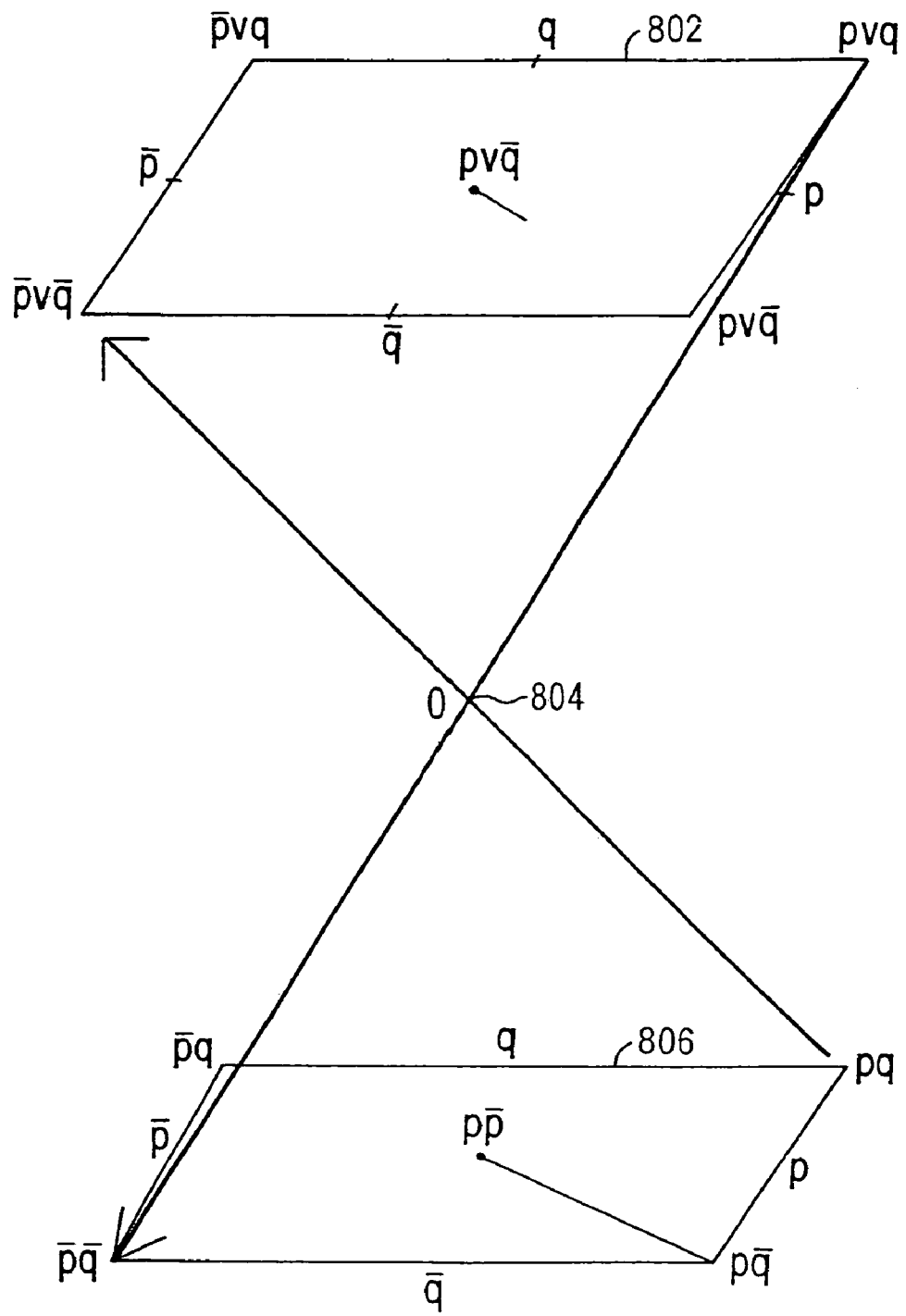
FIG. 8 is the diagram showing how the ANS- and CNS-planes relate.

The result is a space, or the part of it near 0, with two planes above and below the origin. The origin 0 appears in the vertical axis between the two planes. The whole space of FIG. 8 generates further principles of the propositional calculus. Take p v q in the top right hand corner. Negating it comprehensively, in all three dimensions, or developing it through the origin, gives the point p̄ q̄ in the ANS-plane. This is one of the two forms of DeMorgan's theorem. Its other form can be found by comprehensively negating pq in the ANS-plane, and travelling through 0 to p̄ v q̄ in the CNS-plane. The CNS-/ANS-space as a whole has an intriguing and beautiful structure, as it combines the dimensions of alternation and conjunction, the various propositions formed from atomic p and q, and the dimension of negation.

Figure 9:
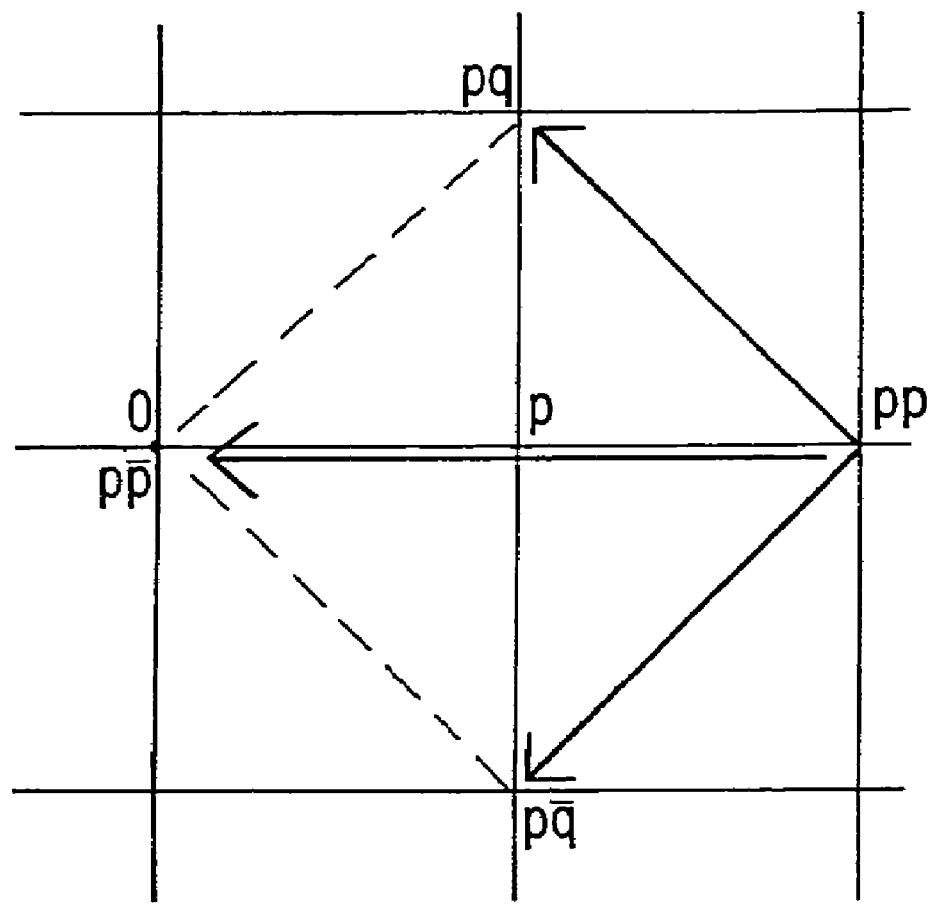
FIG. 9 is a diagram illustrating a simplifying operation within the ANS-space.

Operations within the ANS-space have "+" representing conjunction. When all the non-equivalent conjunction points are established in the space, pairs and other combinations of the given points or conjunctions are given as alternations or vectors. So we get a resultant of pp from pq v pq̄ by relating the two vectors to the origin 0 in a parallelogram (FIG. 9).

In the CNS-space, on the other hand, the corresponding operation produces alternations, and the operation within the space which combines them is conjunction. So we get sets of conjunctions, e.g. those important ones involving p̄ v q, which are among the more important arguments of natural deduction.

Figure 10:
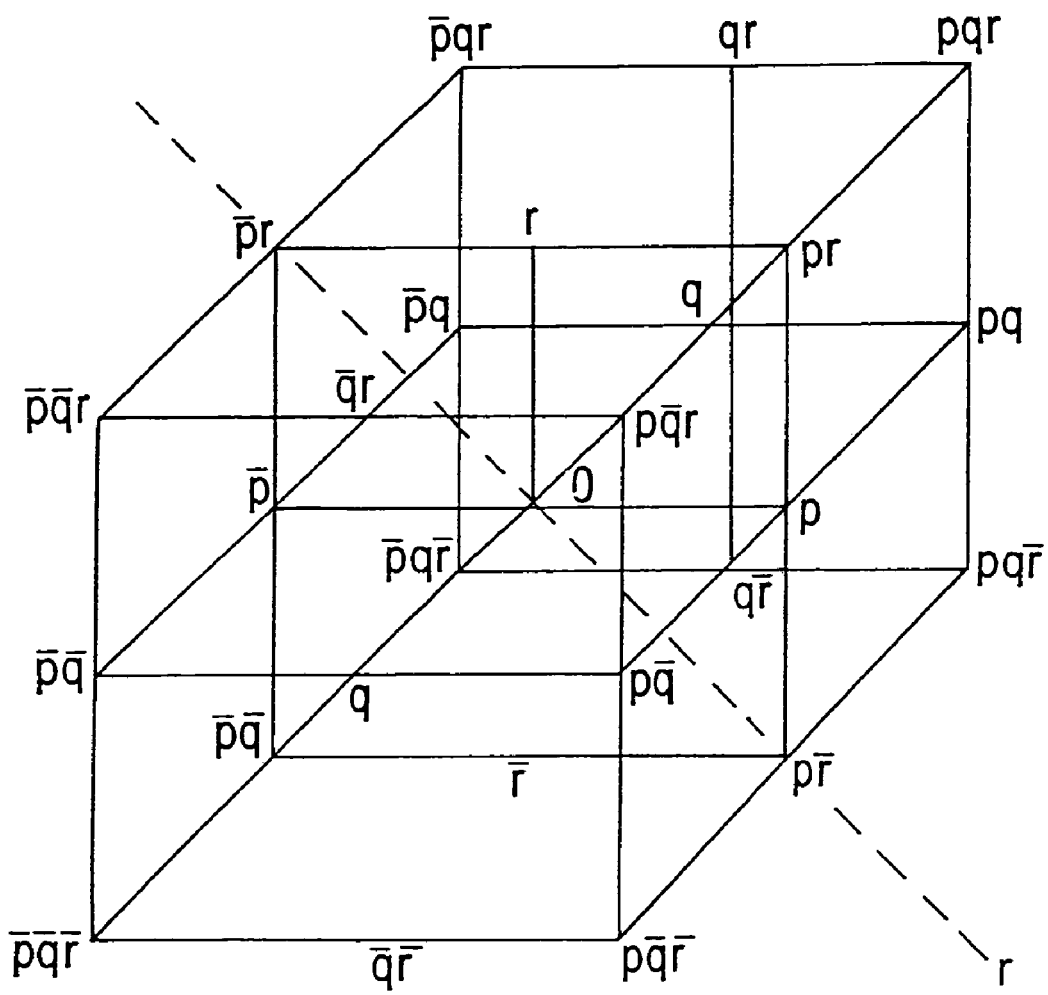
FIG. 10 shows an extension of the ANS-plane of FIG. 4 to a three-dimensional ANS-space.

Assume now in the ANS-space a third proposition r, and a third dimension z in which the unit vector r is to be found. So we get the r-plane, the one swept out by the vector r. This space can also be represented in two dimensions on the page. In FIG. 10 the negation-affirmation axis, which follows the z-axis in the order of rotation of the variables about 0, is inserted to prevent the occlusion of lines and points.

Figure 11:
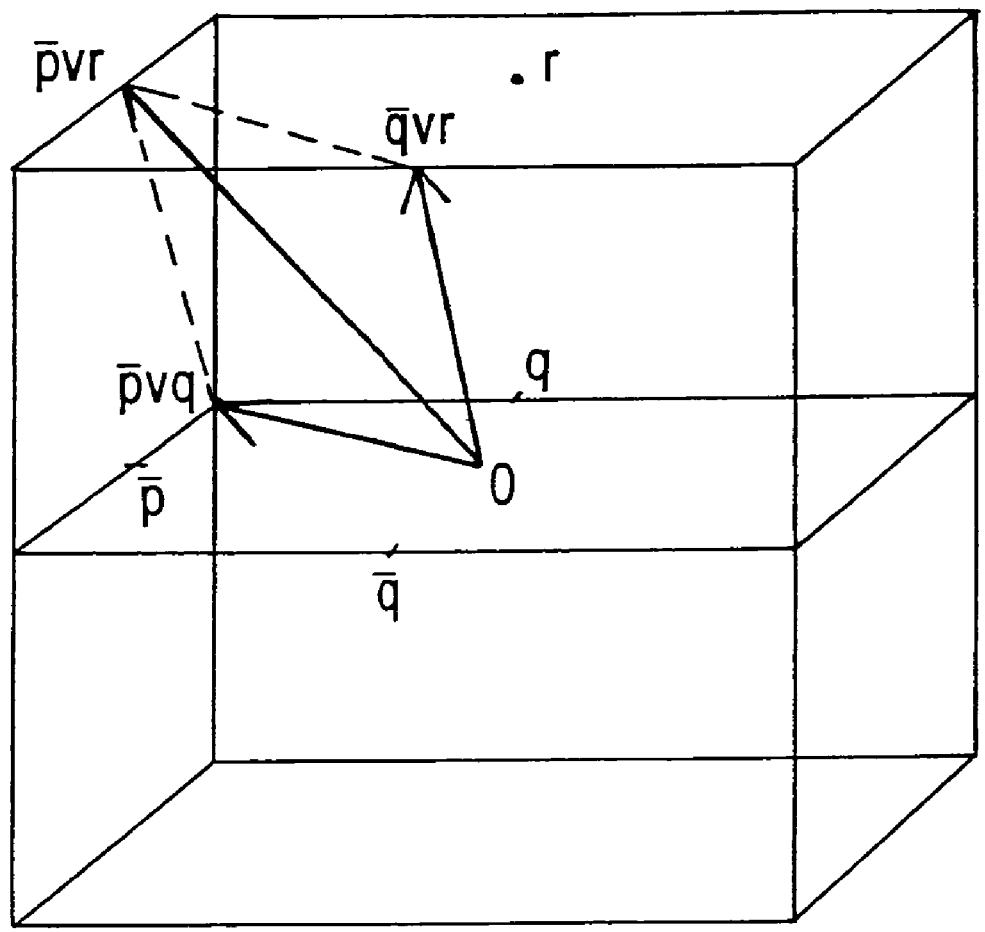
FIG. 11 shows an extension of the CNS-space to three dimensions together with a hypothetical syllogism.

To check the validity of the hypothetical syllogism (−1, 1, 0) (0, −1, 1), (−1, 0, 1), with three variables, in the CNS-space, we can represent it as in FIG. 11.

Figures 12A, 12B:
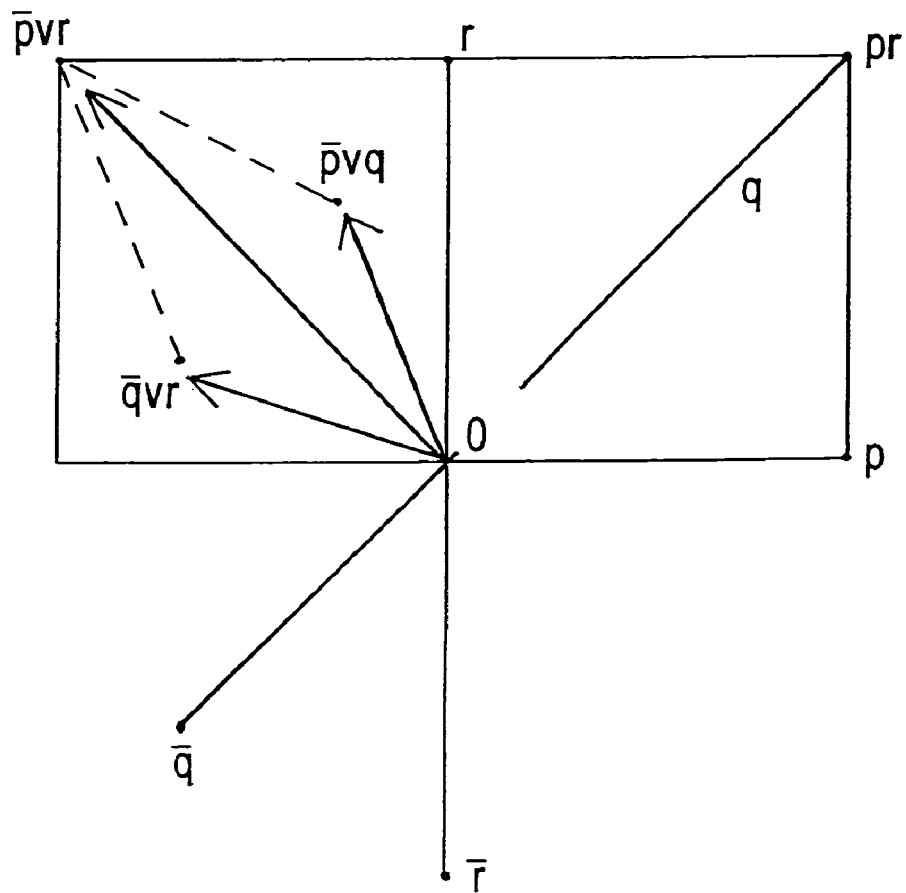
FIG. 12A illustrates a hypothetical syllogism with three variables in the CNS-space.
FIG. 12B shows a view of the hypothetical syllogism in the three-dimensional CNS-space.

As illustrated below, and in FIGS. 12A and 12B, the of the validity argument appears, using three sets of coordinates, as

|  | p | q | r |  |  |
|---|---|---|---|---|---|
| Premise 1 | −1 | 1 | 0 | + | p̄ v q |
| Premise 2 | 0 | −1 | 1 |  | q̄ v r |
| Conclusion = | −1 | 0 | 1 |  | p̄ v r |

Note the simplicity of the given representation or perspective on the hypothetical syllogism in FIG. 11, matched only by the simplicity of the pqr string −1, 1, 0, 0, 1−, 1, −1, 0 1, which is merely a set of instructions for displacements in a 3-space.

Figure 13A:
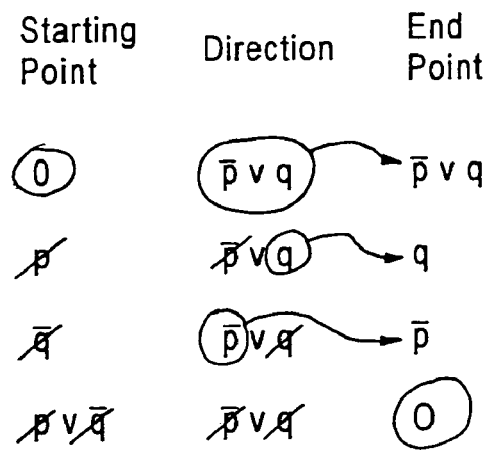
FIG. 13A illustrates a cancellation technique used in simplifying logical representations and in accordance with the invention.
Figure 13B:
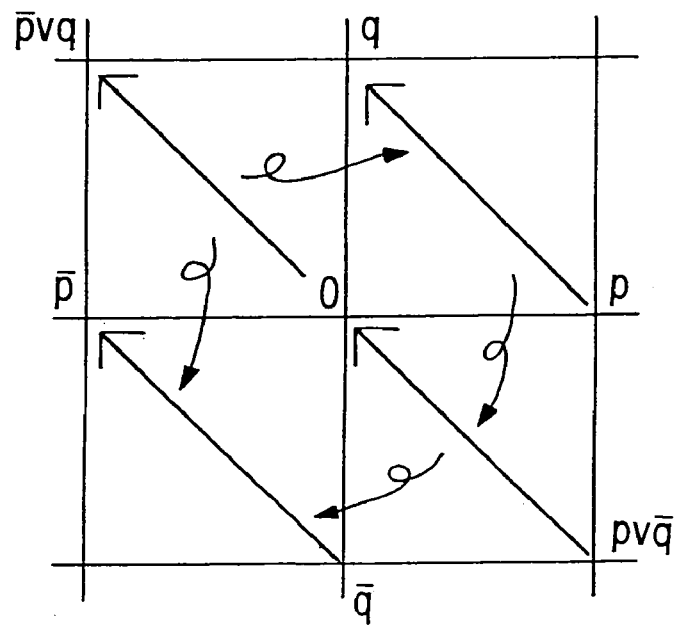
FIG. 13B shows the representations of FIG. 13A in graphical form.
Figure 13C:
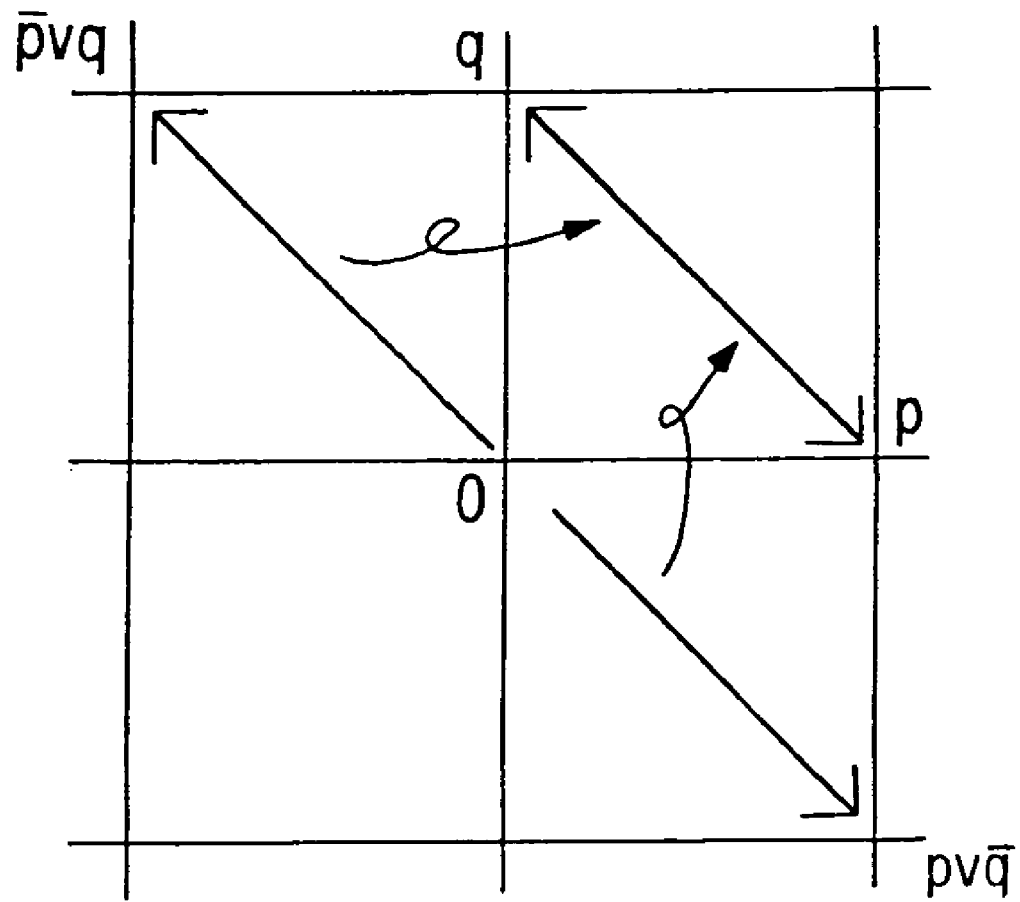
FIG. 13C illustrates implication and equivalence.

The vector system can be used in the CNS-space to display other principles, for example implications, by which p̄ v q implies p→q. It also shows that p̄ v q implies 0→p̄ v q, as well as q̄→p̄ and p̄ v q̄→0. Furthermore, the vector system shows nicely the principle of material equivalence, which states that (p→q)(q→p) is equivalent to p↔q (FIG. 13).

The starting point of all these vectors, together with the direction, gives the end point. "Together with" here means treating the points and directions algebraically as themselves directions from the origin. This yields a cancellation technique in which a starting-point of 0 is cancellation of no literal, and an end point of 0 is the cancellation of all the literals

| Starting Point | Direction | End Point |
|---|---|---|
| 0 | p̄ v q | p̄ v q |
| p | p̄ v q | q |
| q̄ | p̄ v q | p̄ |
| p v q̄ | p̄ v q | 0 |

Parallel principles can be given for the ANS-plane. Here "α→β" means the same as in the CNS-plane; which is α ⊃ β, the conditional, but the reason is hard to see, though interesting. Take the proposition p→q in the CNS-plane. It is represented by (among others) an arrow from the point p to the point q. In the ANS-plane we find an arrow from p to q. Call it v. But what does v mean? Note that the CNS-plane vector from p to q is true if v is false. For v is pq̄, and the same vector or direction as pq̄→0. If we want the ANS-plane vectors to represent truth, we must read them as the denials of the conjunction of the proposition p at the base of the arrow with the negation of the proposition q at the arrowhead, or −(pq̄). Each arrow in the ANS-plane then reliably represents a conditional.

This reveals something further about the all-important 0, the origin. We have just learned that in the ANS-plane an arrow from p to q is pq̄, to be read however as a negation. So what does α→0 mean? 0 is pp̄. So the conjunction of α and −(0) of a α−(pp̄). But this is α(p̄ v p), which is equivalent to α.

Similarly, in the CNS-plane, all the arrows which depart from 0 represent an instance of α v β, where α is 0. Take an arrow from 0 to p v q. 0 is the tautology p v p̄. The negation of this pp̄, and so the arrow to the point p v q is −(p v p̄) v pq. But the first disjunct of this is equivalent to pp̄, and so it is always false. Hence the alternation is equivalent to the second disjunct, or the assertion pq.

If a vector in the ANS-space is directed towards 0, 0 has the effect of reversing the truth-values of the base propositions. Moving towards 0 from the base (p,q) in the CNS-space we get the vector p̄ v q̄. 0 has the effect of putting p and q through the Sheffer-function "|". The vector moving away from 0 in the CNS-space towards e.g. (p,q) is also the vector from the base (p,q) to 0, and so it is the vector p̄ v q̄ or p v q.

In a dual fashion, if we are moving towards 0 in the ANS-space, we get the base values, so that pq→0 is pq. From 0, a vector to (p̄,q̄) will thus be pq. In the ANS-space 0 has the effect of putting p and q through the dagger function "↓", by which p↓q is p̄q̄.[1]

[1] Wittgenstein's operator N in the Tractatus could be described as a generalization of ↓ to more than two places, as N(p,q,r), for example, is pqr. We could also describe a generalized Sheffer operation for more than two places which trANS-forms a base such as say (p,q,r,s) into p v q v r v s. This operation could be called S for "Sheffer".

Part II

The simplification problem is the problem of reducing truth-functional schemata (or, in the system I am describing, systems of vectors in the ANS-space) to their shortest equivalents. A practical method for doing this, in alternational normal form continues, as Quine observes (Quine, 1982, p. 78), to be suprisingly elusive.

In the ANS-space "vector logic" can be applied to the problem in the following way. Take the schema pq v p$\bar{q}$, which as well as implying p is equivalent to p. To simplify it, form the parallelogram from the origin 0, pq and p$\bar{q}$ to the resultant or vector sum point. Call it $\Re$, for "implicant". The vector acting at $\Re$, which is in this case pp, implies pq v p$\bar{q}$. So $\Re$ splits up alternationally, into its components, pq v p$\bar{q}$, towards the origin.

Next note that pq is equivalent to pqp, so that the arrowhead at pq can be dragged to pqp. But pp can also be dragged to p. Now we have an arrow from p to pqp. But this arrow an be translated into a position on top of the arrow from p$\bar{q}$ to pp. The same procedure yields a double-headed arrow between pq and pp, and the result can be read as pq v p$\bar{q}$↔p.

When an implicant splits up into its alternations towards the origin, if there is a proposition σ (for "simplest equivalent") at the center of the parallelogram formed by 0, the disjuncts of a two-clause target schema, and $\Re$, then σ is a shortest equivalent of the target schema. But this only works for pairs of schemata which do have an $\Re$-point.

The general simplification procedure, in the ANS-space, is as follows.

(1) Represent the alternational normal schema, the target schema t, as a set of vectors in the ANS-space. Each clause or disjunct of t is a position vector (i.e. one pointing to 0) with 0 at one corner of a parallelogram made of propositional addresses to the $\Re$-point at the other. Any two other outside vertices of such a parallelogram are implicants $\Re$ which are among the original clauses of t.

(2) Pick any two clauses. If there is a propositional address σ at the midpoint between the component clauses, the vector from $\Re$ to σ, i.e. σ, is the simplification of and can replace the relevant clauses of t, as in the case where t is pq v pq, $\Re$ is pp and σ is p.

(3) Generate $\Re$-implicants until each clause or vector has been used at least once. If a disjunct d of t cannot be used because it forms no propositional address with any other disjunct, then d must appear unmodified in the final schema which is the simplification of t.

(4) If an $\Re$-point exists in t, delete the vectors which produce it in favor of the vector from $\Re$ to 0.

(5) For a clause in a schema which subsumes another clause, e.g. pqr v pq, eliminate the subsuming clause, in this case pqr, leaving pq. Implications arising from subsumption can be written into the whole vector system of t as components where relevant. For example, an arrow can be drawn from pqr to pq in the above example.

Rule (5) applies for example to pq v p, which is an undeveloped or unbalanced schema in which pq subsumes p. How does pq v p simplify to p, when it seems to yield p v q? The Answer, which cashes the metaphor of "subsumption", is that p really represents a plane, in a 3-space, sweeping out the whole p-domain, or any ANS-schema with p in it. So it is a kind of type fallacy to represent pq alongside p in a single schema as if they were to be treated separately. For pq, and p$\bar{q}$, are really "elements" of p itself. A cube is not so many faces and so many lines, but it can be represented as lines producing faces or vice versa. As a matter of philosophy, therefore, vector logic can avail itself, as rule (5) does, of a preliminary use on Quine's operation (i) from "A Way to Simplify Truth Functions", which has us 'drop the subsuming clause . . . if one of the clauses of alternation subsumes another . . . '. Quine's operation (i) also replaces α v $\bar{α}$φ with α v φ, and the same for the corresponding α-schemata (Quine, 1955, p. 627).

Figure 14C:
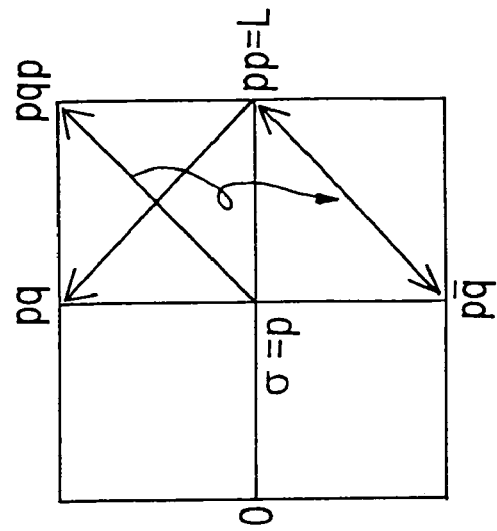
FIGS. 14A, 14B and 14C illustrate a solution to the simplification problem using the techniques of the invention.
Figure 14B:
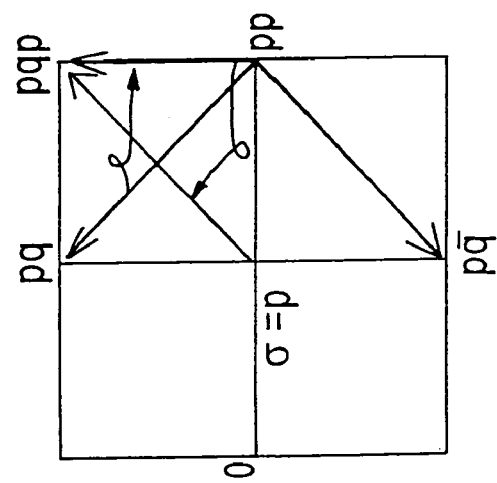
Figure 14A:
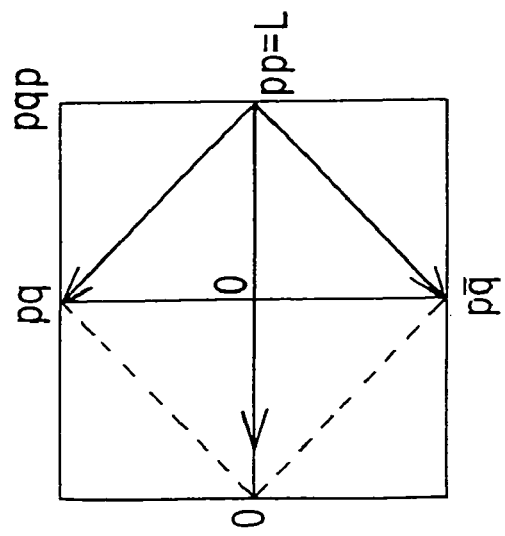
Figure 15:
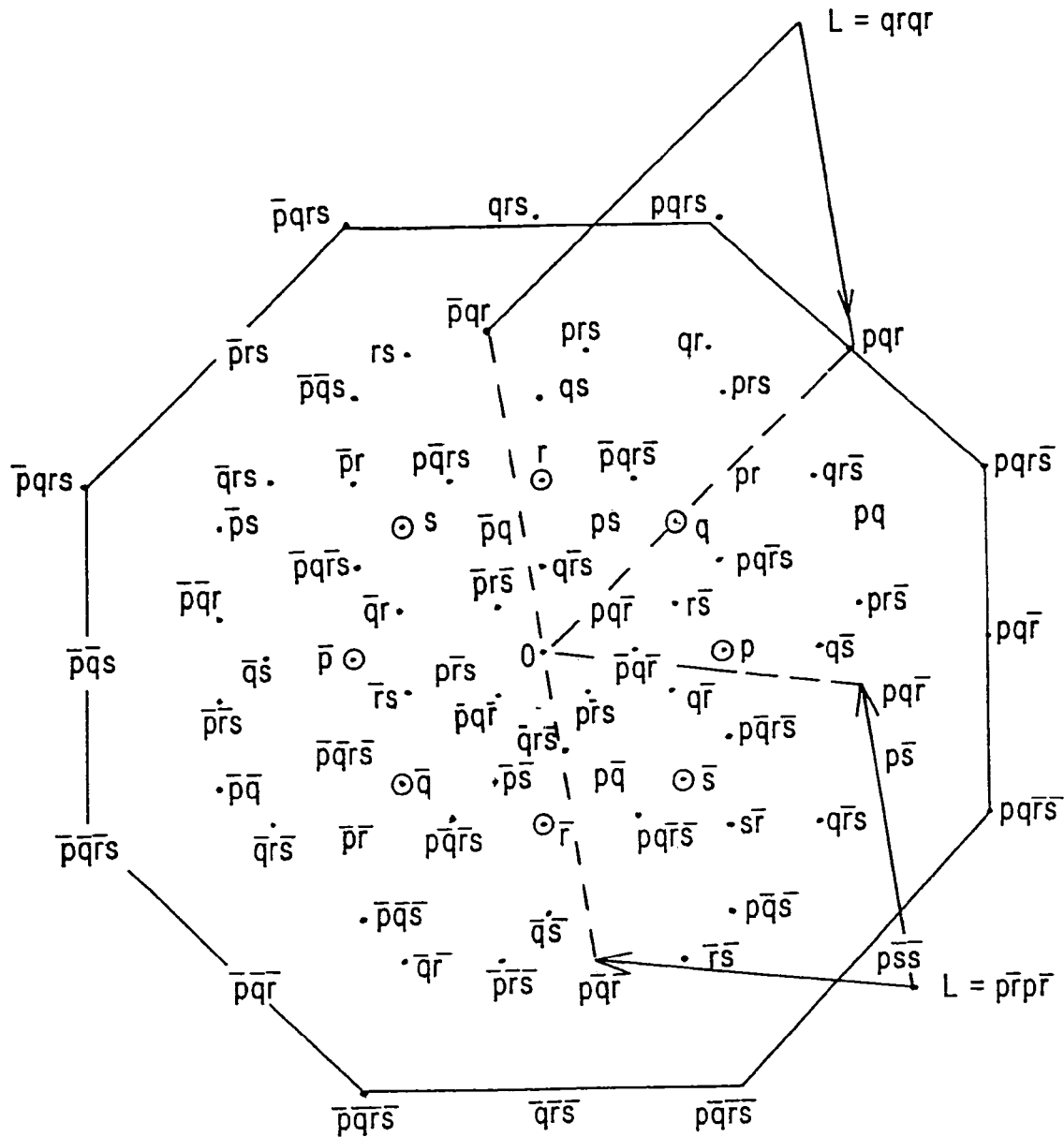
FIG. 15 shows a 4-clause schema simplified.
Figures 16A, 16B:
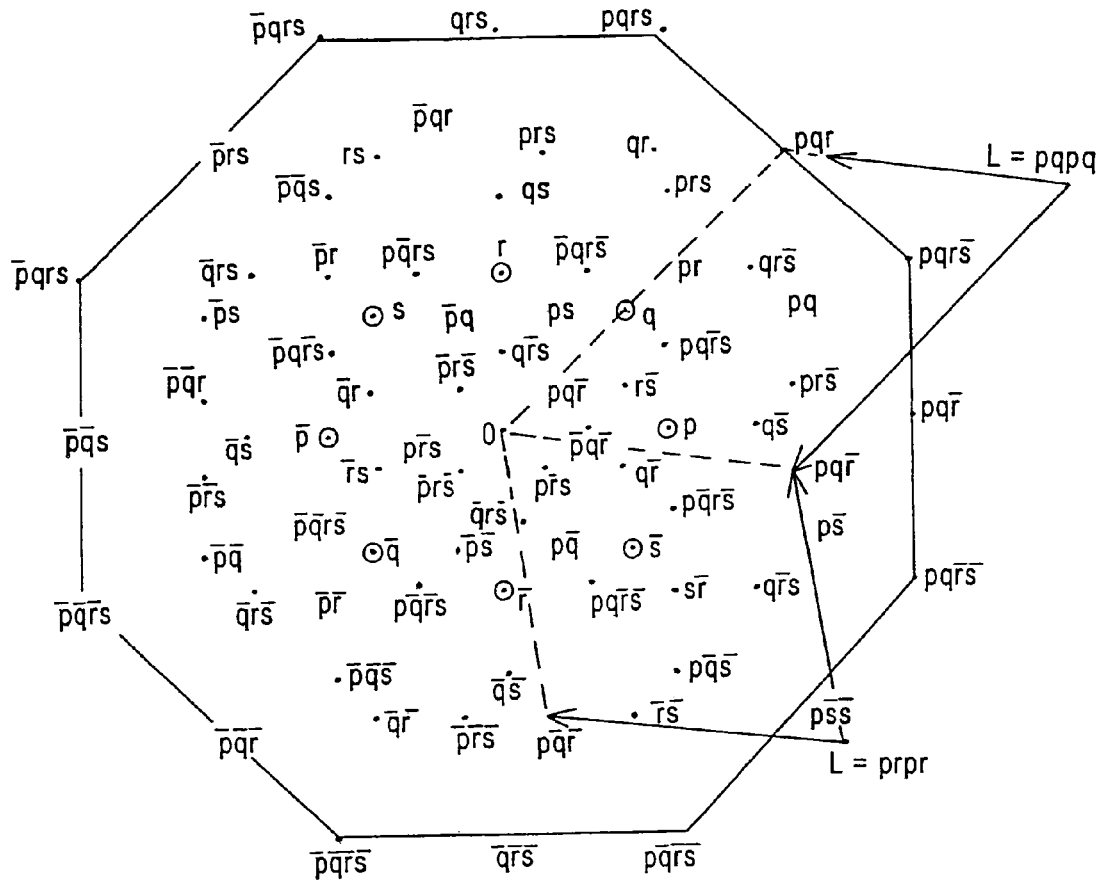
FIG. 16A shows a 3-clause schema simplified.
FIG. 16B shows the truth-table for the representation of FIG. 16A.

(6) Couples such as pq v $\overline{pq}$ or $\overline{pq}$s v pq$\bar{s}$ cannot be summed to zero, the origin (7) Translate vectors as in FIG. 14. Any superpositions of parallel arrows in opposite directions represent equivalences. (a) Drop the longer clause at the end of any double-headed arrow. (b) Drop pairs, triples etc. of double-headed arrows which meet at a point in favor of the vector from that point to 0. (c) Drop a vector or clause in the target schema which is itself the resultant of any other two vectors.

(8) A simplification is complete if in the system which replaces the target schema: (a) no vectors or clauses are subsumed by others (see Rule 5); (b) no double-headed vectors remain, or, in other words, if all equivalences in the system have been exploited.

Take next the simplification of the four-clause target schema pqr v pq$\bar{r}$ v $\bar{p}$qr v p$\overline{qr}$. The first job is to plot the target schema in a V-diagram. We get two parallelograms, with two i-points, qrqr and p$\bar{r}$p$\bar{r}$, and two σ-points, qr and p$\bar{r}$, which are final in the sense that they do not generate a further σ-point. Hence the target schema is equivalent to qr v p$\bar{r}$.

Now take the simple-looking three-clause schema pqr v pq$\bar{r}$ v p$\overline{qr}$. The resultant is pq v p$\bar{r}$.

Here the σ- and $\Re$-points function as before. But something else has happened. The vector pq$\bar{r}$ has been used twice, once along with pqr to give pq, and again, with p$\overline{qr}$, to give p$\bar{r}$. Why was pq$\bar{r}$ not exhausted by its first use, and why can it be used again? The Answer can be seen by looking at the truth-table for pqr v pq$\bar{r}$ v p$\overline{qr}$, which is

| | |
|---|---|
| 1. pqr | T |
| 2. pq$\bar{r}$ | T |
| 3. p$\bar{q}$r | |
| 4. p$\overline{qr}$ | T |
| 5. $\bar{p}$qr | |
| 6. $\overline{p}q\bar{r}$ | |
| 7. $\bar{p}\bar{q}r$ | |
| 8. $\overline{pqr}$ | |

Truth, it could be said, is not exhausted by use. The p$\bar{r}$ of line 2 is so to speak redundant, as line 2 has already been captured by the disjunct pq, and so line 4 has had half of its work already done.

This simplification procedure is theoretically an improvement on the techniques used in Karnaugh maps (Garrod and Borns, 1991, p. 153 ff.), as it needs no wrapping around and can be used mechanically and easily on more than four variables—any number fits into the "proposition circuit", which gradually turns from a square, with two variables, into a hexagon, with three, and finally into a circle, with an infinite number of variables. With four variables, the logical space is as given in FIG. 17.

Figure 17:
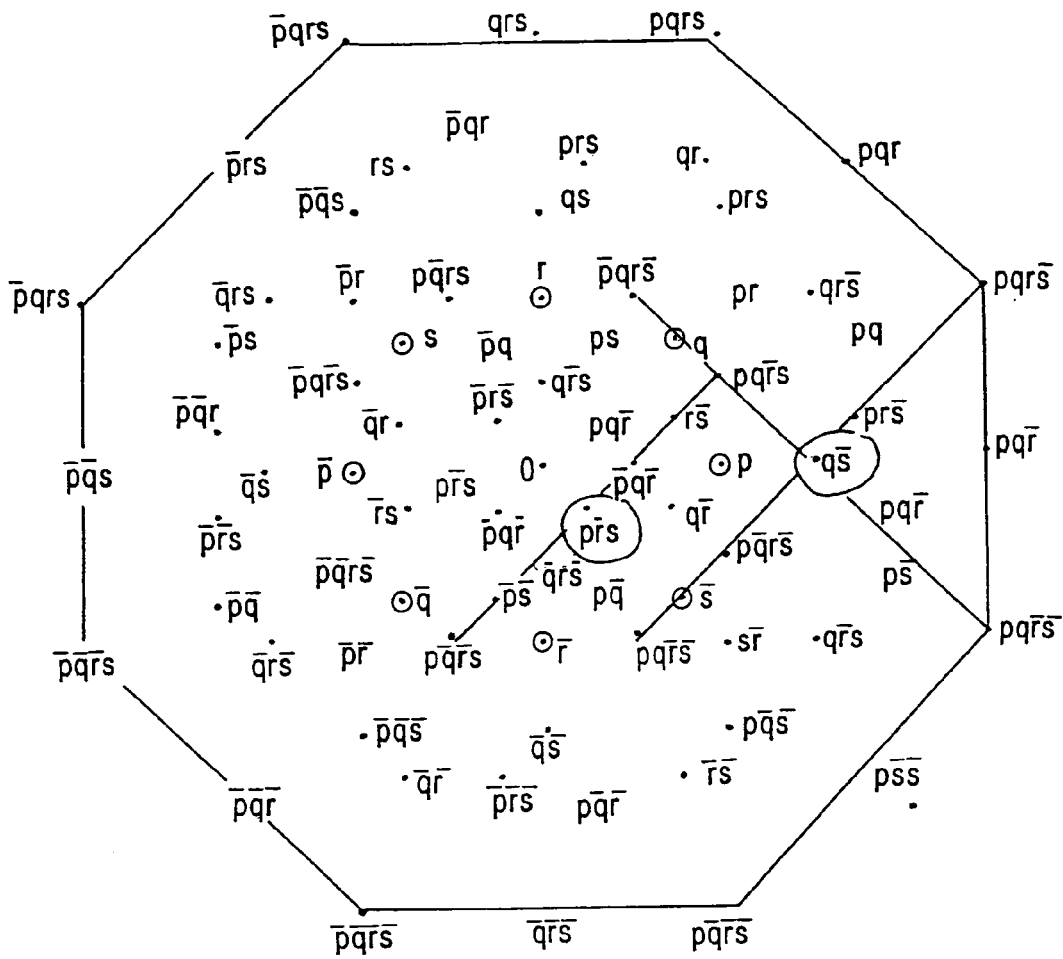
FIG. 17 shows a 4-variable vector diagram simplification.
Figures 18A, 18B:
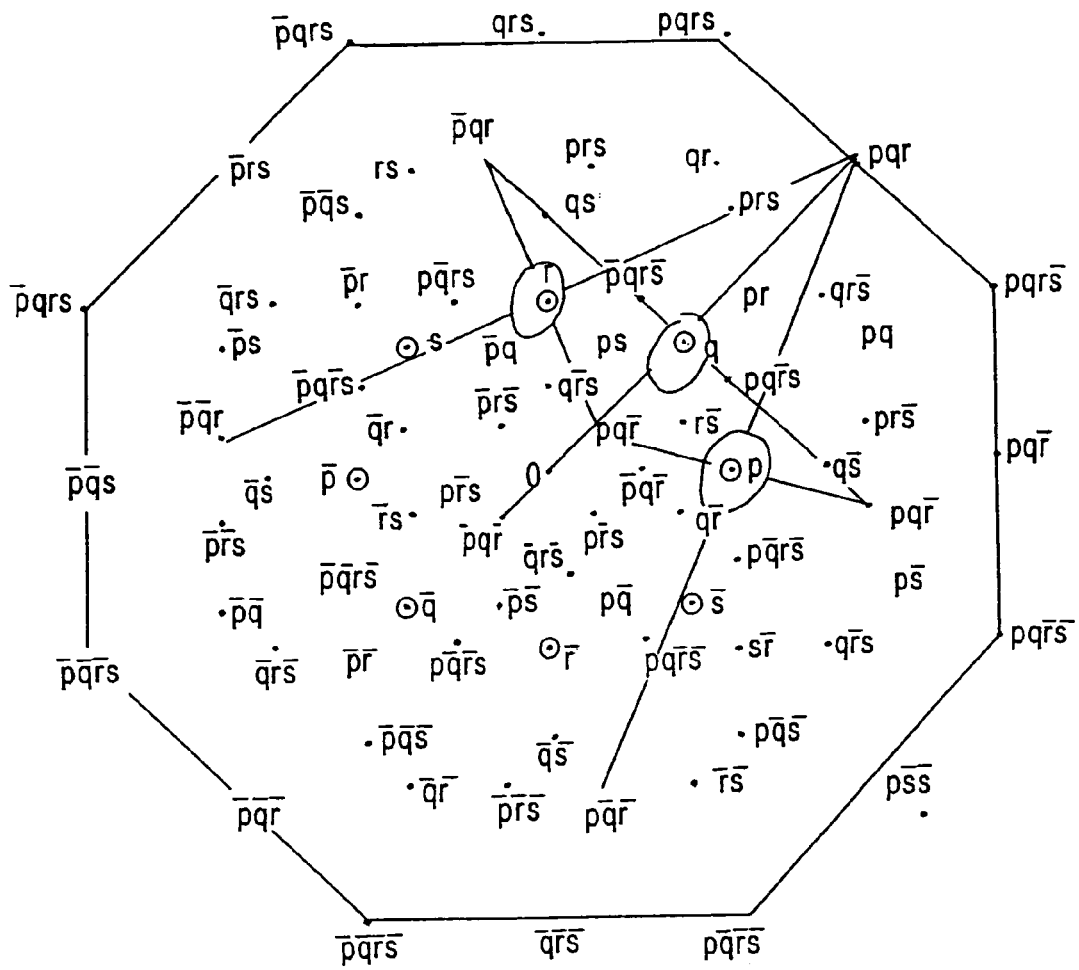
FIG. 18A is a diagram illustrating the Fix Rule for d=2.
FIG. 18B is an illustration of an example of the Fix Rule.
Figure 19:
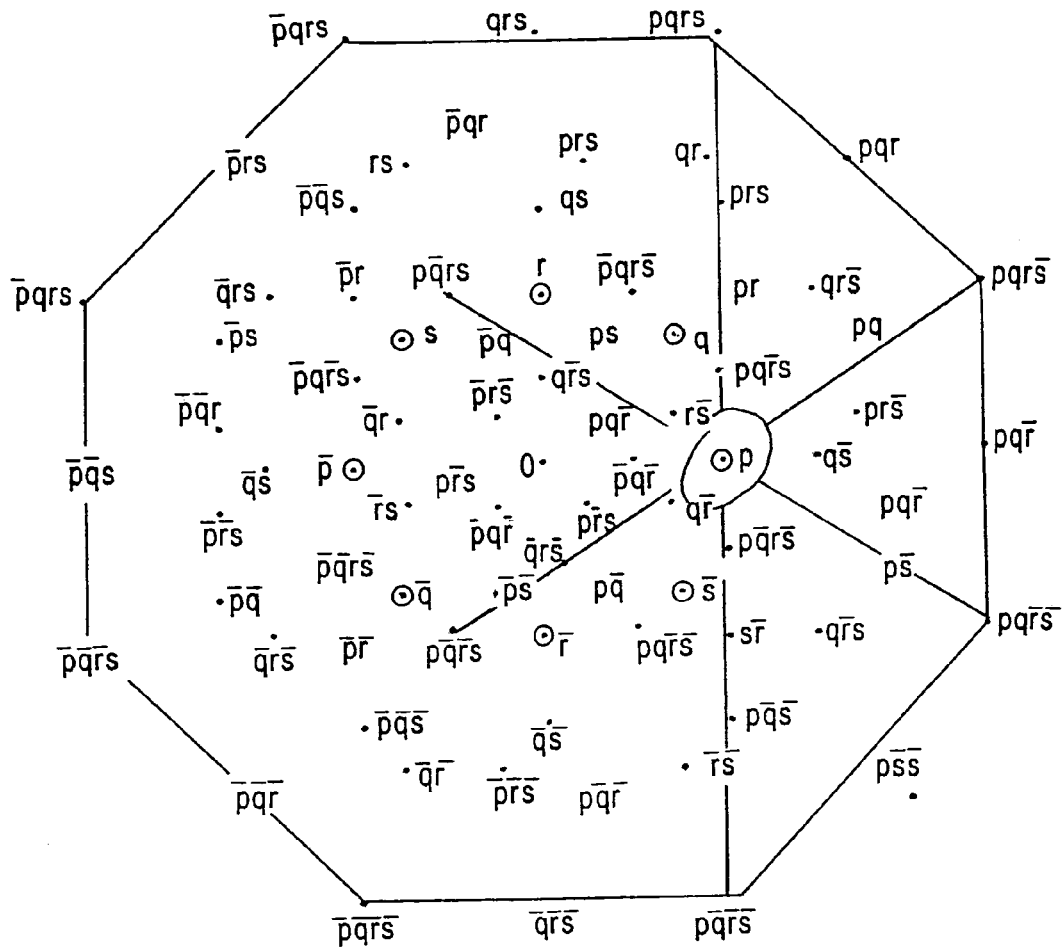
FIG. 19 is an illustration of the Fix Rule for d=3.

The whole figure in FIG. 17 is a "measure polytope" or hypercube, though one with a further complex internal structure. There is no limitation of tessellation to the number of propositional variables or vectors p, q, r s . . . that can be handled, because the space is derived not from a closed figure, such as a cube, but from a sheaf of lines in the geometrical sense. Not all closed figures tessellate. All the lines of the multi-dimensional sheaves are coincident.

Consider in FIG. 17 a simplification from pqr$\bar{s}$ v pq$\bar{rs}$ v pq$\bar{r}$s v $\bar{p}$q$\bar{rs}$ v $\bar{pq}$rs v $\bar{pqrs}$ to $\bar{prs}$ v q$\bar{s}$. This proceeds as shown, with the six vectors reducing to two. The first vector or Φ-point in the simplification, $\bar{prs}$, results from the implicand pair pq$\bar{rs}$ v $\bar{pqrs}$, dropping the up-down q/$\bar{q}$ component. In this case we have a simplification from two four-letter schemata to one three-letter schema. The remaining four schemata are all needed to fix the Φ-point q$\bar{s}$. Both pairs pqr$\bar{s}$ v $\bar{p}$q$\bar{rs}$ and pq$\bar{r}$s v $\bar{p}$ q$\bar{r}$s must give a fix on the same Φ-point if the reduction from four literals to two is to be justified. For either pair by themselves is not sufficient for the required biconditional. The general rule is V=2d where v is the number of vectors required to make the fix on the Φ-point, and d is the drop in the number of literals from the clauses of the given schema to the resulting clause in the target schema.

Another illustration of the Fix Rule is pqr v pq$\bar{r}$ v p$\bar{q}$r v p$\bar{qr}$ v $\bar{p}$qr v $\bar{p}$q$\bar{r}$ v $\bar{pq}$r, which is, however, equivalent merely to p v q v r, as it covers every line of the truth-table except $\bar{pqr}$.

One pair of implicands is p$\bar{q}$r v pq$\bar{r}$, which give the Φ-point p. But as this is a drop down from three letters to one, we need a fix of four vectors or two vector sums on the point, and the third and fourth vectors $\bar{p}$qr and pq$\bar{r}$ provide it. The same sort of fix appears with q(pqr v p$\bar{q}$r and $\bar{p}$qr v p$\bar{qr}$) and r($\bar{p}$qr v pqr and $\bar{p}$q$\bar{r}$ v p$\bar{q}$r).

A much simpler though negative example of the Fix Rule is pq$\bar{r}$ v p$\bar{q}$r, which seems to give p as an Φ-point resultant, but fails to for lack of a fix on the point p, as four, not two vectors must converge on it for the drop. This acts as a constraint on the vector arithmetic. We seem to get

|   | p | q | r |   |
|---|---|---|---|---|
|   | 1 | 1 | 1 | + |
|   | 1 | −1 | −1 |   |
| = | 1 | 0 | 0 |   |

But the Fix Rule rules this out. If x columns are filled with numbers, positive or negative, then the number of non-zero columns in the sum must be x−1. The Fix Rule will seem entirely unartificial when one recognizes that what it means in, say, a 3-space, is that a literal or one-letter proposition is a face, and so four corners are needed to determine it. A two-letter proposition is a line, and so only two letters are needed to fix it. And a point in a 3-space is a three-letter proposition.

Consider as another illustration of the Fix Rule pqrs v pq$\bar{r}$s v pq$\bar{r}$s v pq$\bar{rs}$ v p$\bar{q}$rs v p$\bar{q}$r$\bar{s}$ v p$\bar{qr}$s v p$\bar{qrs}$. This is very obviously equivalent to p, and since d=3 for each clause, v for the point p=2d. So d=8, and eight vectors or four vector sums are needed for the fix on the Φ-point.

In many cases the target schema is unbalanced in the sense that its clauses have different numbers of conjuncts and so they need to be put into developed alternational normal form. An example pq v p$\bar{q}$r v $\bar{p}$q$\bar{r}$ (Quine, 1982, p. 75). This is equivalent to pq v pr v $\bar{p}$q$\bar{r}$. Like the early Quine's procedure in "The Problem of Simplifying Truth Functions" (Quine, 1952, p. 524), the vector simplification method given so far has taken the cumbersome 'developed normal formulas as the point of departure.'

If t is developed uniformly we get $\bar{pqr}$ v p$\bar{qr}$ v pqr v pq$\bar{r}$, which in a V-diagram is clearly $\bar{pqr}$ v pq v pr, as pr lies midway between pqr and 0, and pq lies midway between pqr and pq$\bar{r}$. But without development, we can take the ∴-point for p$\bar{q}$r v pq, which is pr, and argue that since pr→p$\bar{q}$r pq (where ".expression" and "expression." represents bracketing of the "expression" that precedes or follows the dots), and pr subsumes p$\bar{q}$r, the longer p$\bar{q}$r can simply be replaced by its own implicant.

The equivalence of undeveloped $$\bar{p}q \text{ v } p\bar{q} \text{ v } \bar{q}r \text{ v } q\bar{r} \tag{i}$$

and $$p\bar{q} \text{ v } \bar{p}r \text{ v } q\bar{r} \tag{ii}$$

is harder to establish. It is one which resists as many as twelve fell swoops (Quine, 1982, p. 76, also in 1952, pp. 523-527) or shorter truth-tables. In the vector space with developed alternational forms the equivalence is easy enough to see. The developed form of this equivalence is easy enough to see. The developed form of this example is: $\bar{p}$qr v $\bar{pqr}$ v p$\bar{qr}$ v pq$\bar{r}$ v p$\bar{q}$r v p$\bar{q}$r.

The same result can be obtained using column matrices for the pairs of vectors. Then for $\bar{p}$q$\bar{r}$ v $\bar{pqr}$ we get

|   | p | q | r |   |   |
|---|---|---|---|---|---|
|   | −1 | 1 | 1 | + | $\bar{p}$qr |
|   | −1 | −1 | 1 |   | $\bar{pqr}$ |
|   | −1 | 0 | 1 |   | $\bar{p}$r |

And for $\bar{p}$q$\bar{r}$ v pq$\bar{r}$ we get

|   | p | q | r |   |   |
|---|---|---|---|---|---|
|   | −1 | 1 | −1 | + | $\bar{p}$q$\bar{r}$ |
|   | 1 | 1 | −1 |   | pq$\bar{r}$ |
| = | 0 | 1 | −1 |   | q$\bar{r}$ |

Similarly, for p$\bar{q}$ r v p$\bar{q}\bar{r}$ we get

|   | p | q | r |   |   |
|---|---|---|---|---|---|
|   | 1 | −1 | 1 | + | p$\bar{q}$r |
|   | 1 | −1 | −1 |   | p$\bar{qr}$ |
| = | 1 | −1 | 0 |   | p$\bar{q}$ |

It should be noted that in this example too the Fix Rule applies. It would be nice to take the vectors in a different order, so that p $\bar{q}$r and pq$\bar{r}$ are chosen instead of p$\bar{q}$r and p $\bar{qr}$, and also $\bar{p}$q$\bar{r}$ and pq$\bar{r}$ instead of $\bar{p}$qr and pq$\bar{r}$. This would yield r and p instead of pq and q$\bar{r}$ in the whole system. But that would mean dropping from three letters to one in the case of these two pairs of alternations, and we cannot do that as there is no fix on r or on p.

There may of course be more than one "shortest" schema. In Quine's example there is obviously is on inspection a second. The vector system $\bar{q}$r v $\bar{p}$q v p$\bar{r}$ has the same overall "effect" in the vector-logical space.

Let us now try this example with the use of the ℜ-points, the key prime implicants. Take first $\overline{pq} \vee \overline{qr}$. This alternation is implied by the ℜ-vector which forms the parallelogram with 0. But there is no Φ-point, and so, apparently, $\overline{pq} \vee \overline{qr}$ is not equivalent to $\overline{pr}$. Yet in the context of the whole scheme $p\overline{q} \vee \overline{q}r \vee \overline{pq} \vee \overline{qr}$, it is. To see this, we move the free vectors $p\overline{q}$ and $\overline{q}r$ from the right-hand side of the V-diagram to the parallelogram on the left. The implicand of $\overline{pr}$, which is $p\overline{q} \vee \overline{q}r$, slides into place from $\overline{pq} \vee \overline{qr}$ back to $\overline{pr}$, and the two-way implication or equivalence is established.

The vector summation of $p\overline{q}$ and $\overline{q}r$ to $p\overline{qq}r$ or $p\overline{q}r$ is disallowed by the Fix Rule, according to which the number of vectors needed to make a fix is equal to the d-th power of 2. This summation would actually produce a negative value for d. As the number of literals rises from two to three, the drop increases from 2 to 3, or −1.

Figure 23:
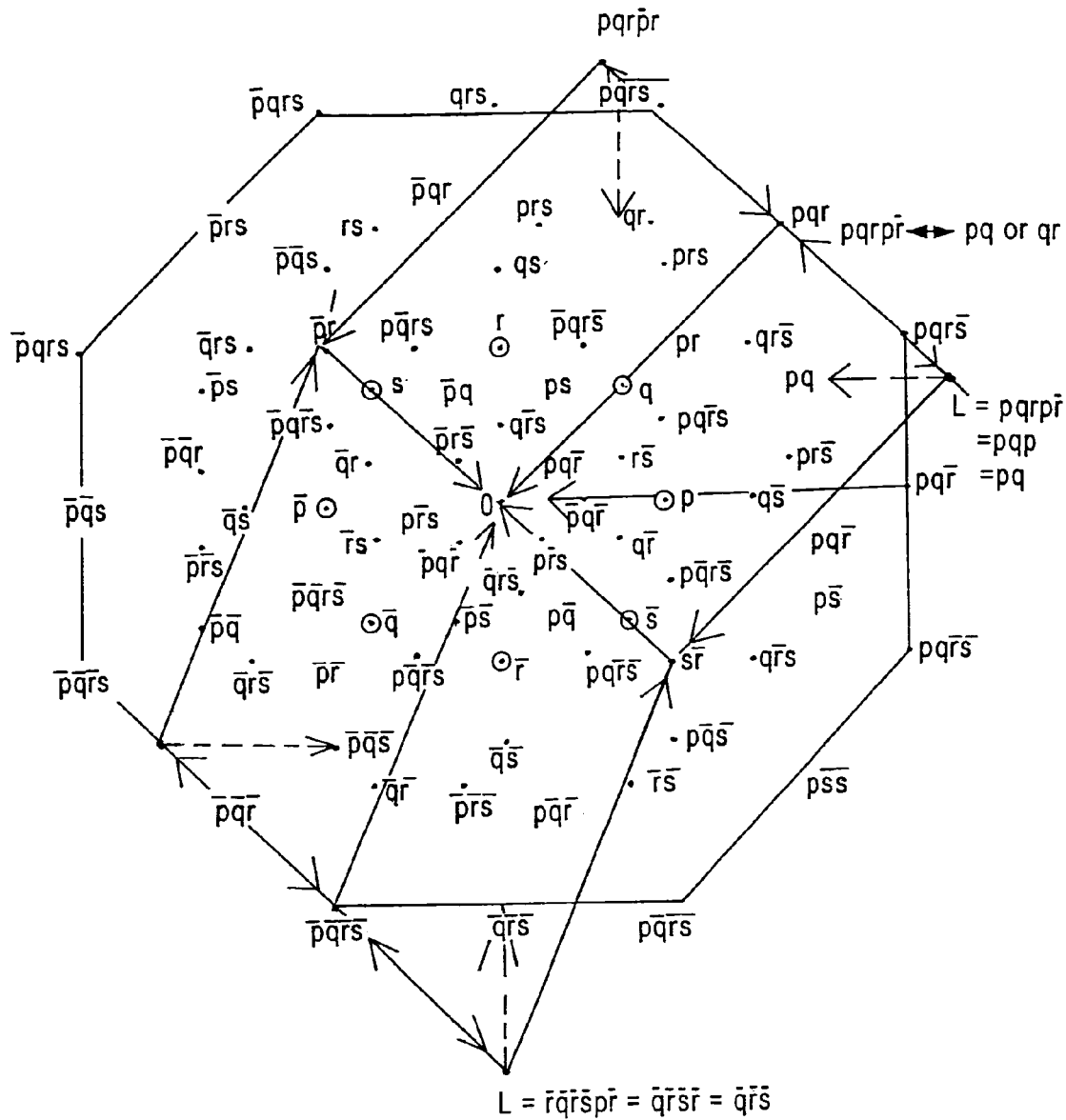
FIG. 23 illustrates another simplification of an undeveloped set of statement taken from Quine.

Quine gives another interesting example of a simplification with four simplest equivalents, one which also illustrates the method of simplification for non-developed or unbalanced schemata like the last example. The example (Quine, 1952, p. 528) is $pqr \vee p\overline{r} \vee pq\overline{s} \vee \overline{pr} \vee \overline{pqrs}$ (FIG. 23).

We begin by generating vector sums for the various disjuncts. We can see fairly easily that $\overline{pr}$ and $\overline{pqrs}$ to start with, yield a parallelogram, but it seems to end at an ℜ-point outside the logical space. Yet if we study that point, we can see that it is actually at the co-ordinates $\overline{pqrspr}$. This point, however, contains a contradictory or backward and forward instruction, namely the r from $\overline{pr}$ and the $\overline{r}$ from $\overline{pqrs}$ which can both be deleted. There is also a double p in the final address, and one p of these, but not both, can of course be deleted. This leaves an end-point for a vector $\overline{pqs}$. By similar reasoning, we can arrive at the vector $\overline{qrs}$ as the vector sum of $p\overline{r}$ and $\overline{pqrs}$. And similarly pqr with $p\overline{r}$ gives pq, or pqr with $\overline{pr}$ gives the ℜ-point qr. Each vector must be used at least once if it is not to appear unchanged in the simplified schema.

Figure 20:
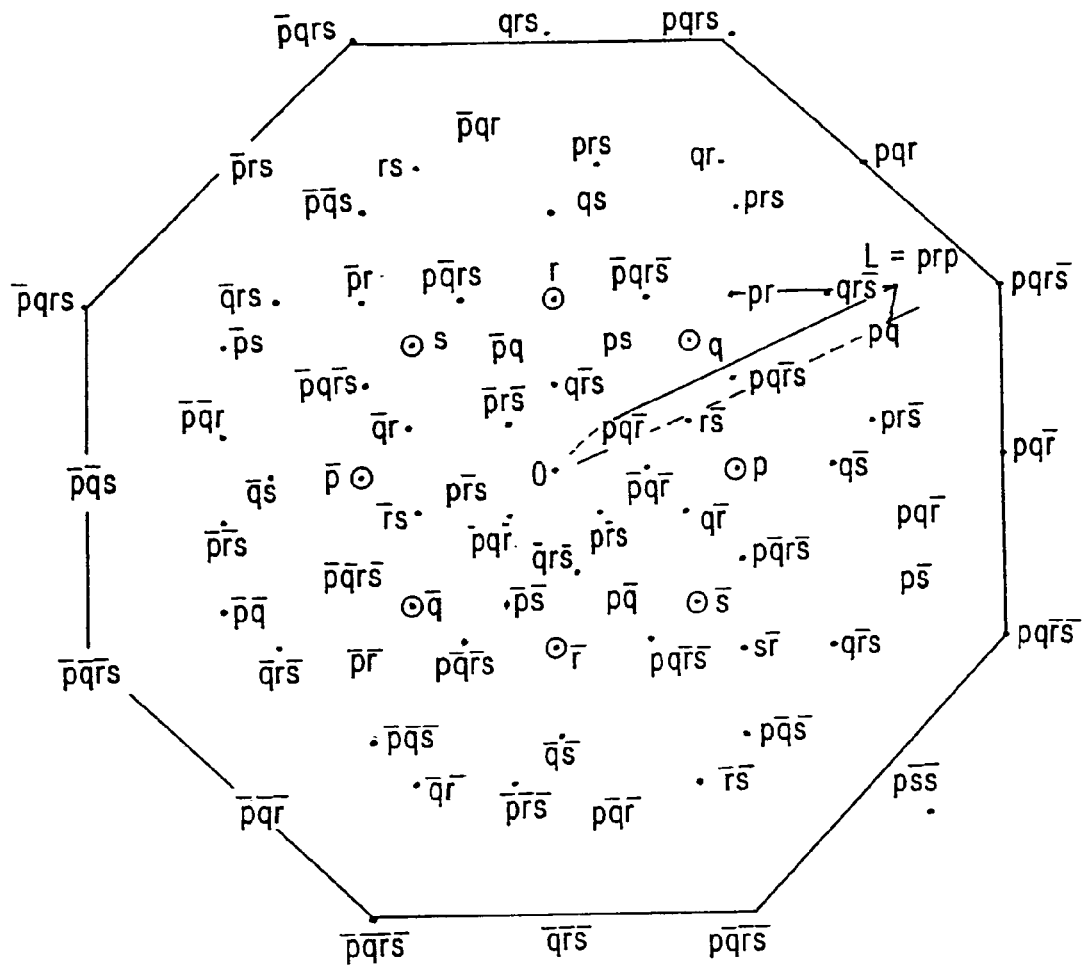
FIG. 20 illustrates application of the invention to situations in which developed normal formulas are not the point of departure.
Figure 21:
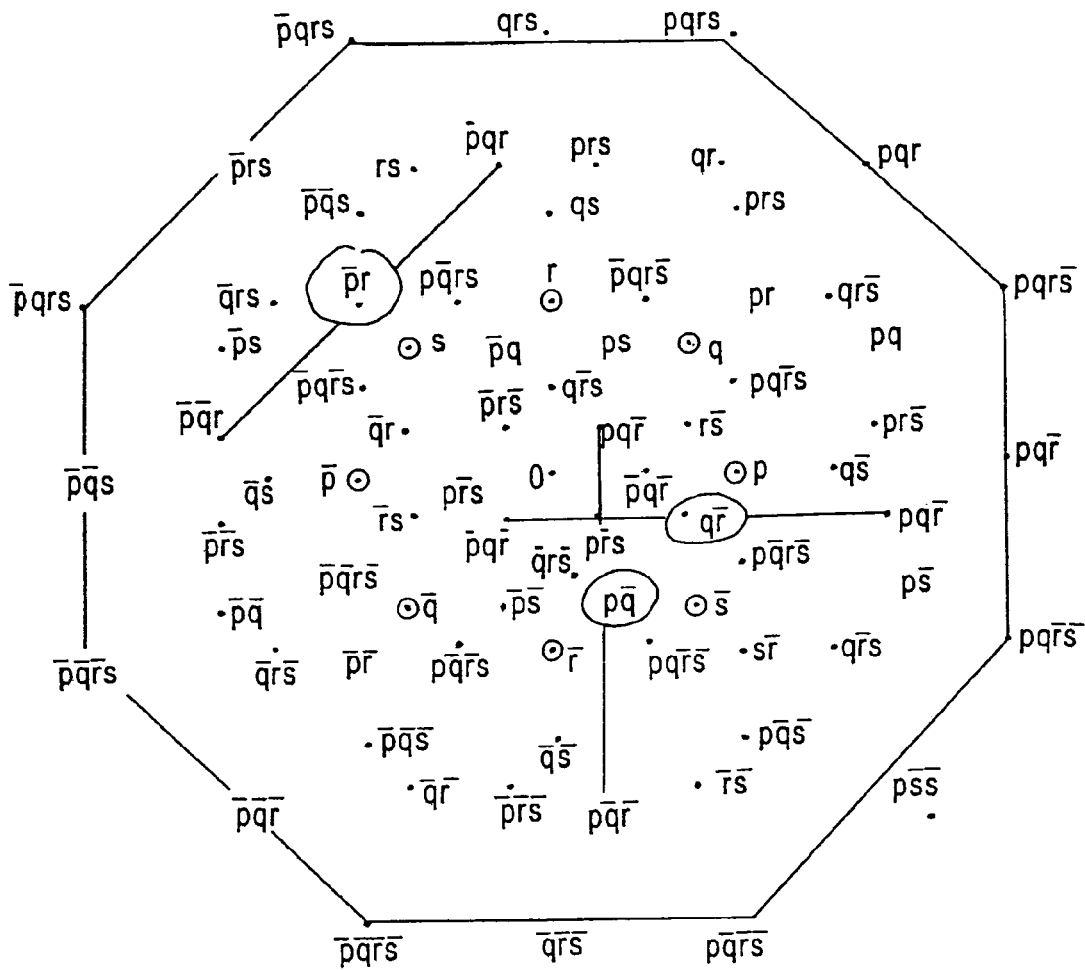
FIG. 21 illustrates the equivalence of a developed alternational normal form and its undeveloped counterpart.
Figure 22:
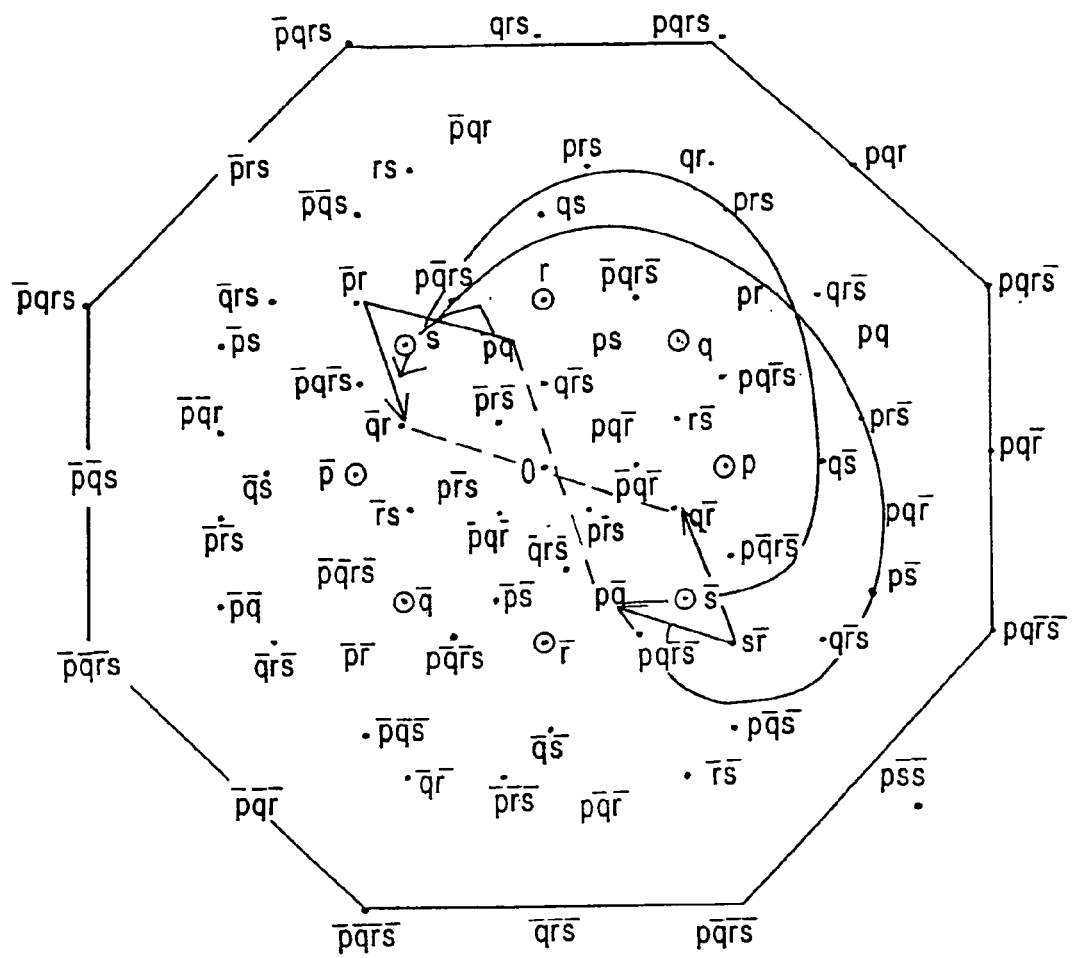
FIG. 22 illustrates the simplification of an undeveloped set of statements.

The corresponding Φ-points, however, do not appear at the designated addresses which are shortened versions of their ℜ-points, and so the equivalence of the ℜ-points and their implicands is not established. Just as in the example shown in FIG. 20, the drag-back effects described in connection with p and pp in FIG. 14 do not apply.

Figure 24:
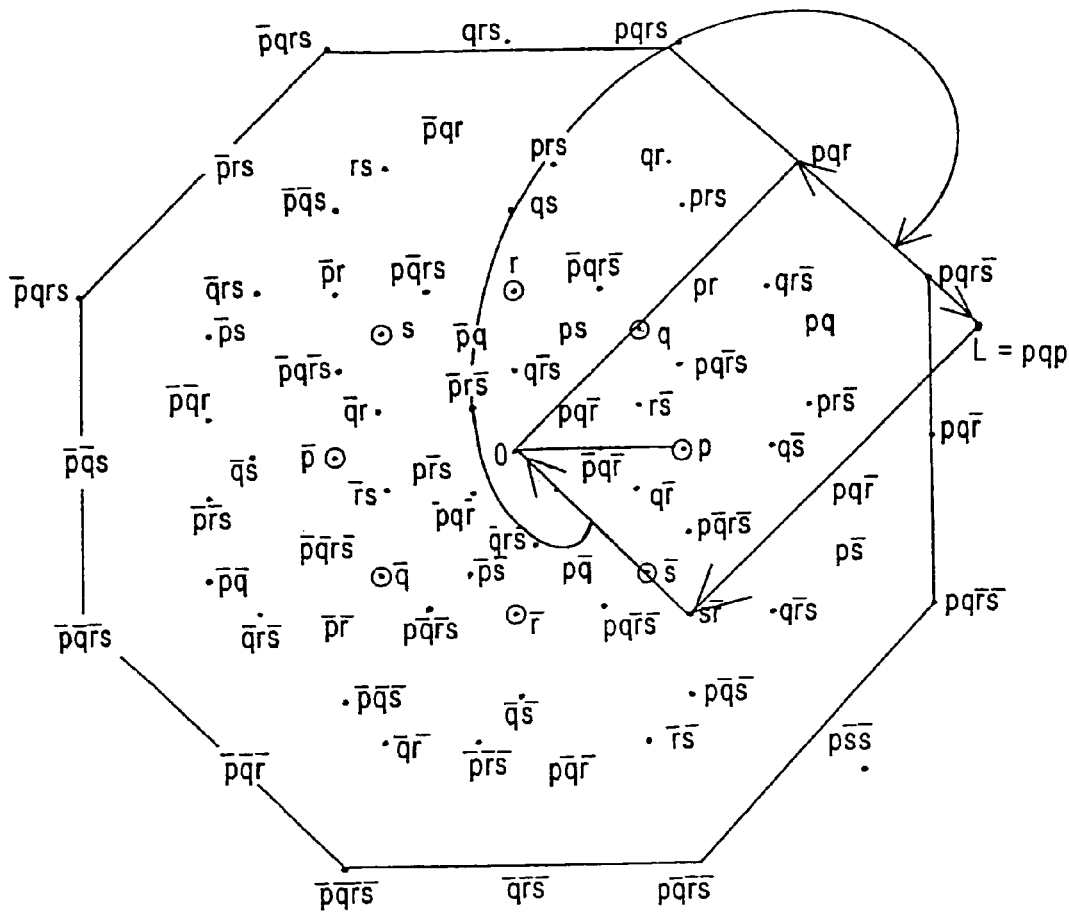
FIG. 24 illustrates an equivalence within the set of statements shown in FIG. 23.

As before, in FIG. 24, we first write in the parallelogram from 0 for the pair $pqr \vee p\overline{r}$. This gives an ℜ-point at pqp, and so from pqp we write in a pair of vectors to pqr and p $\overline{r}$. Now pqr implies pq, and is subsumed by it, and we can represent the subsumption rule here by drawing in the vector from pqr to pqp. FIG. 24 is now showing an equivalence between pqr and pq, but only in the presence of the p $\overline{r}$ in the alternational schema $pqr \vee p \overline{r}$, i.e. with the translated or "borrowed" vector $p\overline{r} \rightarrow 0$.

It is worth realizing that in the reductions in developed normal form, the implicands can be replaced by the implicant only because of the various biconditionals or double arrows at work. There is no intrinsic magic in the Φ-point. In the undeveloped examples, too, clauses do not disappear in a general way because pairs of disjuncts collapse into their implicants, but because of the presence of specific conditions elsewhere in the schema, which translated have the effect or creating biconditionals.

Finally, why is $pq\overline{s}$ superfluous in the example given in FIG. 23? The Answer is interesting and complicated, and principles about superfluity need to be established.

Figure 25:
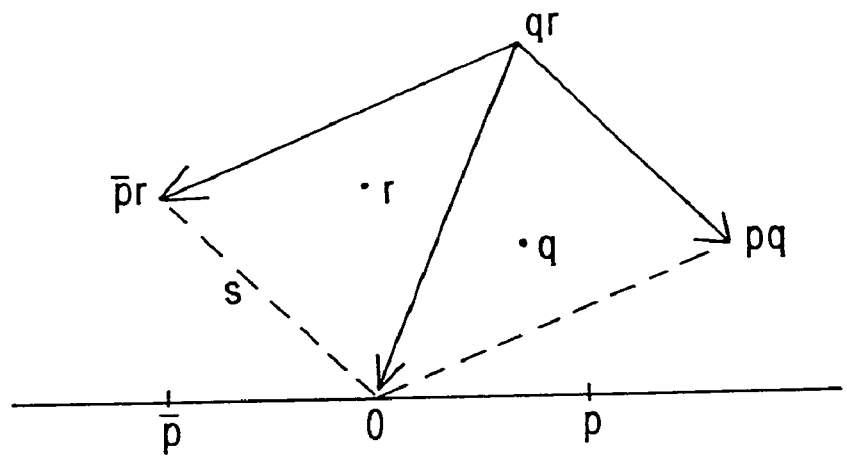
FIG. 25 illustrates the Consensus Theorem.
Figure 26:
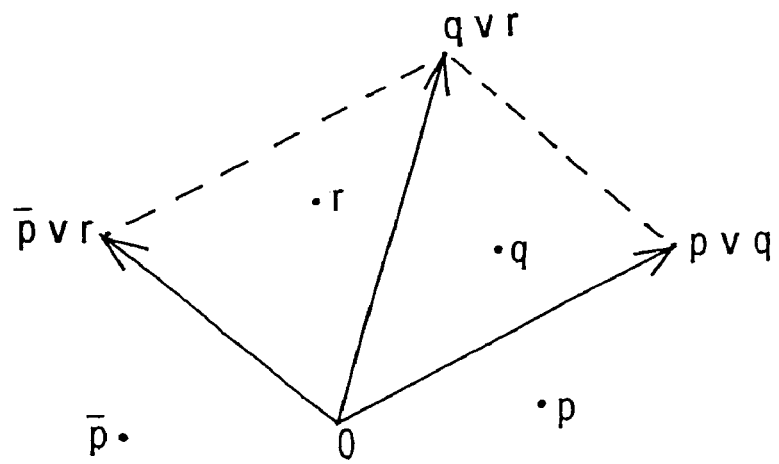
FIG. 26 illustrates the dual of the Consensus Theorem.

Take the truth, sometimes known as the Consensus Theorem, that $pq \vee p\overline{r} \vee qr. \leftrightarrow .pq \vee \overline{pr}$. Representing this in the ANS-space for p, q and r, we can see that the implicant qr is the resultant of the disjunction of pq and $\overline{pr}$ (FIG. 25). We can give it as a general truth that implicants, in the ANS-space, are resultants.

Let the left-hand side of the Consensus Theorem be represented as $$qp \vee \overline{pr} \vee qr$$

The Theorem says that the disjunct qr is superfluous. Consider the dual of the left-hand side of the Theorem, in the CNS-space. It is $$(q \vee p)(\overline{p} \vee r)(q \vee r)$$

This is the conjunction $(\overline{q} p)(p r)(\overline{q} r)$. But clearly the last conjunct is superfluous, as the first two conjuncts imply it by a hypothetical syllogism, in the sense that if they are true, so is it (FIG. 25).

It is nice to see the dual roles of conjunction and alternation, or ANS-and CNS-spaces, truth and falsehood, and how the concept of the resultant and the component binds them together.

In the following truth-table, we can that the (q r) resultant is so to speak "covered" by its component with respect to truth, in the ANS-space, and falsity in the CNS-space. That is, with the disjunctions in the ANS-space the addition of an extra truth on already true lines of the truth-table does not affect the truth of the whole schema. And similarly in the CNS-space, if the whole schema is already false, adding a false conjunct will not affect that result.

|   |   |   | ANS- |   |   |   |   | CNS- |   |   |
|---|---|---|------|---|---|---|---|------|---|---|
| p | q | r | qr | v | pq | v | $\overline{pr}$ | (q v p) | (p v r) | (q v r) |
| T | T | T | T |   | T |   |   |   | F |   |
| T | T | F |   |   | T |   |   |   |   |   |
| T | F | T |   |   |   |   |   |   |   |   |
| T | F | F |   |   |   |   |   |   | F | F |
| F | T | T | T |   |   |   | T |   |   |   |
| F | T | F |   |   |   |   |   |   |   |   |
| F | F | T |   |   |   |   | T | F |   |   |
| F | F | F |   |   |   |   |   | F |   | F |

We are now in a position to deal with the superfluity of pqs in Quine's example in FIG. 24. Disjunctive clauses in the ANS-space like $pq\overline{s}$ are superfluous when they are components. Before the representation of the schema $pqr \vee \overline{pqrs} \vee p\overline{r} \vee \overline{pr} \vee pq\overline{s}$ with a view to simplification, we can simply run a check to see if any of the clauses are implicants or iota-points for any others. We can easily find that pq $\overline{s} \rightarrow .pqr \vee \overline{pr}$ from the truth-table for the schema; all the lines on which $pq\overline{s}$ is true are also lines on which either pqr or p $\overline{r}$ is already true, and so $pq\overline{s}$ can be deleted from the schema to be simplified.

Figure 27:
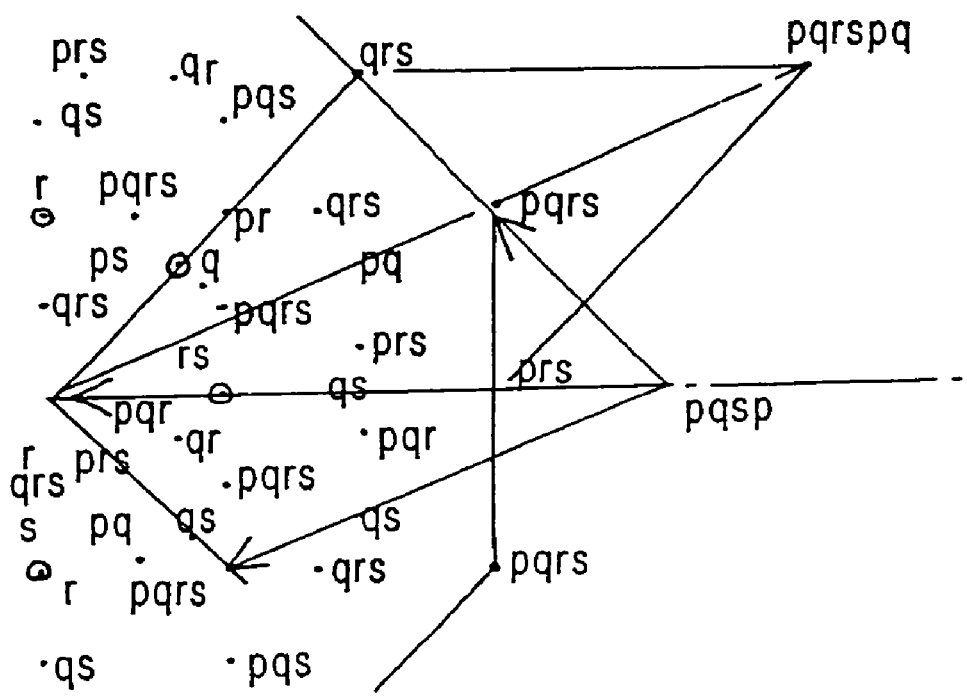
FIG. 27 illustrates a superfluity shown in FIG. 23.

Geometrically, the construction is as follows: (FIG. 27). Note that $pq\overline{s}$ extends to $pq\overline{s}p$. This is however the implicant for $\overline{pqrs} \vee p\overline{r}$. However, $\overline{pqrs}$ itself extends to $\overline{pqrs}pq$. This last schema is the implicant for $pqr \vee pq\overline{s}$. So $pq\overline{s}$ gives way to $p\overline{r} \vee \overline{pqrs}$. But $\overline{pqrs}$ can itself can be dropped in favor of $pqr \vee \overline{pqrs}$. Any line of the truth-table for pqr on which is true is also one which either pqr or $p\overline{r}$ is already true. Hence pq $\overline{s}$ can be dropped.

So for Quine's example in FIG. 23 we are left with the four possibilities:

These examples, and others like them, suggest the possibility of further applications of simplifying geometrical theorems and methods to the simplification problem.

The charm of a vector simplification technique is that is follows a least-action principle, for any number of propositional vectors, in the sense that the problem is not one of finding shortest equivalents to truth-functional schemata. Rather the space, inasmuch as it is fixed vector space in which all free vectors having the same direction are in a sense the same directional vector, is unable not to give the desired result.

As to propositional logic as whole, it is nice to have all of the nineteen or however many clanking "rules of inference" within the space, so that there is just the one intuitively obvious method of argument: vector addition. It is really absurd to think of empty or "formal" rules such as association and communication as having the same status as say modus tollens, which is genuine "motor" that advances arguments through logical space. Association and commutation should flow out of the nature of the logical space, and in the vector space they do. The vectors p v q and q v p, for example, have the same end-point, though they arrive at it by different but corresponding routes.

Part III (i) Electrical and Integrated Circuit Minimization

Let us now see how the techniques described can be used in a routine for simplifying electrical and integrated circuits. Take the target circuit ABC+A$\overline{C}$+AB$\overline{D}$+$\overline{A}$C+$\overline{ABCD}$ (FIG. 28).

Figure 29:
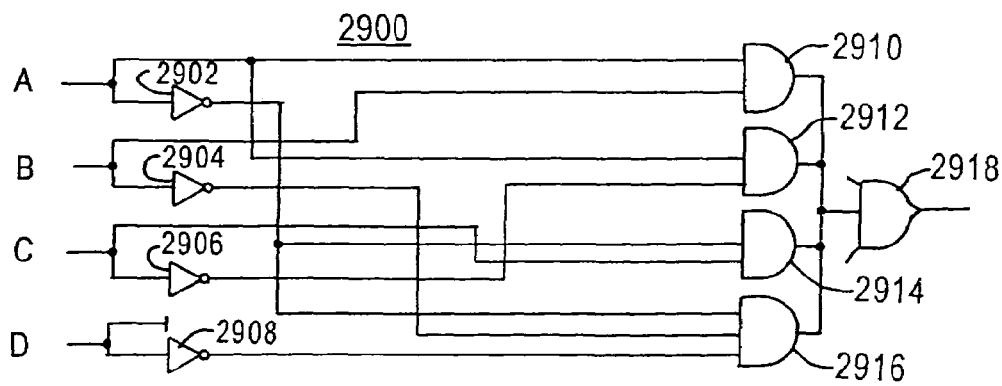
FIG. 29 shows a simplest circuit equivalent to the target circuit.

The first job is to plot this in the ANS-space as the set of vectors pqr v p$\overline{r}$ v pq$\overline{s}$ v $\overline{p}$r v $\overline{pqrs}$, as in FIG. 23 above. Following the above-discussed general simplification procedure, in the ANS-space, we can simplify this system of vectors to e.g., pq v $\overline{p}$r v pr v $\overline{pqs}$. The resultant schema can then be translated into the circuit diagram AB+A$\overline{C}$+$\overline{A}$C+$\overline{ABD}$, as illustrated in FIG. 29.

Figure 28:
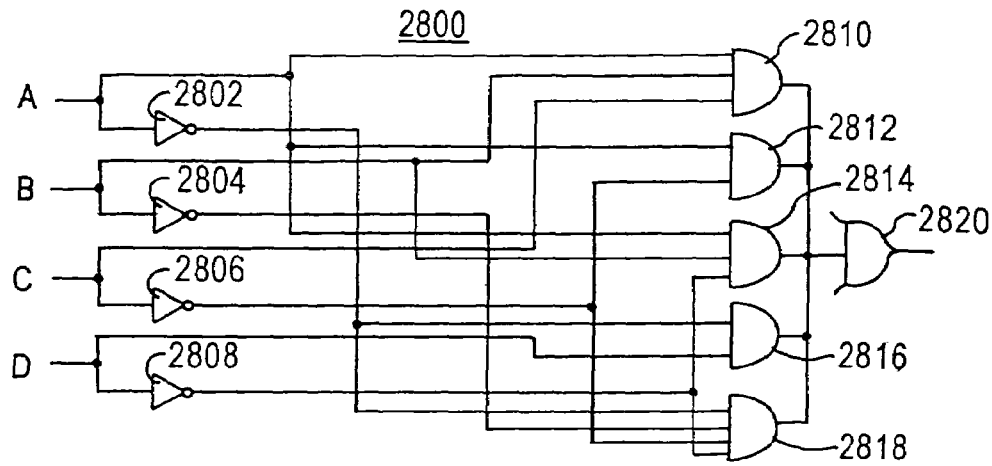
FIG. 28 illustrates a target circuit to be simplified in accordance with the invention.

Note that the target circuit, as illustrated in FIG. 28, has five gates (G=5), that the total number of inputs into these gates is twelve (I=12), and that the redundancy factor (i.e., the number of times an original input is used again, corresponding to the join dots) is seven (R=7). These figures drop to G=4, I=9 and, most importantly, R=2 for the simpler circuit, as illustrated in FIG. 29, representing corresponding gains in materials savings, speed and reliability.

(ii) Free Space Optical Computation

More than ten years ago the National Academy of Sciences Panel on Photonics Science and Technology Assessment declared that 'The ultimate benefit of photonic processing could occur if practical optical logic could be developed' (Whinnery et. al., *Photonics*, 1988, p. 35). So far the implied challenge of the Panel has not been met.

Vector manipulation has been one of the big success stories for optical computation, but vector techniques themselves promise an application to the logic of optical computation as a whole. The full ANS-/CNS-space could be built as an optical device for checking the validity of arguments or as a logic device for optical computation, and also as simplification machine. Each operation in the space is a laser, and the resultant proposition-points such as p and pq and pqr are multifaceted beamsplitters or mirrors which reflect the beams in the correct logical directions at the correct logical strengths to ensure the required implications.

Figure 30:
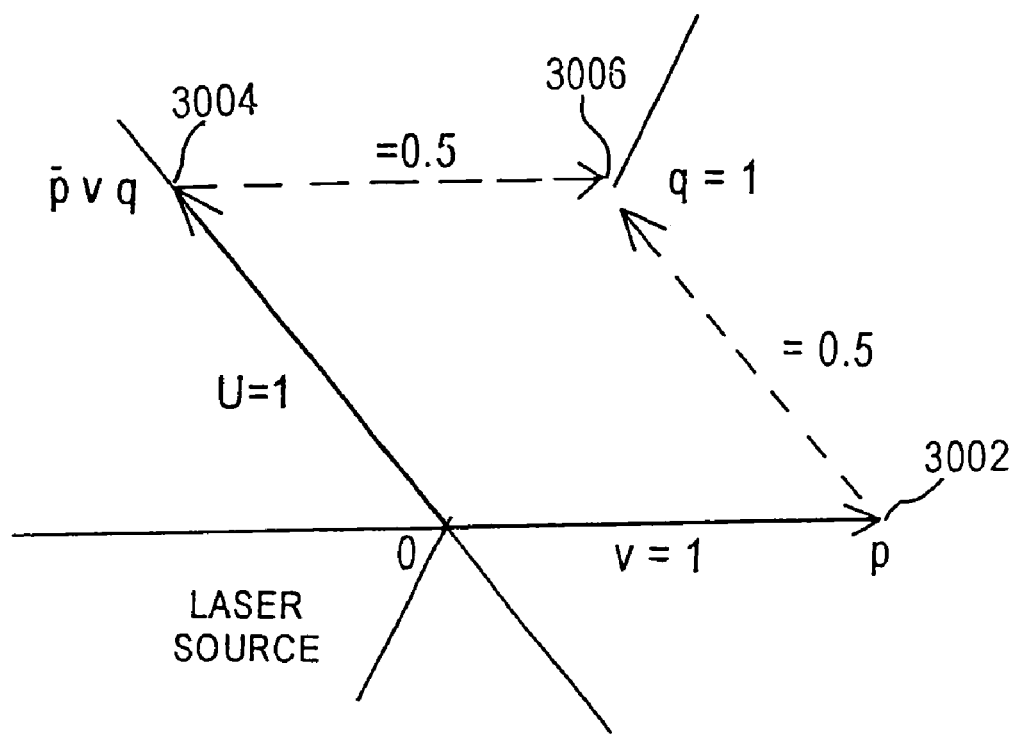
FIG. 30 is an illustration of optical computation of modus ponens.

Thus in FIG. 30 a beam V can be sent from the origin to a half-darkening beamsplitting mirror at the node p. At p it is split and sent at half-strength to q, and to $\overline{q}$. Simultaneously, a second beam U from 0 is sent to the node $\overline{p}$ v q, which is also p→q. At this point U is split and sent at half-strength to $\overline{p}$ and to q. The proposition p is said to "half-imply" q, in the sense that with one other proposition it does imply q, and the proposition $\overline{p}$ v q is said to "half-imply" q in the sense that with one other proposition (p) it does imply q.

Both half-implication beams are coincident on q, and at q the photoreceptor gives a reading of 0.5+0.5 or 1. The system has optically computed modus ponens; from an input of p and an input of $\overline{p}$ v q, it has yielded up q. The system gives a physical interpretation of beamsplitting as multiple implication and of darkening as fractional implication.

The same principles will apply to the other rules of inference and logical equivalences.

Figure 31:
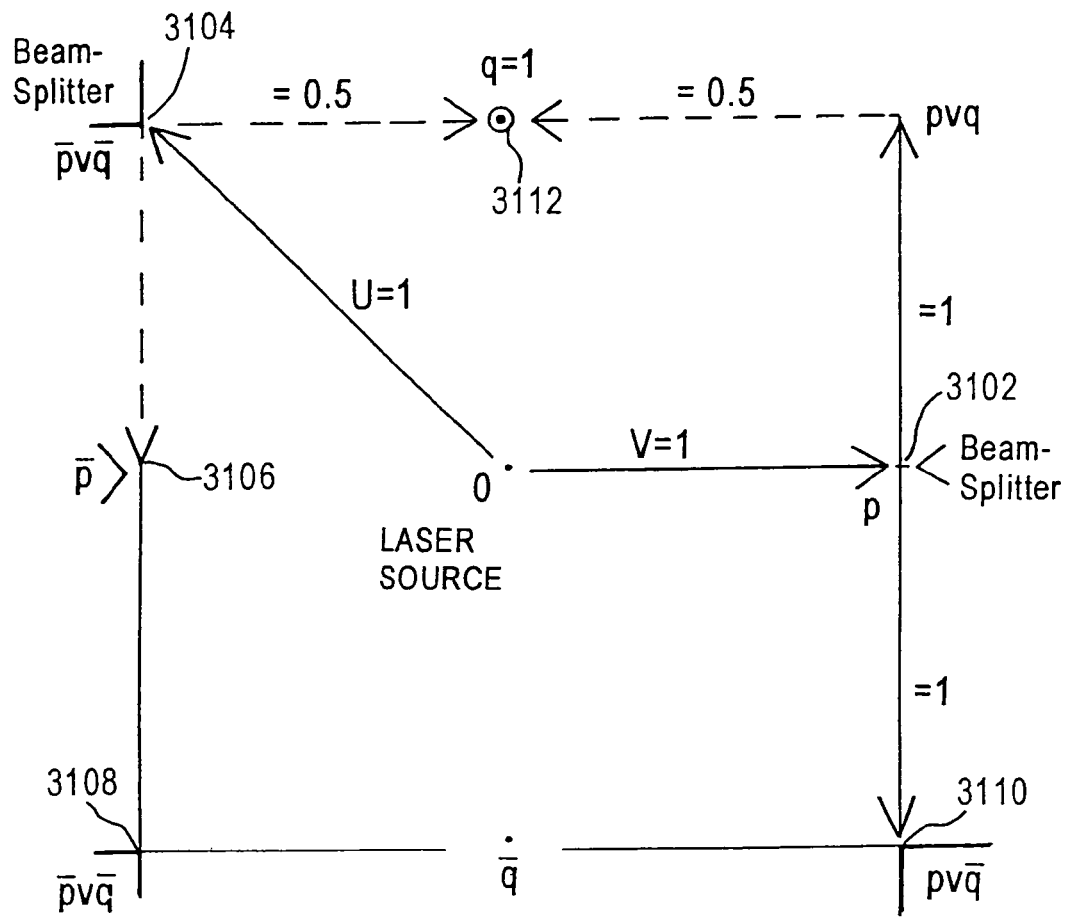
FIG. 31 is an illustration of interferometric processing for modus ponens.

A development of the system given for modus ponens in FIG. 30 obviates the need for a free beam for e.g., p to q, and simplifies the design of the node. In FIG. 31, the beam to p is split, at full-strength, to p's implicants, which are p v q and $\overline{p}$ v q (ignoring tautologies). The beamsplitter at $\overline{p}$ v q itself directs the beam to q at only half-strength, and the desired computation is achieved.

Figure 32:
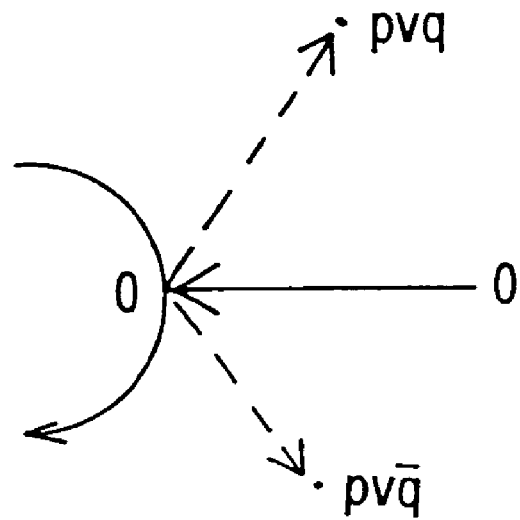
FIG. 32 illustrates an optical element used for disconjunction and conjunction in a free-space optical processing.
Figure 32:
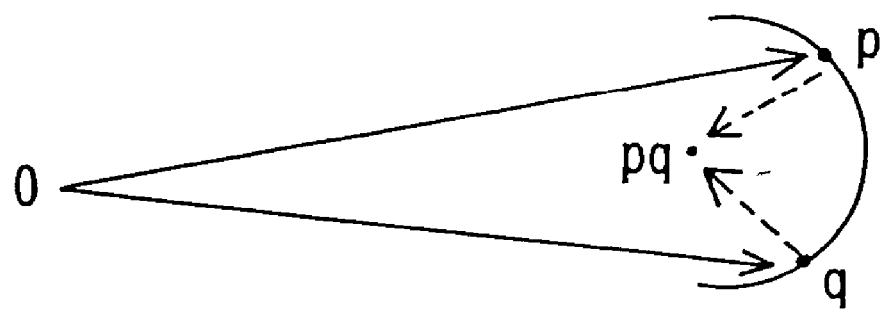

We can also arrange that in an embodiment of the uninterpreted (p, q, . . . n) space, in which the base (p,q) is either p v q or pq (though not both), configurations of the beamsplitters will allow the node to switch between the two states. A conjunctional state will correspond to a concave configuration, as exemplified in FIG. 32A. In FIG. 32A, both inputs are required for the activation of the node. An alternational state will correspond to a convex configuration, as shown in FIG. 32B.

(iii) "Flat" Optical Processing

Figure 34:
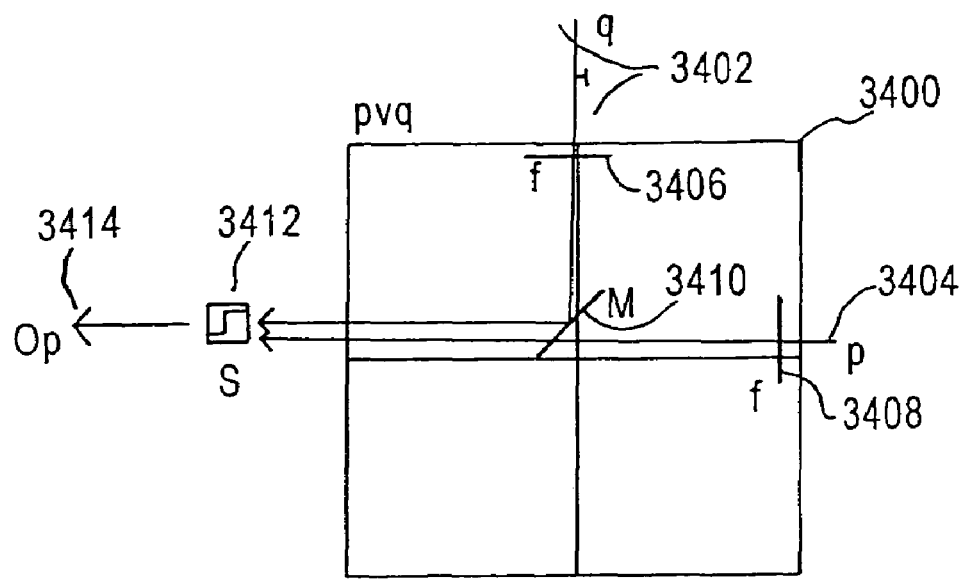
FIG. 34 is an exemplary optical AND-Gate in accordance with the present invention.
Figure 35:
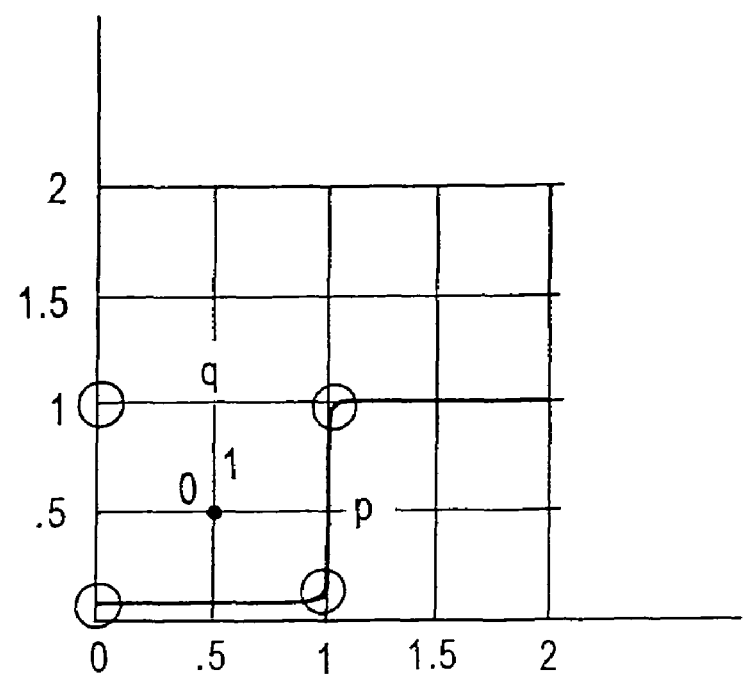
FIG. 35 illustrates the Sigmoid Characteristic for an AND-Filter in accordance with the present invention.

An exemplary implementation of flat optical processing is illustrated in FIG. 34. Each position vector of cell 3400 is a laser source, p, q, etc. An input beam 3404 is sent from p to a combiner 3410 at O, and the same for a second beam 3402 from the q direction. Intensity filters 3406 and 3408 cut down the light from each source to half. The angle of the combiner 3410 is set so that both of the now half-strength beams are coincident on the output in the (arbitrarily chosen)–p direction. At the output there is an optical filter 3412 with a sigmoid characteristic so that if the intensity of the beams is one or greater (no greater than two), then the output is one, and if the input is less than one then the output is zero, as illustrated in FIG. 35. Finally, at the output point there is a photoreceptor 3414, which announces that the two half-strength beams have converged on q for a value of 1. This system will be optically on iff p and q are input. Since this implementation, acts as pq or an AND-gate, the output beam can be used as a new p or input for subsequent computations.

Figure 36:
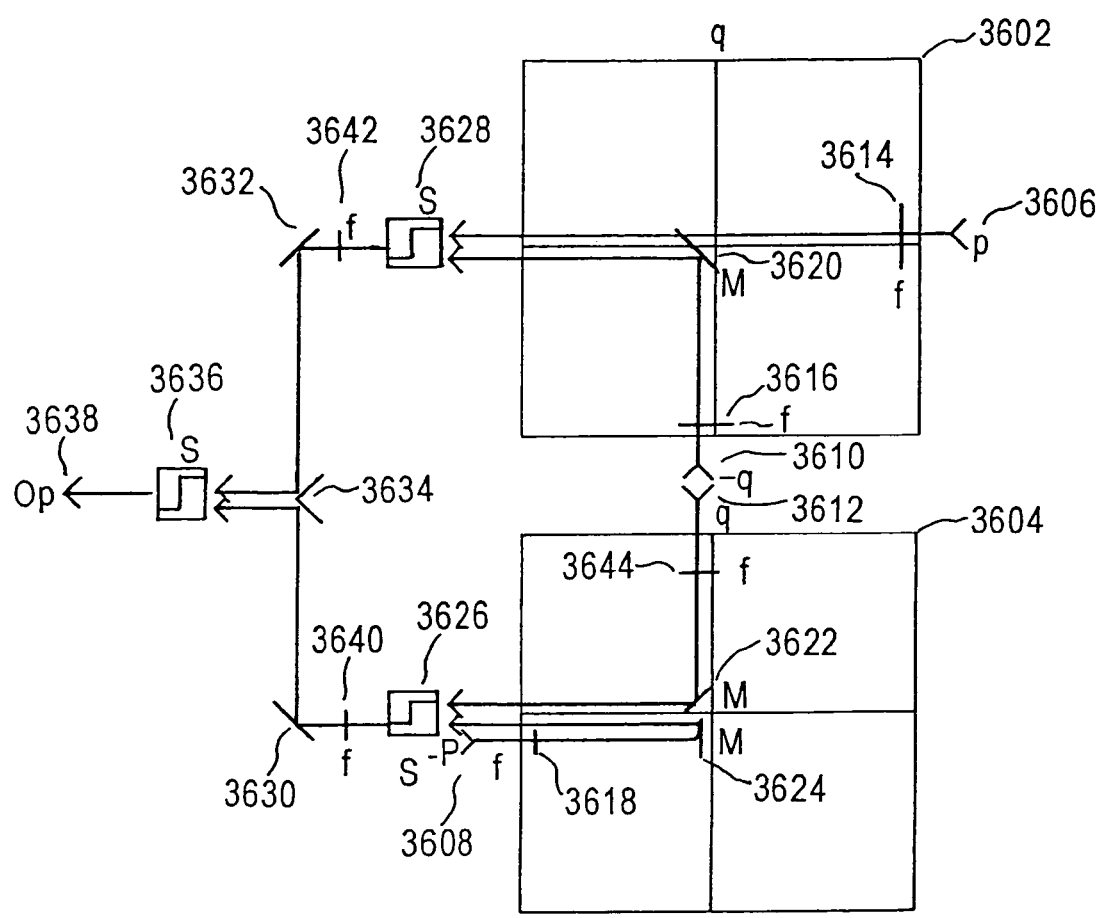
FIG. 36 is an exemplary optical XOR-Gate in accordance with the present invention.

So far what has been described is a single gate. Gates of this type can be combined, however, using the sigmoid-characteristic filter to control the output. Take next an XOR-function representing the logical schema p–q v –pq. In this case we can combine a p–q-gate with a –pq-gate, as in FIG. 36. Cell 3602 includes two input beams 3606 and 3610 at p and –q respectively. Both input beams are passed through respective intensity filters 3614 and 3616 in order to attenuate the signal in half. Both input beams are then combined at combiner 3620 and directed to sigmoid filter 3628. Cell 3604 includes two input beams 3608 and 3612 at –p and q respectively. Both input beams are passed through respective intensity filters 3618 and 3644 in order to attenuate the signal in half Both input beams q and –p are then directed to sigmoid filter 3626 by mirrors 3622 and 3624 respectively. The outputs from each sigmoid filter 3628 and 3626 pass through respective intensity filters 3642 and 3640 in order to attenuate the signals in half. The attenuated beams are then directed to sigmoid filter 3636 via mirrors 3630, 3632, and 3634. The output of sigmoid filter 3636 is detected by photodetector 3638. These gates can of course be further combined for example to yield an optical analogs of other integrated circuits, e.g. IC 74266, which is entirely composed of XOR-gates.

Figure 37:
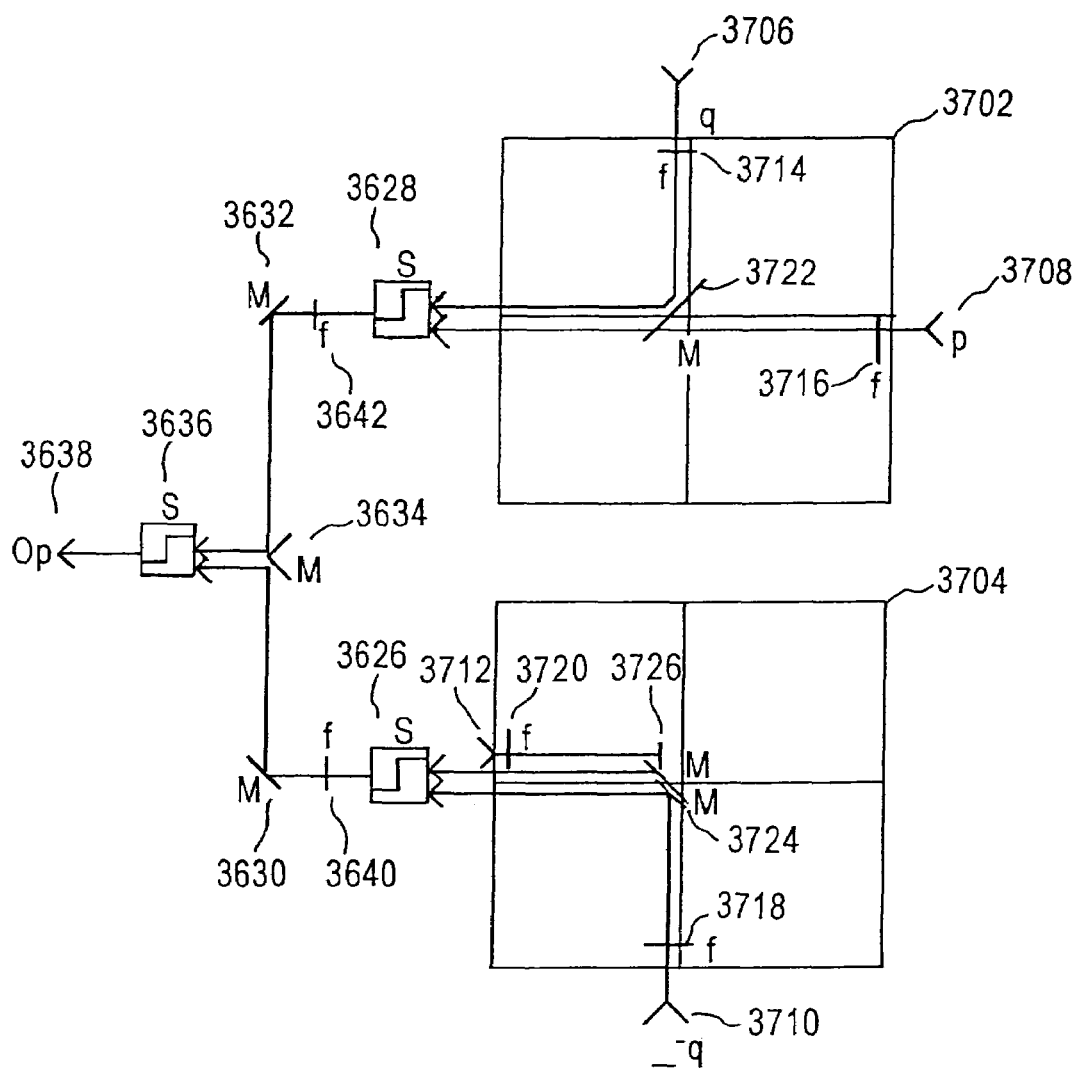
FIG. 37 is an exemplary optical XNOR-Gate in accordance with the present invention.

The XNOR-gate can be similarly represented, for example as a combination of a pq-gate and a −p−q-gate as illustrating in FIG. 37. Cell 3702 includes two input beams 3706 and 3708 at q and p respectively. Both input beams are passed through respective intensity filters 3714 and 3716 in order to attenuate the signal in half. Both input beams are then combined at combiner 3722 and directed to sigmoid filter 3628. Cell 3704 includes two input beams 3710 and 3712 at −q and −p respectively. Both input beams are passed through respective intensity filters 3718 and 3720 in order to attenuate the signal in half. Both input beams −q and −p are then directed to sigmoid filter 3626 by mirrors 3726 and 3724 respectively. The outputs from each sigmoid filter 3628 and 3626 pass through respective intensity filters 3642 and 3640 respectively in order to attenuate the signals in half. The attenuated beams are then directed to sigmoid filter 3636 via mirrors 3630, 3632, and 3634. The output of sigmoid filter 3636 is detected by photodetector 3638.

Figure 38:
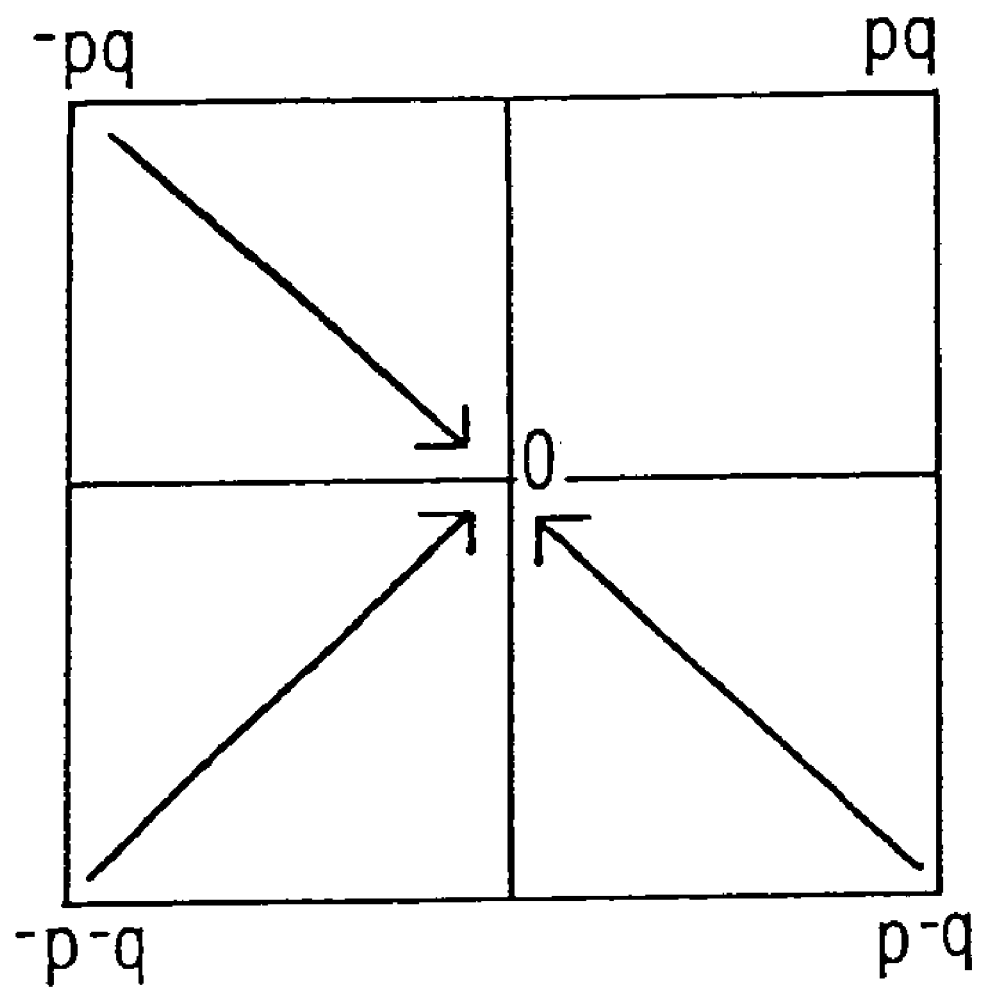
FIG. 38 is vector representation of an exemplary optical NAND-Gate in accordance with the present invention.

The NAND- or −(pq)-gate is more complicated in an interesting way. It consists of the three cells that represent those three lines of the truth-table which negate the pq line. In the vector representation −(pq) or (by De Morgan's Theorem −p v−q) is given as illustrated in FIG. 38.

Figure 39:
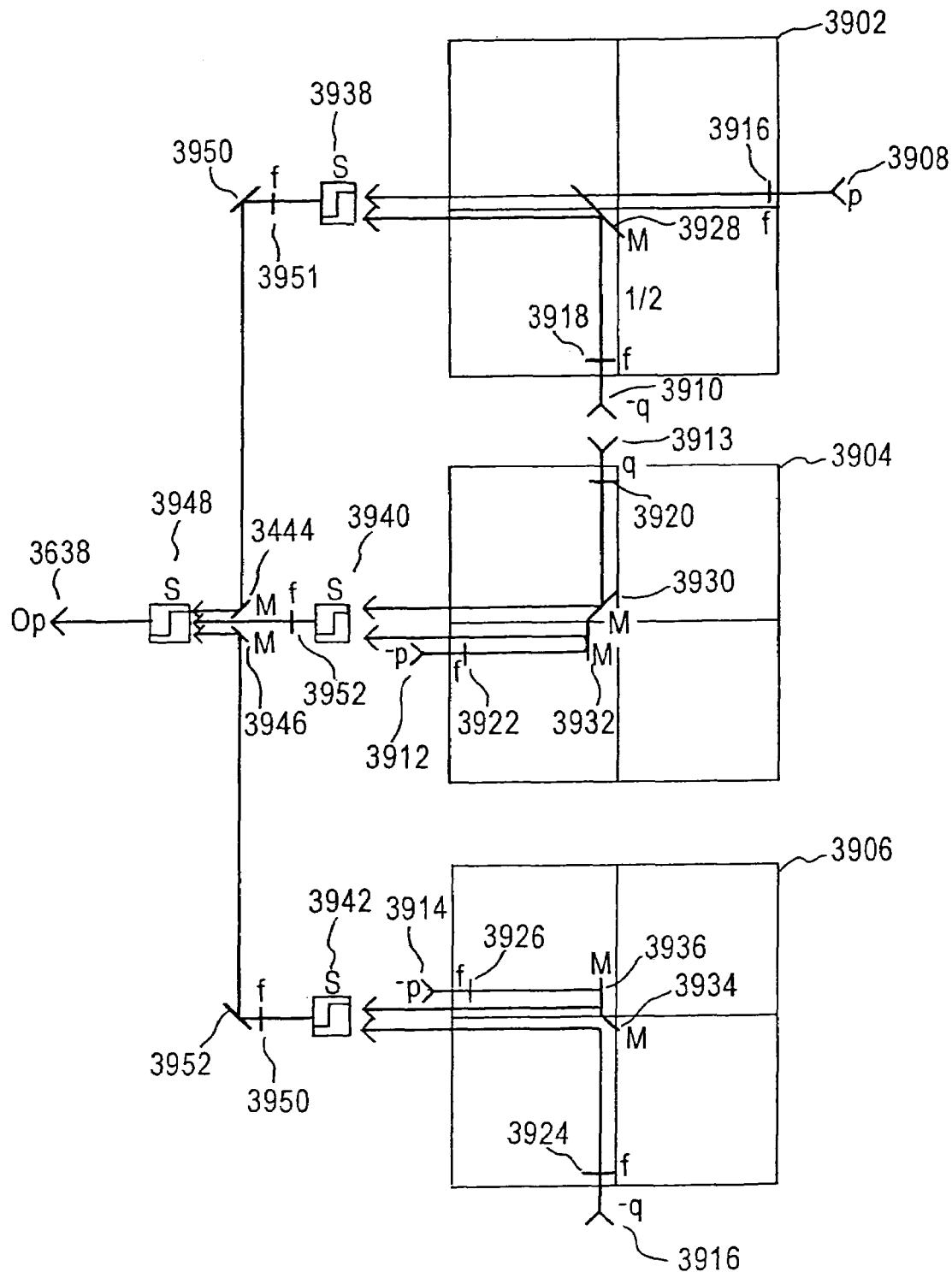
FIG. 39 is an exemplary optical NAND-Gate in accordance with the present invention.

The optical implementation of −p v−q is illustrated in FIG. 39, the NAND-gate, which consists of three cells plus filters. Cell 3902 includes two input beams 3908 and 3910 at p and −q respectively. Both input beams are passed through respective intensity filters 3916 and 3918 in order to attenuate the signal in half. Both input beams are then combined at combiner 3928 and directed to sigmoid filter 3938. Cell 3904 includes two input beams 3912 and 3913 at −p and q respectively. Both input beams are passed through respective intensity filters 3922 and 3920 in order to attenuate the signal in half. Both input beams q and −p are then directed to sigmoid filter 3940 by mirrors 3930 and 3932 respectively. Cell 3906 includes two input beams 3914 and 3916 at −p and −q respectively. Both input beams are passed through respective intensity filters 3926 and 3924 in order to attenuate the signal in half. Both input beams −q and −p are then directed to sigmoid filter 3942 by mirrors 3936 and 3934 respectively. The outputs from each sigmoid filter 3938, 3940, and 3942 pass through respective intensity filters 3954, 3952, and 3640 respectively in order to attenuate the signals by ⅓. The attenuated beams are then directed to sigmoid filter 3948 via mirrors 3950, 3944, 3946 and 3952. The output of sigmoid filter 3948 is detected by photodetector 3638.

Figure 40:
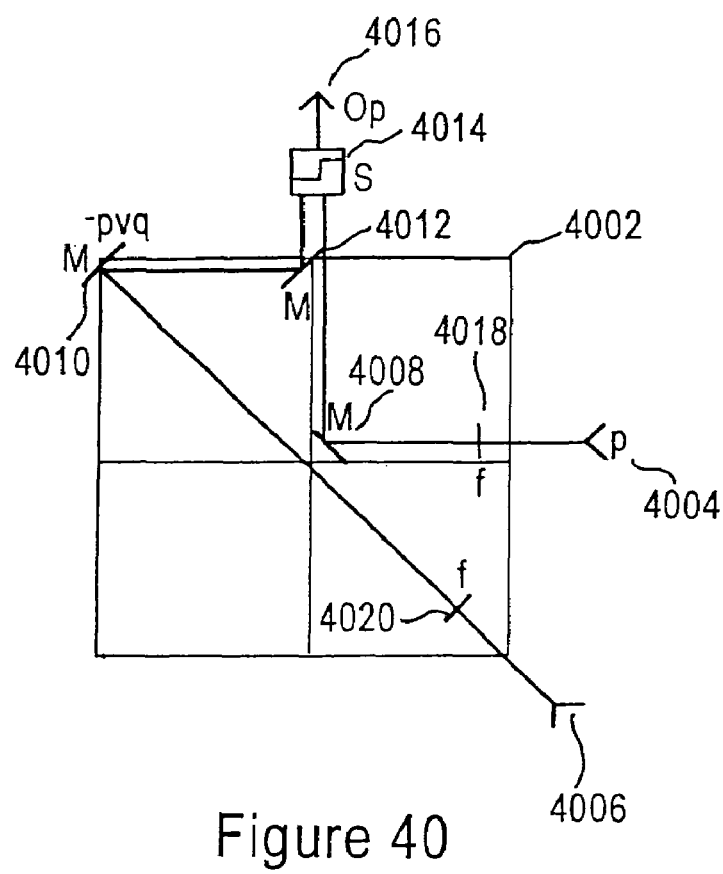
FIG. 40 illustrates an exemplary implementation of an exemplary CNS-cell in accordance with the present invention.
Figure 41:
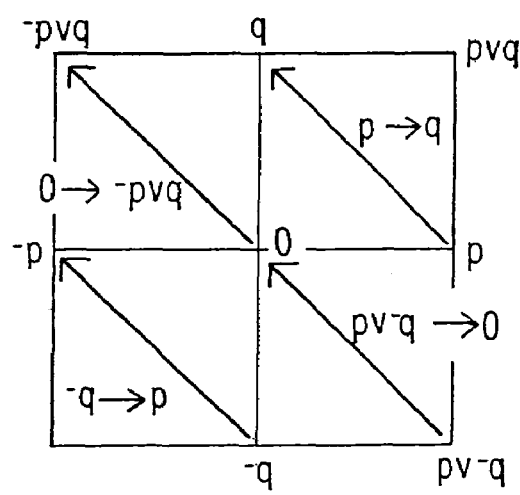
FIG. 41 is a chart of vector logical equivalents of "If p then q".

It is also easy to use the same techniques in the SOP—or Conjunctional Normal Form. Modus Ponens states that if 'If p then q' and 'p' then 'q'. As illustrated in FIG. 40, a CNS-cell will produce the output q if the inputs are p v −q and p. Cell 4002 includes two input beams 4004 and 4006 at p and p v −q respectively. Both input beams are passed through respective intensity filters 4018 and 4020 in order to attenuate the signal in half. Both input p is then directed to sigmoid filter 4014 by mirror 4008, whereas input p v −q is directed to sigmoid filter 4014 by mirror 4010 and combiner 4012. The output of sigmoid filter 4014 is detected by photodetector 4016. As illustrated in FIG. 41, for p→q has as translated or logically equivalent forms O→−p v q and p v −q→O.

Figure 33:
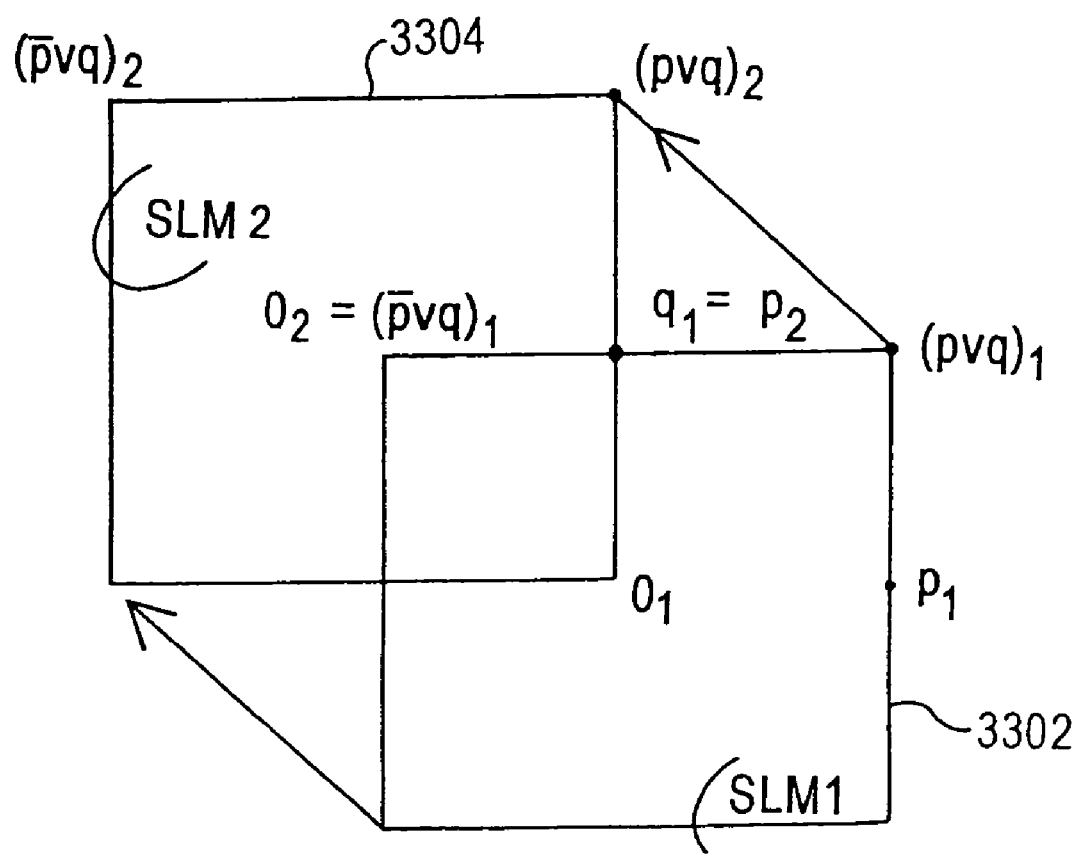
FIG. 33 is an illustration of flat optical processing.

A second method of exploiting the vector system for computation is more markedly spatial. Represent the propositions in the uninterpreted (p,q) space with spatial light modifiers (SLMs). When the first premise is input, e.g. $\bar{p}$ v q, then the origin 0, and with it the position of the whole space, are moved to the point $\bar{p}$ v q, or in a $\bar{p}$ v q direction. We could say the 0 becomes $\bar{p}$ v q, so that we are now in a $\bar{p}$ v q environment, a $\bar{p}$ v q world. Then p in the second SLM (FIG. 33) will be q, and we have modus ponens. And when the whole space is displaced in a $\bar{p}$ v q direction, q is p!

Figure 42:
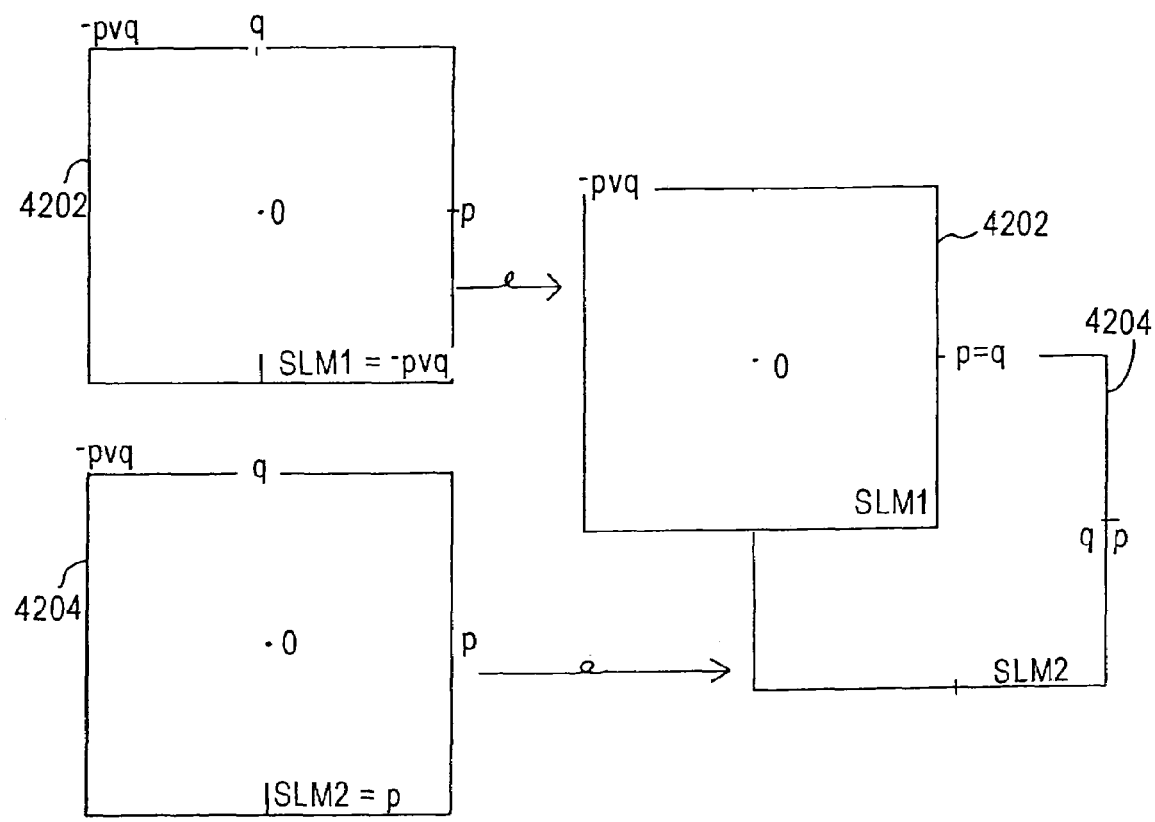
FIG. 42 shows a computation of modus ponens using SLM implementation.
Figure 43:
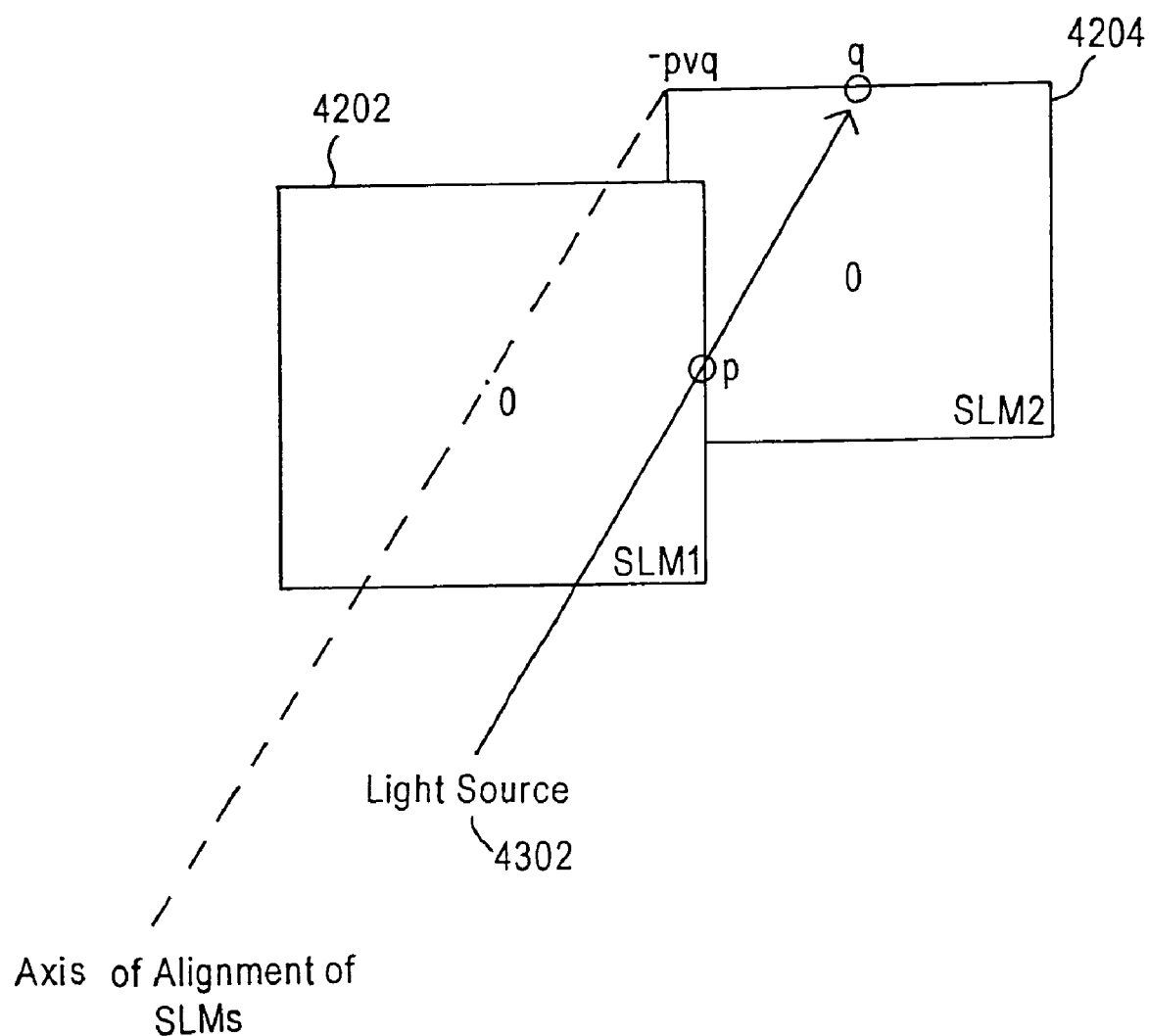
FIG. 43 is a view of an SLM device embodying the functionality shown in FIG. 42.
Figure 44:
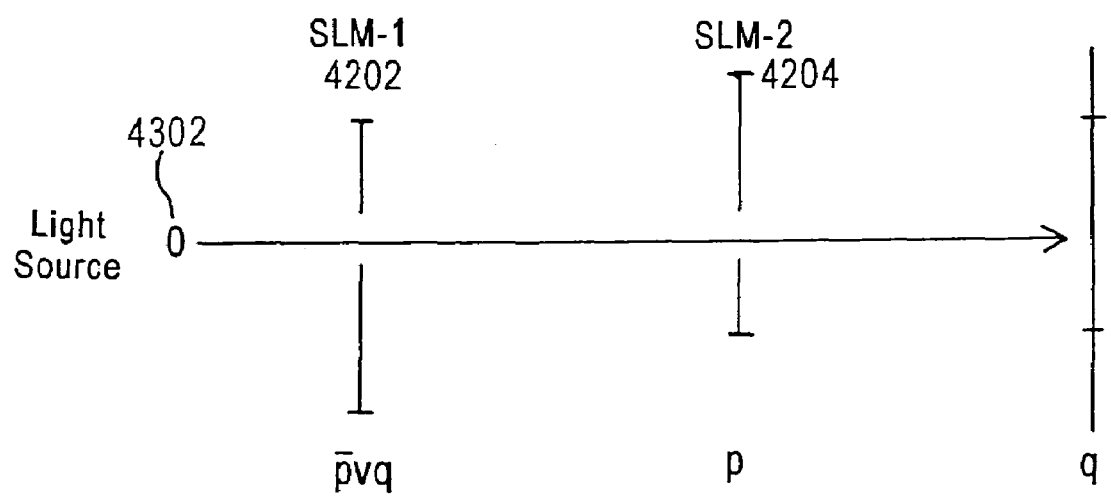
FIG. 44 is an illustration of the same vector addition utilizing sequences of SLMs.

A second method of exploiting the vector logical characteristics of light is more markedly spatial. The premises or inputs can be represented in the CNS-space as spatial light modifiers. For example, let there be two modifiers 4202 and 4204, which represent the whole CNS-space for two variables p and q as illustrated in FIG. 42A. The origin of the first modifier 4202, representing −p v q, is aligned with the second modifier 4204, so that the origin 4202 is at −p v q on 4204, as illustrated in FIG. 42B. This represents a −p v q shift within 4204. We can say that if O becomes −p v q, then p becomes q, or even that when we are in a −p v q environment p is q. FIG. 43 shows an oblique view of the two SLMs in sequence in combination with a light source 4302, whereas FIG. 44 shows a side view. As illustrated in FIG. 43, light source 4302 incident on p on first modifier 4202 yielding q on the second modifier 4204. It is as if we are asking: if O is −p v q, what is p? The answer computed is: q. The results of the vector logic system for propositional logic show that this implementation technique can be used for all the rules of argument, and for any number of variables.

(iv) Colorimetric Processing

Colored laser beams can be used so that the refractive angle is built into the vector rather than into the propositional nodes as the CIE (Commission Internationale de l'Eclairage) x-y chromaticity diagram (a color mixing diagram) is itself a vector space. (Further a mixed system of colored laser and colored mirrors could be used. Optical computation for simplification may then merely include the colorimetric process of additive color mixing. For example, in the CNS-space, let p be red (R), $\bar{p}$ a complementary cyan blue-green (C), q a yellow (Y), $\bar{q}$ a complementary blue (B), p v q yellow-red (YR) and $\bar{p}$ v q blue-red (BR). Also $\bar{p}$ v $\bar{q}$ is the complementary of YR, a cyan blue.

The contradiction of 0 (the so-called "Nullpunkt", or "white") corresponds to the addition of complementary hues. For example, YR+BR=R, since Y and B are complementary.

Figure 45:
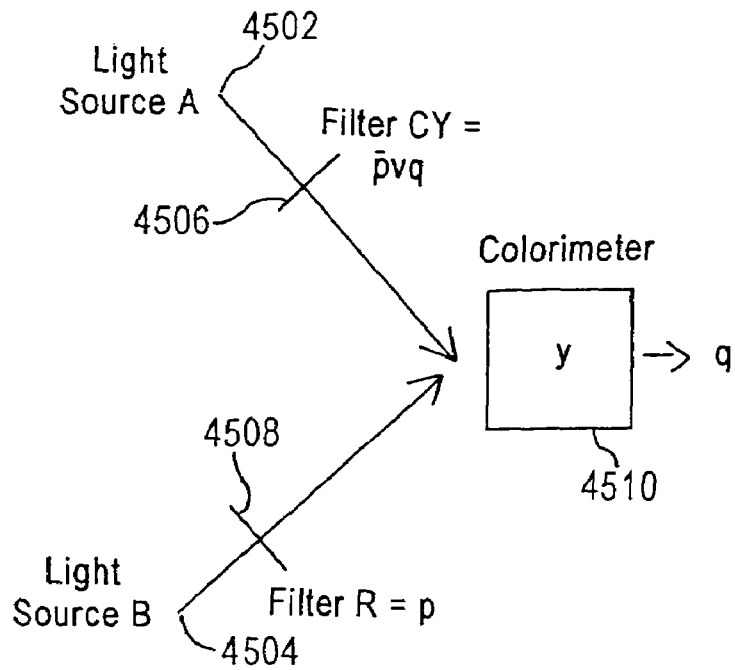
FIG. 45 is an illustration of colorimetric computation of modus ponens.

With these colorimetric assignments we can compute modus ponens and the other rules of argument and truth-preserving substitutions. For example, as illustrated in FIG. 45, if proposition p is R from a light source 4504 that passes through a red filter 4508, and if proposition $\bar{p}$ v q is CY from a light source 4502 that passes through a CY filter 4506, and if q is Y, from colorimiter 4510, then p→q, or $\bar{p}$ v q, is CY. Together with R this give Y or q, as C and R are complementaries.

Figure 46:
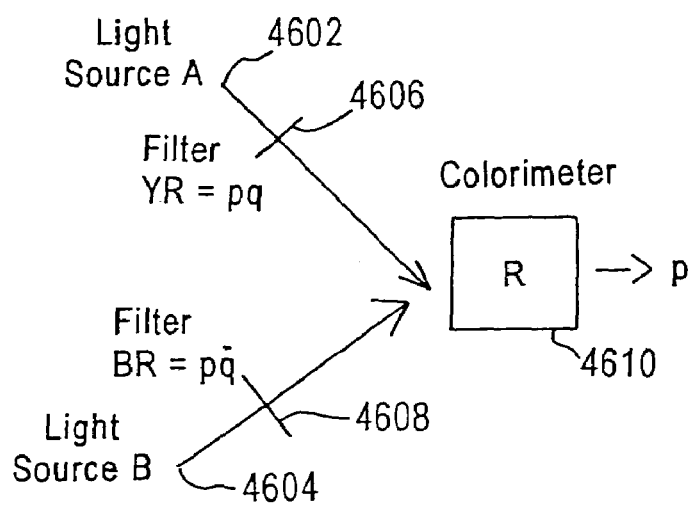
FIG. 46 is a colorimetric simplification of pq v $p\bar{q}$.

In the ANS-space we can perform simplifications colorimetrically. For example, in FIG. 46, exemplifies a basic simplification in which pq v p$\bar{q}$ is equivalent to p. Let YR, from yellow-red filter 4606, represent pq, and BR, from blue-red filter 4608, represent p$\bar{q}$. The Y and B portions of the beams cancel at colorimiter 4610 because they are compliments, leaving RR or R, which is pp or p.

Figure 47:
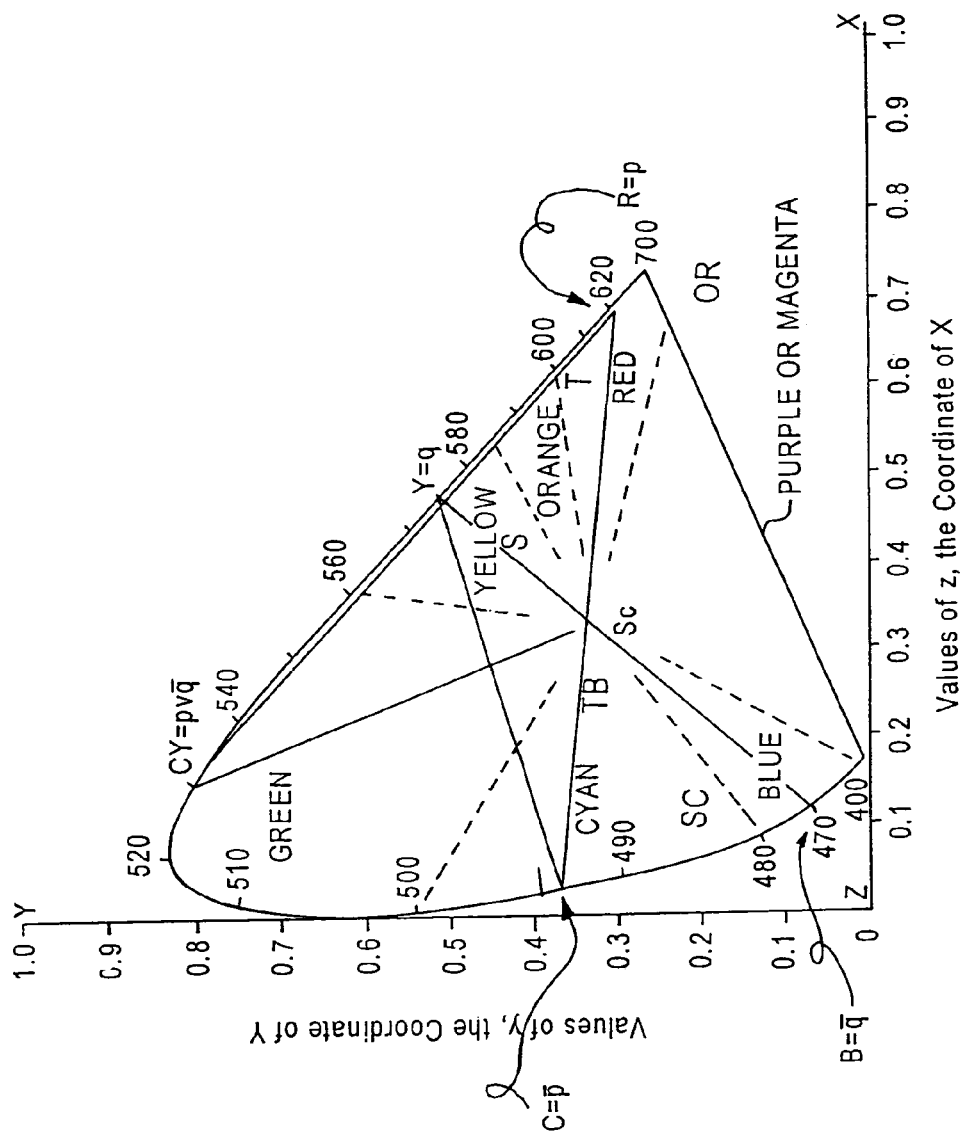
FIG. 47 shows the colorimetric vector space.

The CIE xY chromaticity chart, for example as illustrated in FIG. 47, is a vector space. If colored beams are used for V, U, W . . . N, the rules of vector addition, subtraction and displacement in the color space represent the CNS or ANS-space. Logic operations then become the rules of colorimetry.

Figure 48:
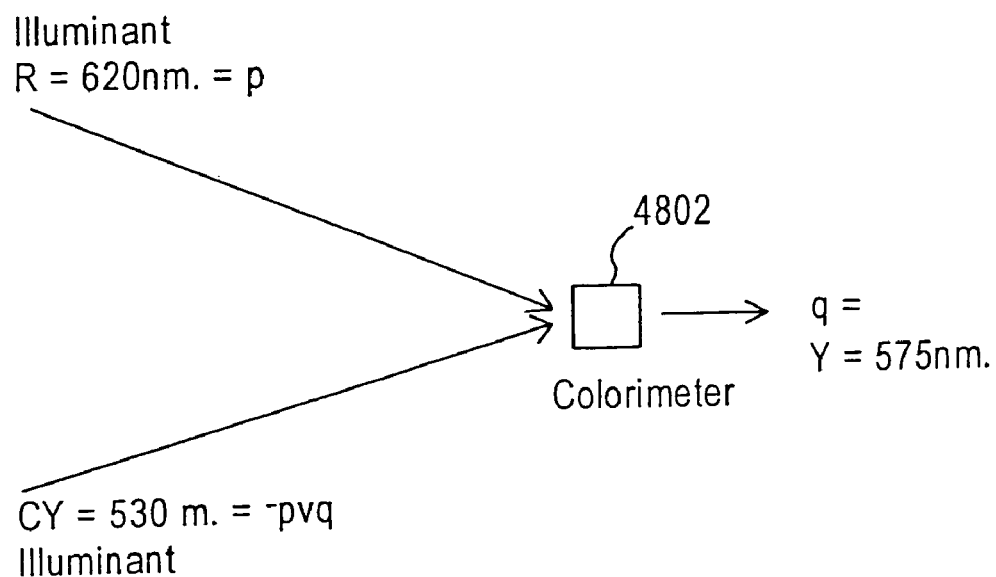
FIG. 48 is an illustration of the simple colorimetric sum device.

For example, let p be red (R), say 620 nm., p a complementary cyan (C) at 494 nm., q a yellow (Y) at 575 nm., and q a blue (B), complementary to Y, at 470 nm. Then, working in the CNS-space with these hue assignments, we can compute modus ponens colorimetrically, for example as illustrated in FIG. 48. The addition of p or R, for example 620 nm., and –p v q or CY, for example having a dominant wavelength around 530 nm., with colorimeter 4802 is the yellow Y of 575 nm.: q. The "tautology" at white (W) is the addition of complementary hues.

In the ANS-space black is the contradiction. With complementaries in the ANS-space' . . . what is offered, so to speak, by one [reflection] spectrum (or colour) is withdrawn by the other, so that the result is a vanishing of colour, just as in the contradiction between two propositions which negate one another the result is a vanishing of information' (Jonathan Westphal, *Colour*, Oxford, Blackwell, 2nd. ed., 1991, p. 108).

Figure 49:
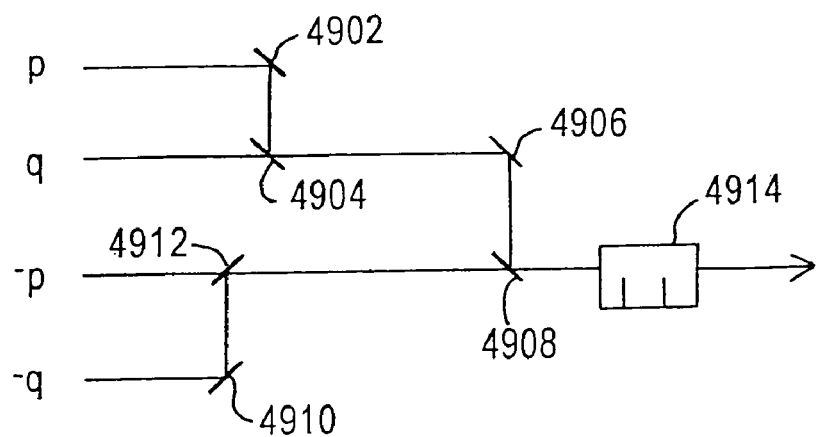
FIG. 49 is an elaboration of the device shown in FIG. 48.
Figure 50:
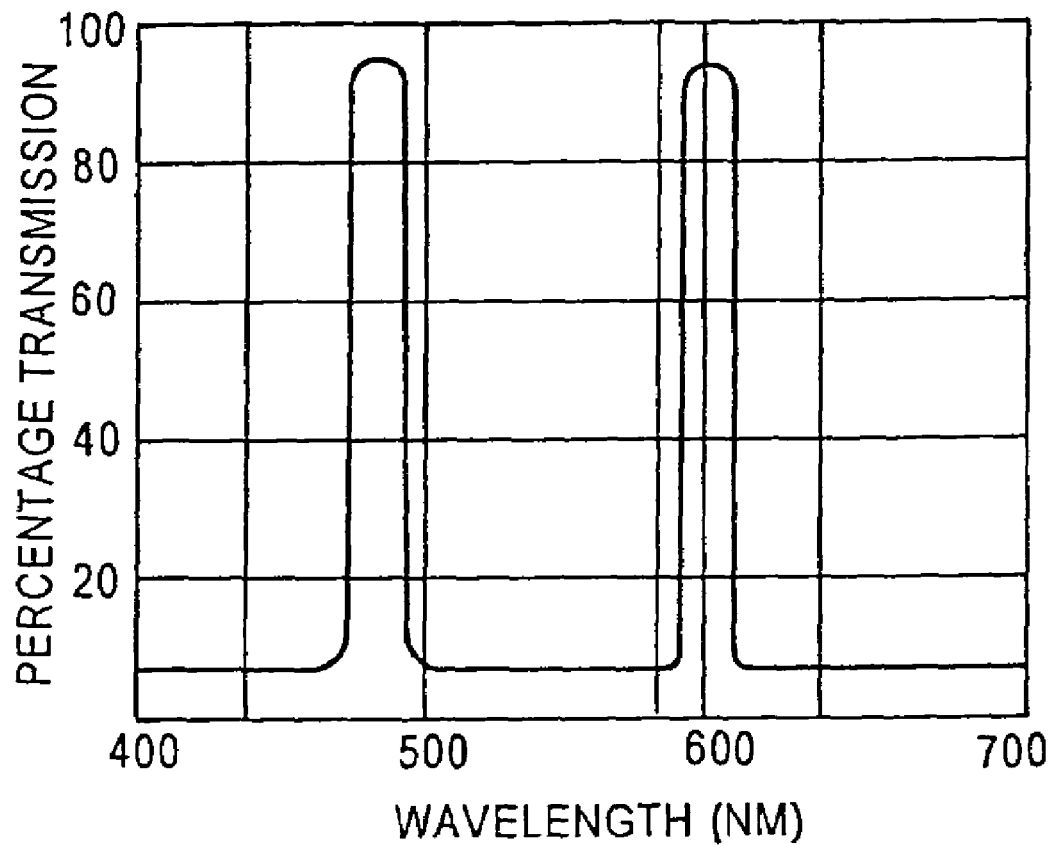
FIG. 50 shows the wavelength bands of the filter for the device shown in FIG. 49.

In the ANS-space we can perform exactly parallel computations colorimetrically, in particular simplification routines. Take the most basic simplification as an example as illustrated in FIG. 49, wherein the colorimetric cell will yield a signal of a specified output, say for pq v –p–q. Let p be R, for example 620 nm., let q be Y, for example 575 nm., let –p be C, for example 494 nm., and let –q be B, for example 485 nm. The input p is reflected off mirror 4902 to be combined with the input q with combiner 4904. The input –q is reflected off mirror 4910 to be combined with the input –p with combiner 4912. The combination pq is reflected off mirror 4906 to be combined with the combination –p–q with combiner 4908. The calorimeter 4914 provides an output of p, or in other words R, from input pq v –p–q. The analog of the sigmoid filter in this particular colorimetric application of vector logic is the color filter whose ideal transmission curves are shown in FIG. 50, with 90%+transmission peaks at 485 nm. and 595 nm. It is an OR-gate; there is a signal through the filter iff either p and q or –p and –q. As such, the schema pq v –p–q is logically equivalent to p. YR will represent pq, and BR is pq. The Y and B components cancel, leaving RR or R, which is p.

(v) Polarization Based Processing

The vector logic system also provides for optical AND, NAND, NOT, and the other logical functions, implemented in optical gates in which the input and output are coded directionally in a more purely geometrical form. The implementation does not call for a nonlinear optical material, but instead embodies the vector logical analysis of the AND-function in its developed CNS-form, and well-known optical materials: reflectors or mirrors, beamsplitters, retarders and polarizers.

Each gate, or cell, may comprise of a group of optical elements arranged in three layers. The elements are reflectors, polarizers and retarders. The three layers in each cell represent the conjunctional normal form (CNS-plane), the alternational normal form (ANS), and an intermediate transformational layer (T-plane). The input to each cell is the optical beam (or beams) which enter the cell, from any input direction. The output from each cell is the optical beam (or beams) which leave the cell.

Figure 51:
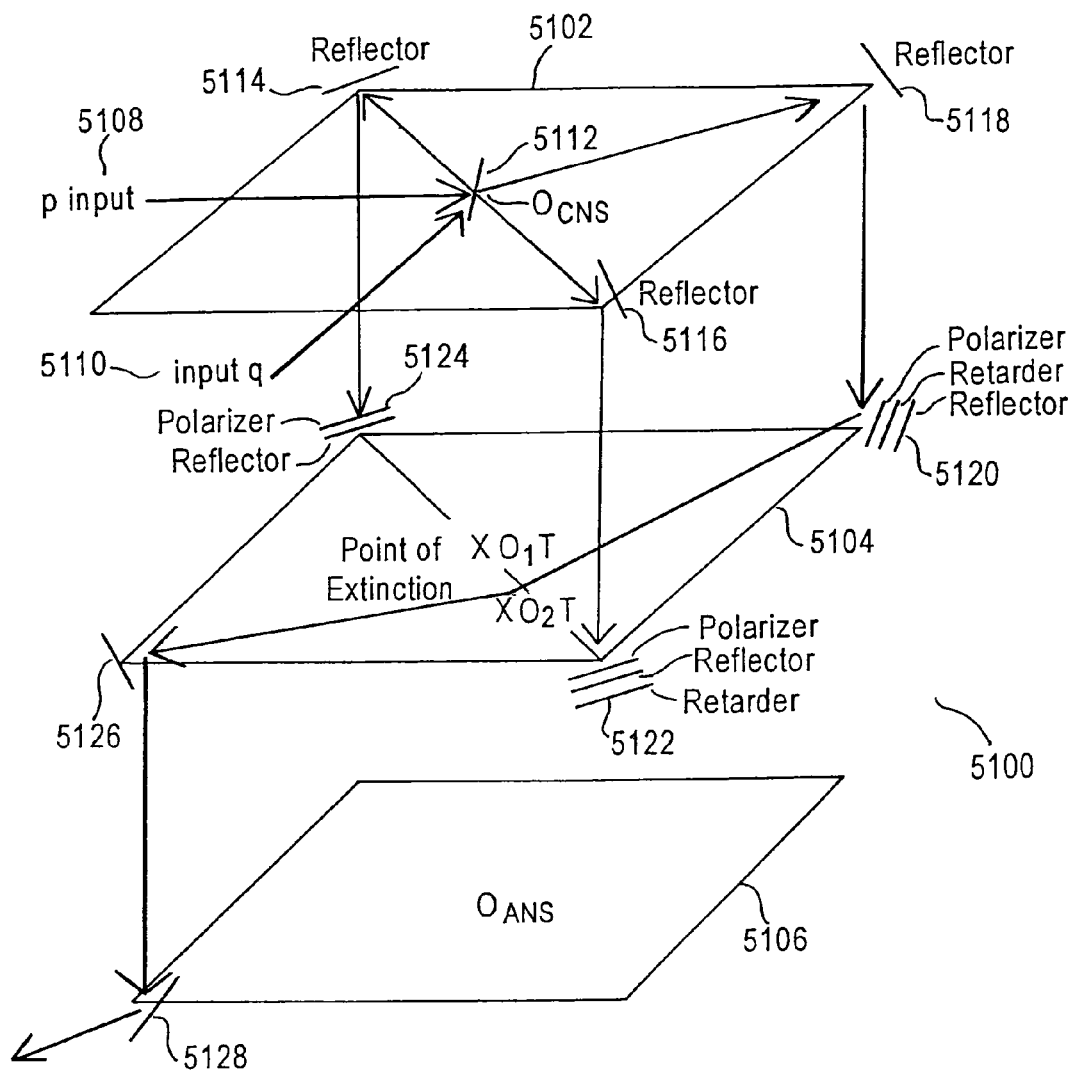
FIG. 51 is a 3-D AND-cell using polarization and vector position for optical computation.

FIG. 51 illustrates an exemplary AND-cell 5100 in accordance with one embodiment of the present invention. Consider the input of p 5108 and q 5110 into the top CNS-plane 5102. A p v q input would occur only on the ANS-plane. The two entry vectors, p and q travel towards the center or origin O-CNS of the cell. At O the p-beam 5108 is split by beam splitter 5112 into two optical components, traveling to the points p v q and p v –q. This is the optical analog of the developed form of p. Pairs of reflectors and polarizers are placed at the corners of the cell, as well as a 180 mµ phase-shifter or retarder in two of the adjacent corners. The q-beam is also split into its developed form by the beam-splitters at O, and directed to –p v q and to p v q.

At this point the three resultant beams (–p v q, p v q, and p v –q) are directed to the center of the T-plane. When the two polarized beams –p v q and p v –q meet at the origin $0_1$T they are extinguished, as they are out of phase by 180°. If the distances from $0_1$T to the vertices of the cell are correctly set, then there will be a local null-value for the output at the points at which the exit vectors emerge from the cell, i.e. at p v –q and –p v q, as well as at $0_1$T. The T-plane also has a second sub-plane on which the p v q and –p v –q beams would meet, with a center at $0_2$T. But in the case of the three beams from p and q inputs, there is no –p v –q beam, and the p v q beam, unextinguished, travels onto the ANS-plane. It continues as the exit vector or output of the ANS-plane in a pq direction: it has become the output pq. At this point the output pq can be reflected as new input to the next cell, and the further outputs arranged in a cascade of cells with the different logic functions. But if the output is negative, it must be entered as negative, –p or –q.

Figure 52:
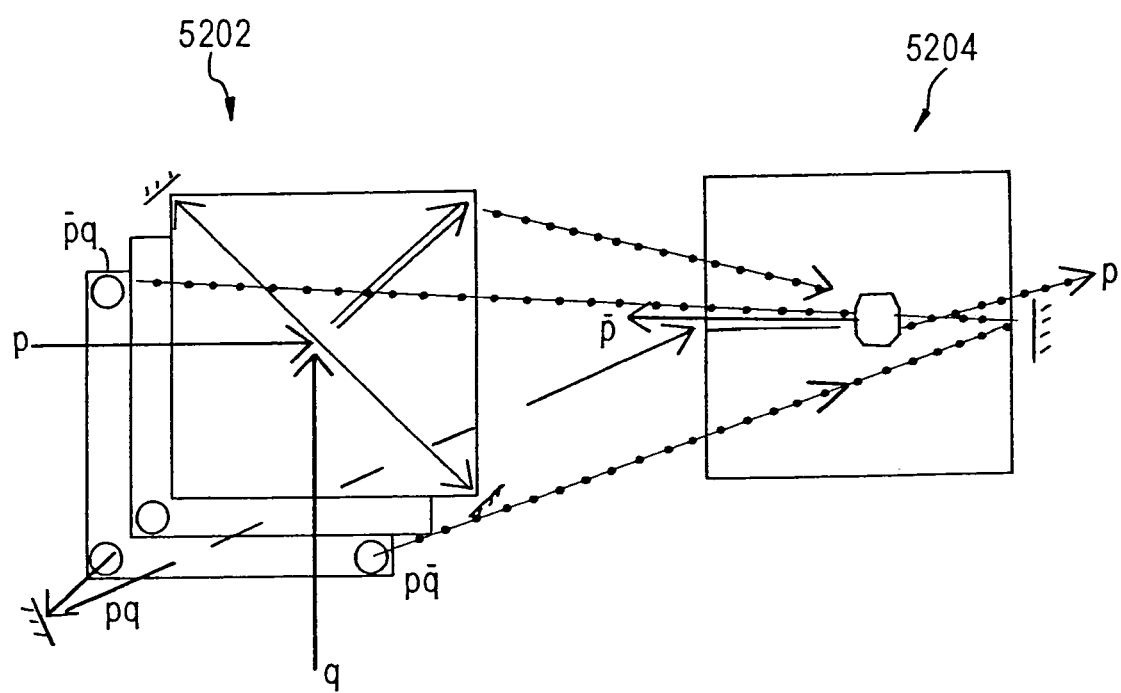
FIG. 52 is the hookup of the device in FIG. 51 to the next input gate.

If for example a combination of inputs is given, which is part of –(pq), i.e. any of –pq or p–q or –p–q, then the exit vectors will be one or more of these conjunctions on the ANS-plane, and this will be routed as negative output. When such a negative output is fed into a NOT-cell 5204, which has the function of inverting all inputs by reflection and routing them to the dual plane, it is output as a positive signal, as illustrated in FIG. 52.

Specifically, when the output of the AND-cell 5202 is input in to the NOT-cell 5204, the final output is –p if pq is input. If p and q are input, –(pq) is "logically" off though optically on as the –p exit vector and p entry vector in the next cell. It is an important feature both of the vector logic system itself given in "Logic as a Vector System" and of the present directional implementation that a negative logic output, –p, say, is optically positive, just as –p is vectorially positive in the sense that there is a directed line segment –p, which happens to point in a reverse p direction. If –p is true then the –p beam is on, though logically negative, as all left-hand or down-tending beams in the CNS-plane are coded negative. An important related feature of the implementation is that input beams are to be set in default negative states such as –p, –q, etc., for the first-level inputs, so that at the onset of computation the inputs to the system are logically off though optically on.

Figure 53:
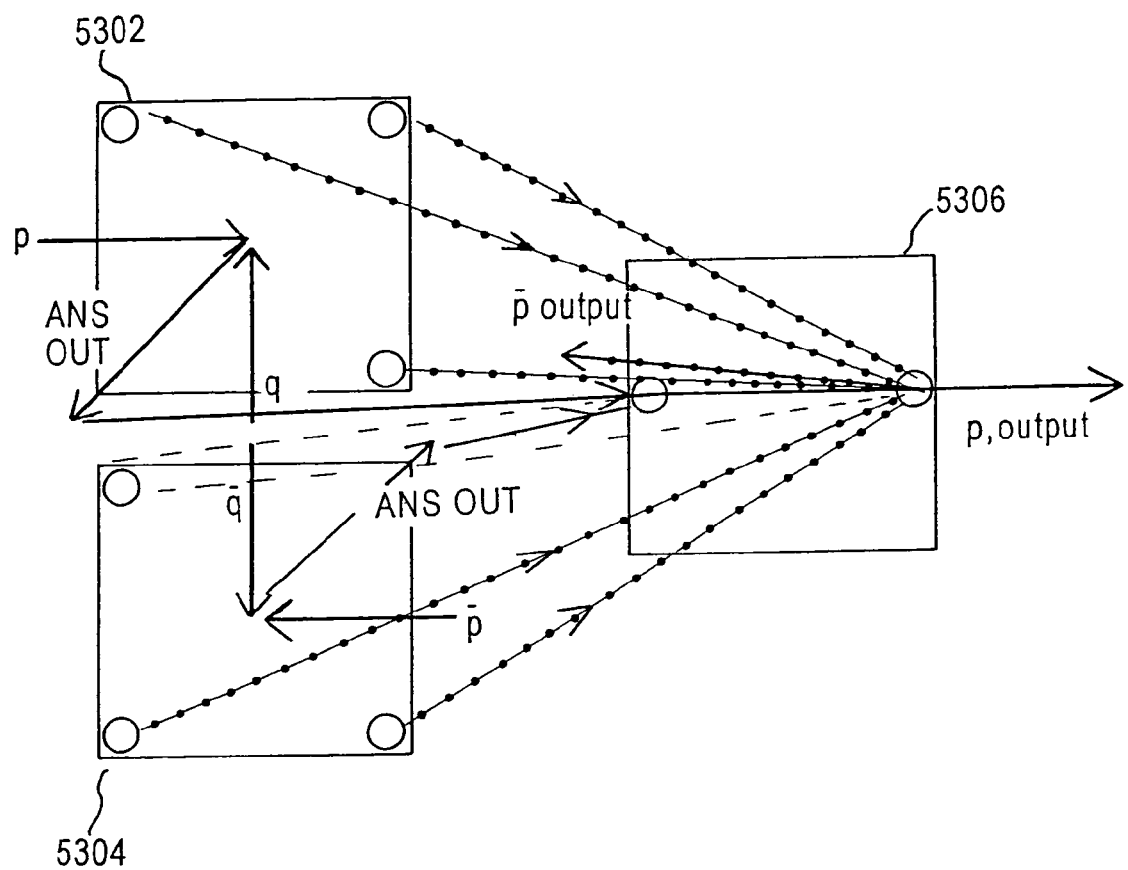
FIG. 53 is a COIN (coincidence) cell based on FIG. 51.

Consider the implementation of the COIN-function or coincidence function, in the cells shown in FIG. 53. The initial off-inputs are –p and –q in both AND-cells 5302 and 5304. Without on-input, the –p–q-cell 5302 gives an output to the OR-cell, while the pq-cell 5304 does not. What happens when the overall input is say p–q? In both the AND-cells at 5302 and 5304, there is no positive output, and hence no positive output in this case for the pq v –p–q cell. The output in the pq-cell is negative, and hence fed to –p in the OR-cell 5306. So the OR-cell 5306 registers a NOT-state if p–q is input into the AND-cells 5302 and 5304. Only at the final output or outputs should the values of the logic and optical positive and negative be caused to coincide, and negative signals be extinguished.

Figure 54:
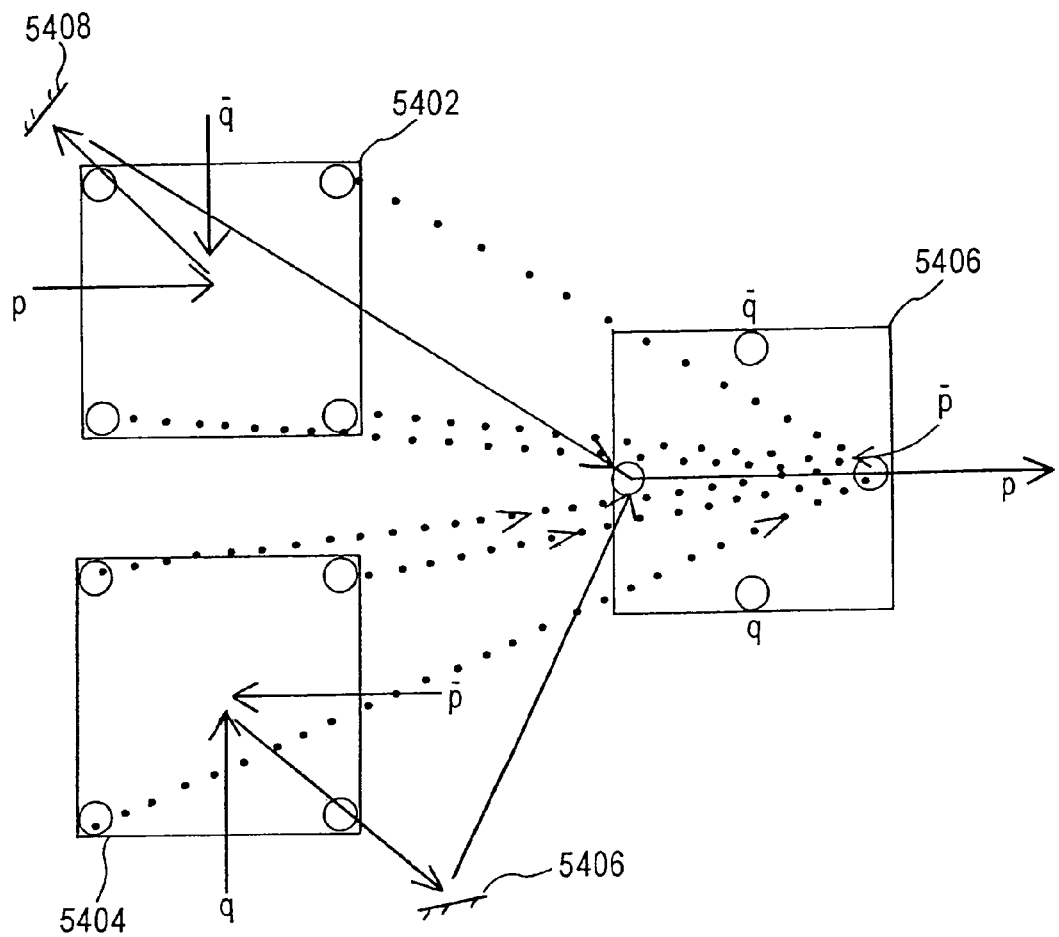
FIG. 54 is a half-added based on FIG. 51.
Figure 55:
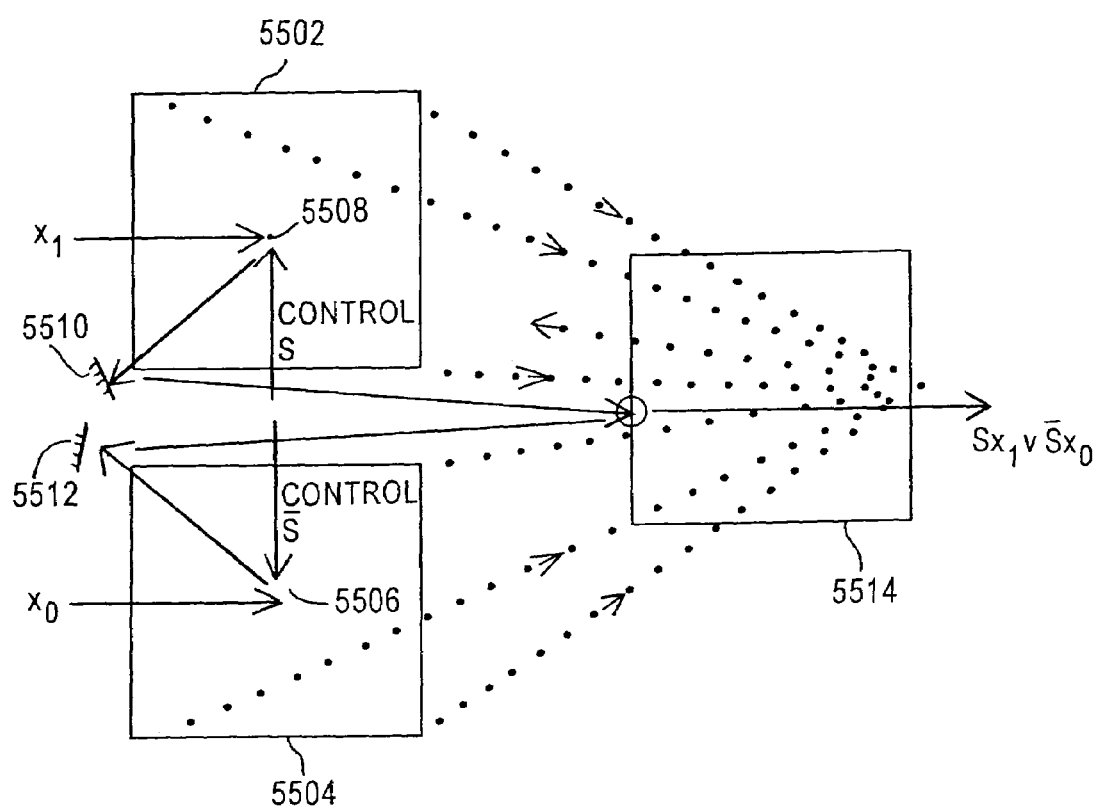
FIG. 55 is a MUX based on FIG. 51.

Precisely the same principles apply in the implementation of the XOR-function, or half-adder FIG. 54 and to the MUX-function or multiplexer FIG. 55.

Figure 56:
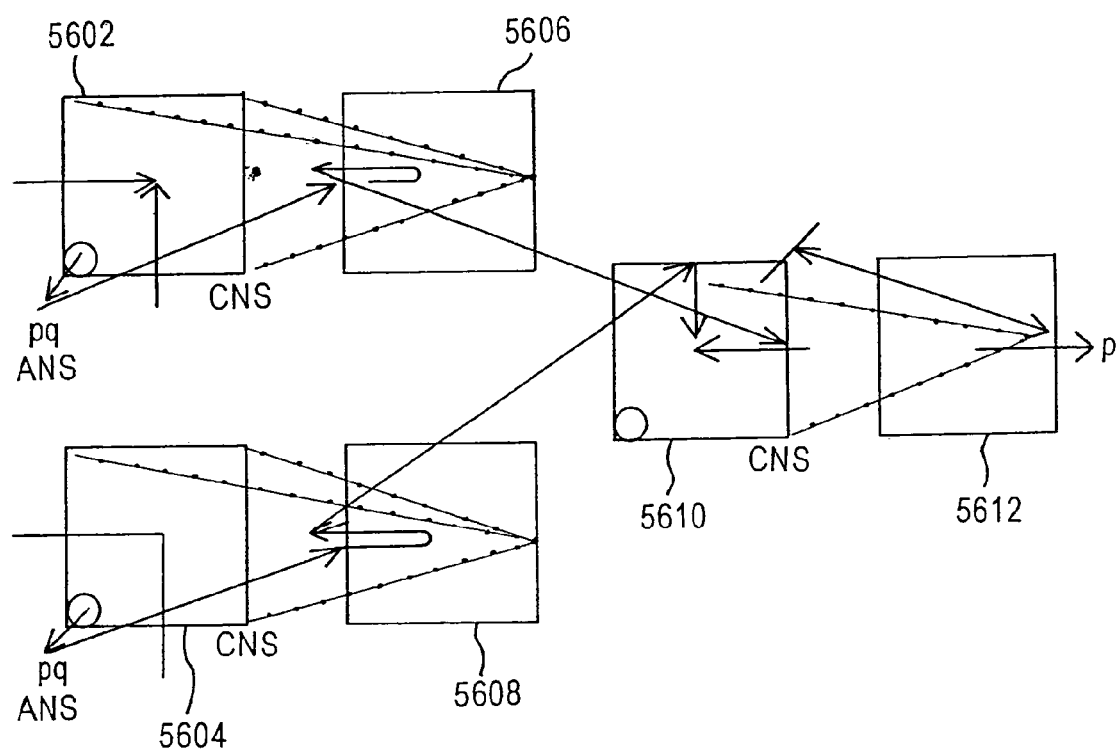
FIG. 56 is a (pNANDq)NAND(pNANDq) gate for p and q input based n FIG. 51.
Figure 57:
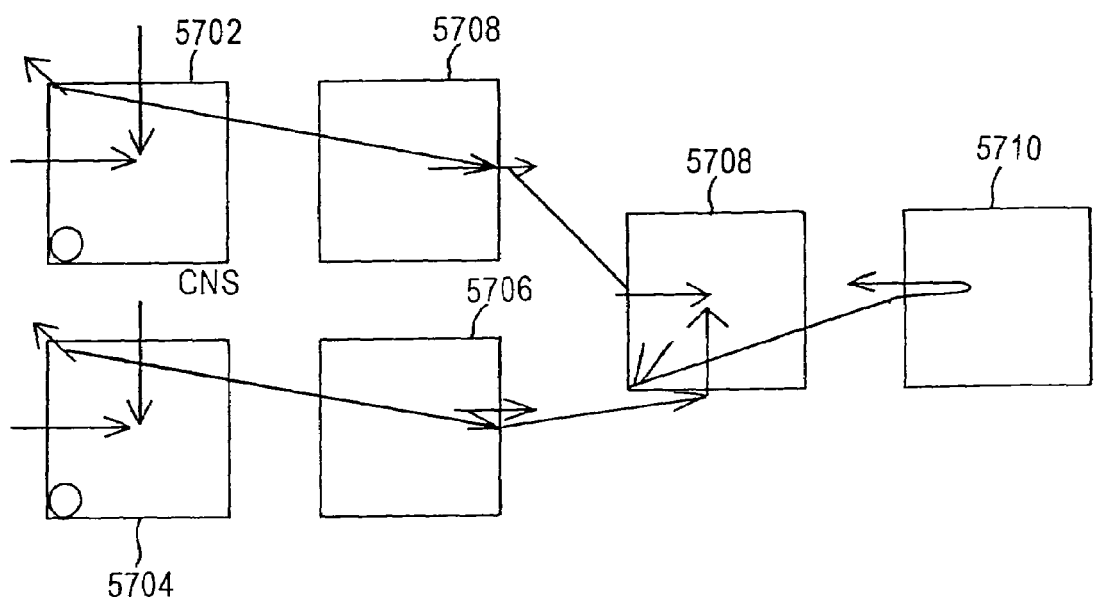
FIG. 57 is the same, for p and –q input.

Finally, to illustrate how cascades of more than one level can be implemented in the optical logic described here, consider how the NAND-function provides a way of saying pq. The following is equivalent to pq: (pNANDq)NAND (pNANDq). What we have to do to create an optical circuit which expresses this function is to build a sequence of two NAND-cells conjoined into another NAND-cell. FIG. 56 shows this sequence for an input of p and q, FIG. 57 for an input of p and −q. This example also shows, of course, that any logical function and any optical integrated circuit can be implemented within the optical logic which has been described.

It is worth emphasizing again that these gates and circuits in the fourth embodiment use only four principles of implementation: beamsplitting; reflection; polarization; and retardation. These are implementations which can be scaled down as far as desirable. There is no scale at which reflection of a stream of light cannot take place, and even at the smallest level photons can be polarized simply by a reflecting surface, as, for example, on a highly polished metallic surface of an automobile. As for retardation, there is a sense in which it does not even need a physical embodiment within the system, as it can be organized by the architecture of the gates involving different path lengths of the corresponding beams.

Figure 58:
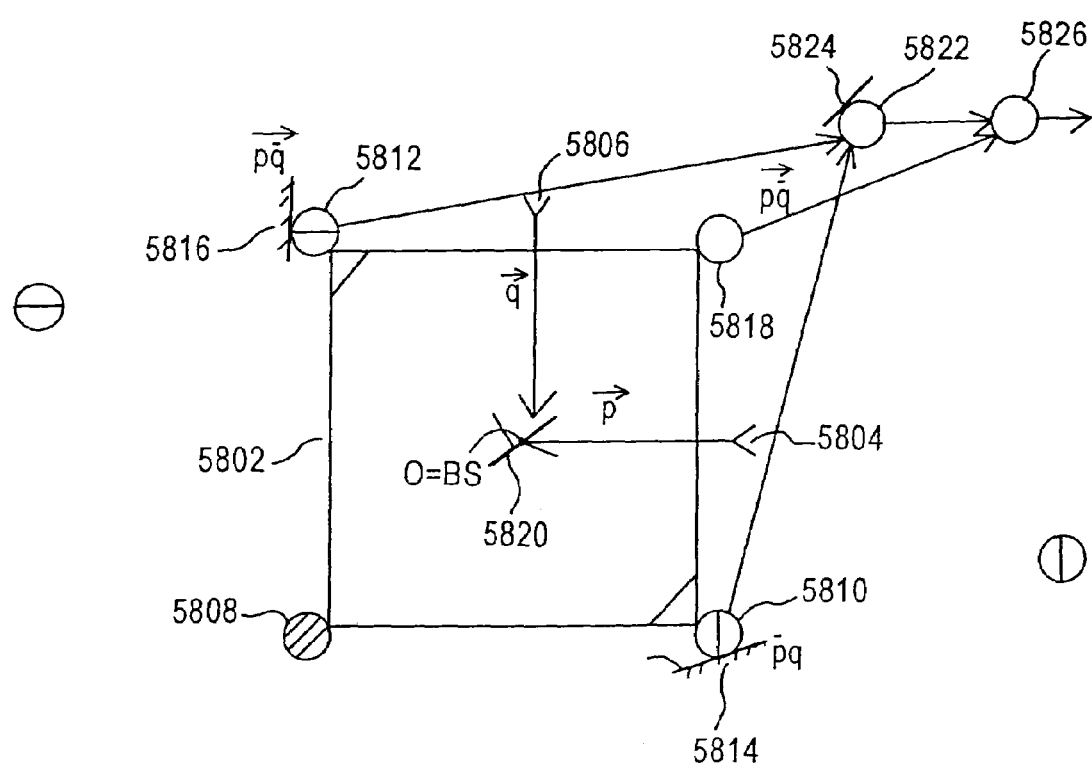
FIG. 58 is an exemplary Polarization NOR-gate.

FIG. 58 depicts an exemplary embodiment of a NOR-gate, or Sheffer-function −(p v q), in accordance with the present invention. In the cell 5802 at the origin, four beam-splitters 5820 break up input from p, q, p̄ and q̄ into vectors exiting as the developed form, so that p, for example, becomes pq̄ v. pq. The exit vectors from the cell are the normal of the (p, q) point coordinates, for example exits at p̄ q̄.

| Exit vector e point positions: | |
| --- | --- |
| p̄q | 7:30 |
| p̄q | 4:30 |
| pq | 11:30 |
| pq | 1:30 |

The exit vector for $\vec{pq}$ is blocked in the nor-cell, represented by the shaded port at p̄q.

(Two orthogonally oriented polarizers are present at the entry to the ports p̄q and p̄q̄

Suppose now inputs in the following pairs of literals:

| a) pq | b) pq̄ | c) p̄q | d) p̄q̄ |
| --- | --- | --- | --- |

Figure 59:
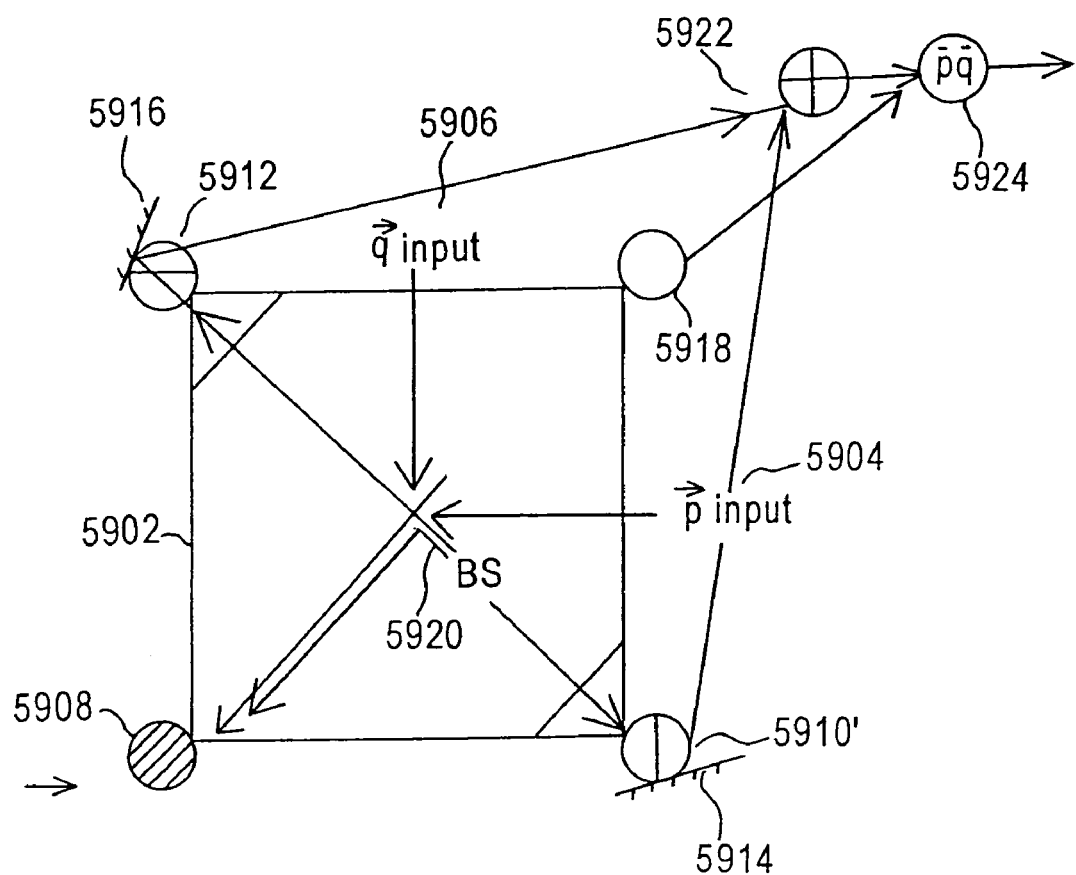
FIG. 59 is an exemplary NOR-gate for –p–q input.

These inputs will explain further features of the cell as well as its overall "↑" function and output. For example as illustrated in FIG. 59.

Figure 60:
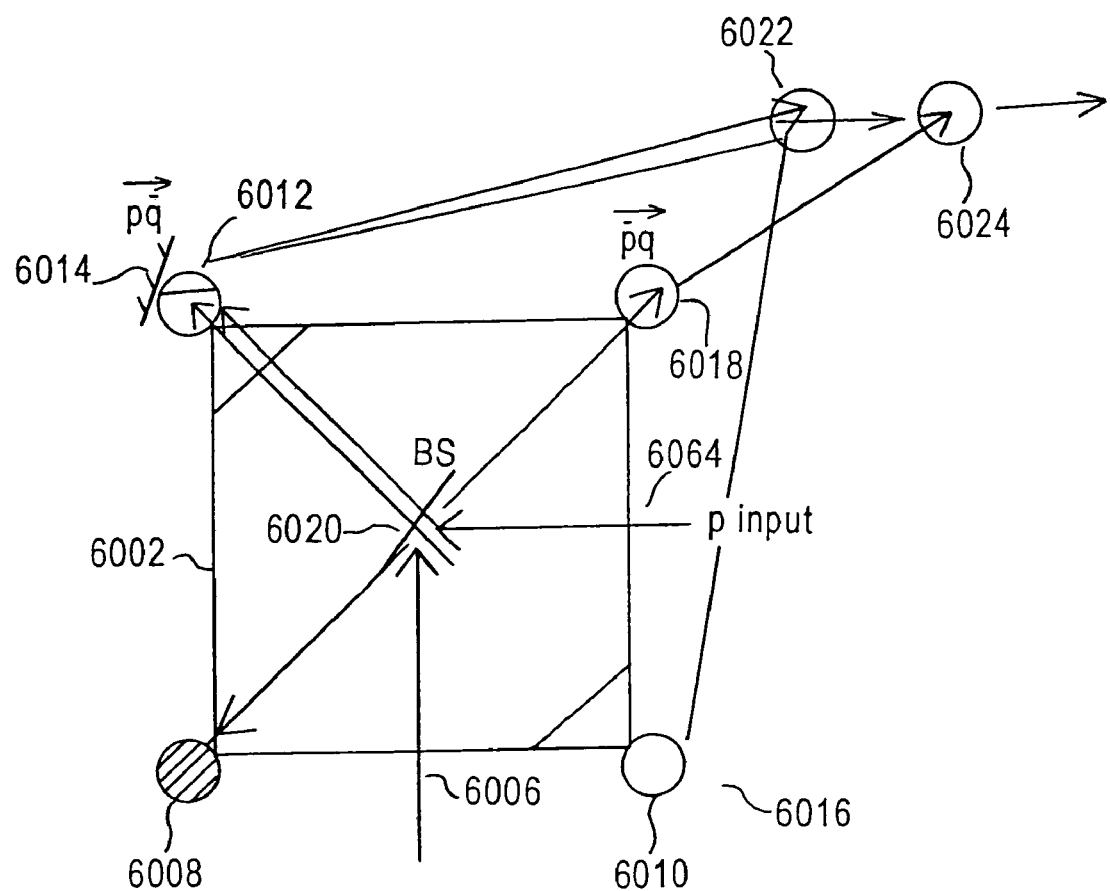
FIG. 60 is the same for p–q input.

The input beams p̄ and q̄ are split at O to p 1 v pq and pq v p̄q̄ respectively. This gives a double beam to p 1, which is Π 1. But the p̄q v pq output port is blocked. At the p̄q̄ and p̄q outputs the two beams are orthogonally polarized, and they are then directed together at $E_x$, the xnor sum at the top right of the cell. (The actual spatial location) of these last ports $E_x$, and $E_f$ is arbitrary.). As there is no output at pq, the final output, here labelled $E_f$, is zero, wherein there is no light, and (p:1, q:1=0).

b) pq̄—Take next the input (p, 1), as in FIG. 60.

The input beams p̄ and q̄ are split at O to pq v. pq̄→and pq̄ v p̄q̄→respectively. The pq→ output is blocked as before, but it is only 25% of the total output, which is itself twice the input. The pq̄→output is polarized at zero°, but there is no pq̄→output, so that $E_x$ is on, and since p̄q̄→is on, so is $E_f$, consequently (p=1, 1:1,=1). So far we have:

| pq | pq; |
| --- | --- |
| 1 1 | 0 |
| 1 0 | |
| c) | Π̄q |

Figure 61:
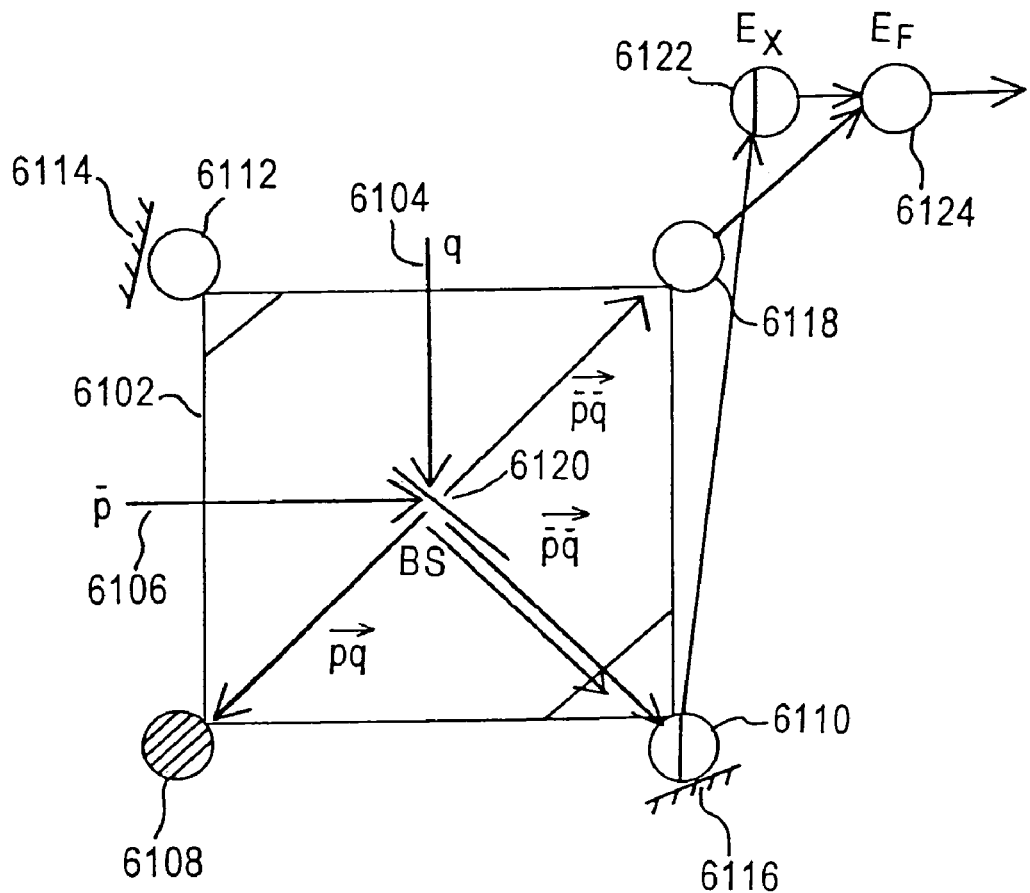
FIG. 61 is the same for –pq input.

In FIG. 61, the input is (p̄q). The input beams p q̄→are split at O to give developed pq v. pq→and pq v. pq→respectively. The double p̄q beam is polarized and reflected to $E_x$ and thence to $E_f$ as there is no orthogonally polarized p q→output at p̄q. The pq→output is blocked, as before, but $E_f$=1, even without the contribution of p q→

Figure 62:
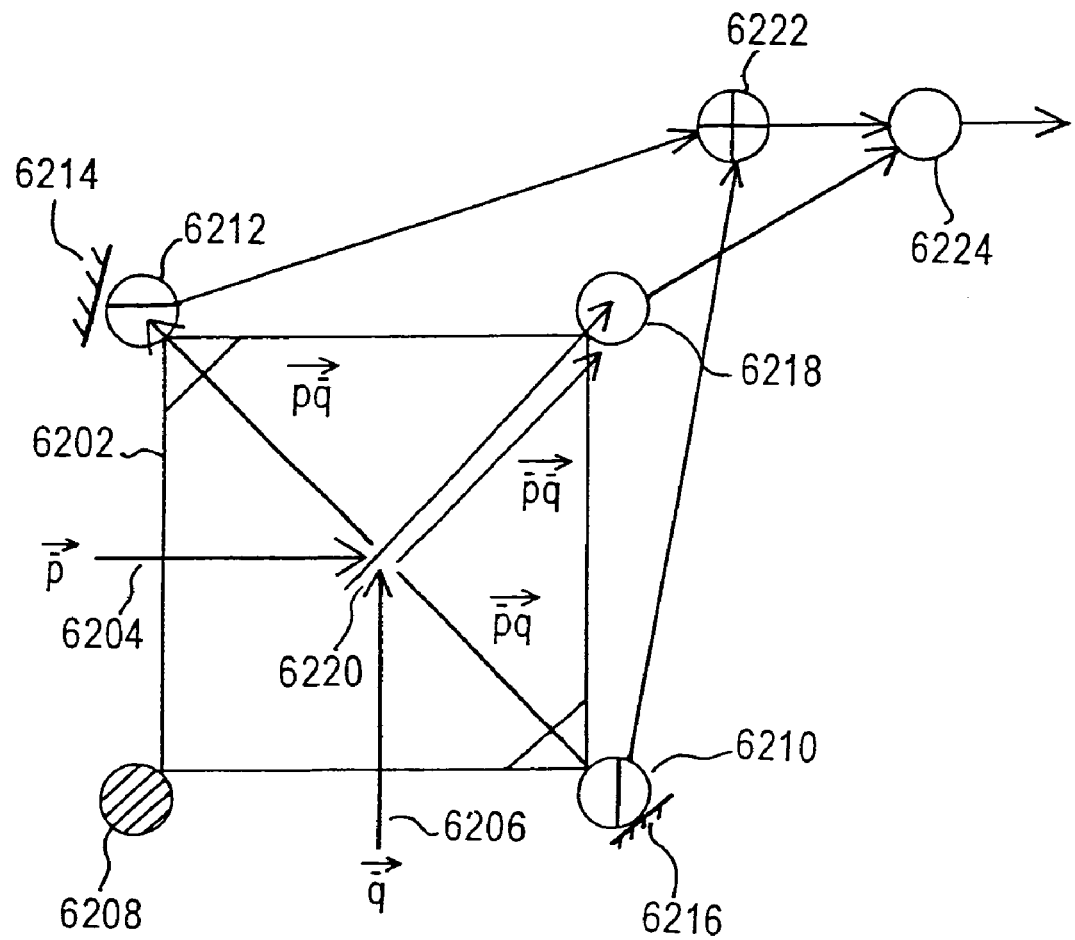
FIG. 62 is the same for –p–q input.

We now have for the cell at $E_f$:

| pq | pq; |
| --- | --- |
| 1 1 | 0 |
| 1 0 | 1 |
| 0 1 | 1 | d) Turning finally to input (p̄q̄), as in FIG. 62, the logical pattern is similar. The $E_x$ or XNOR-function is extinguished, but the double p q→component brings the sum to 1 at $E_f$. The block at (p̄q̄) is unnecessary as there is no pq→components at this exit port.

The result overall is p↑q for the cell is:

| pq | pq |
| --- | --- |
| 11 | 0 |
| 10 | 1 |
| 01 | 1 |
| 00 | 1 |

Furthermore, exploiting the geometrical nature of the light beams in a matrix around the origin rather than in an optically bistable physical medium, is conceived as functioning like a silicon plate in a semiconductor chip.

The basic cell concept here described is complete, and can by itself be used to construct cascades of other functions in a gate sequence. But in addition, we can exploit the concepts to devise any other logic function, most importantly p↓q the NAND or Pierce function in the dual CNS-space or vector sub-space. These cells are all-optical and can be put together to implement the logic functions of decoders, multiplexers, adders, and the rest, including of course, router switches.

(vi) Polarization Based Processing with a Dualization/Polarization Corridor

There is another way to implement the vector logic system using polarization which does away with the potential traffic jam at the center of the AND-cell. Let us take once again AND-function, and consider two inputs, p and q, which enter the AND-cell shown in FIG. 63.

At each literal (p, −p, q, −q) of the input plane cell there is a beam-splitter will have the effect of dividing the p and q beams into two beams each. These two beams will represent p v q and p v−q, for p, and p v q and −p v q, for q. The logical equivalent of "p and q" using the "or" function is the so-called developed conjunctional normal form "(p v q) and (p v −q) and (−p v q)", as can be seen from the truth-table in FIG. 64. What has happened is that optically, using the vector logic representation, we have modeled this form. The same would happen with other literal inputs −p and −q.

The next step is to realize something interesting and important about the developed conjunctional normal form. If we take the first conjunct, in this case p v q, we can arrive at the proposition "p and q" by changing the "or" to an "and", and dropping the other two conjuncts. But what we can notice here about the other two conjuncts is that they are opposed vectors in the vector logic space: they are p v −q and −p v q. This rule applies no matter how large the conjunction is. Say it's −p and q and r", an 8-line table. Then we can take the rather large developed conjunctional normal form, note that the conjunction has T on every line of the truth-table except the last, and that the remaining 2 to the Nth minus 2 rows (6 of them) are opposed in vector space. Examining the truth-table in Diagram 2, we can see that any conjunction of no matter what length can be expressed by deleting the vector opposed (or technically S-opposed) rows, in this case Rows 2 and 3), and converting the main operator (or) into its dual. It is as if one had said that if the S-opposed values are deleted, then the derived values for pq and p v q are the same, and p v q is pq!

An optical analog of this is a polarization cancellation of one beam by another. Imagine that the three beam groups we have in the cell on the CNS-plane ((p v q)(p v −q)(−p v q)) are now reflected and, at the entrance to the polarization corridor, polarized orthogonally with respect to one another, in such a way that the opposed vectors in the CNS-plane cancel, for example p v q and −p v −q, or p v −q and −p v q. We have the extinction at a point at which the two "logically opposed" beams are incident. We can tag the exit vector at 1:30 in the exit plane in Diagram 1 pg, and we can enter it into other cells as an input, p or q or whatever. Thus we have a cascade, as before in (iv), and the general structures of these cascaded cells are the same.

Figure 63:
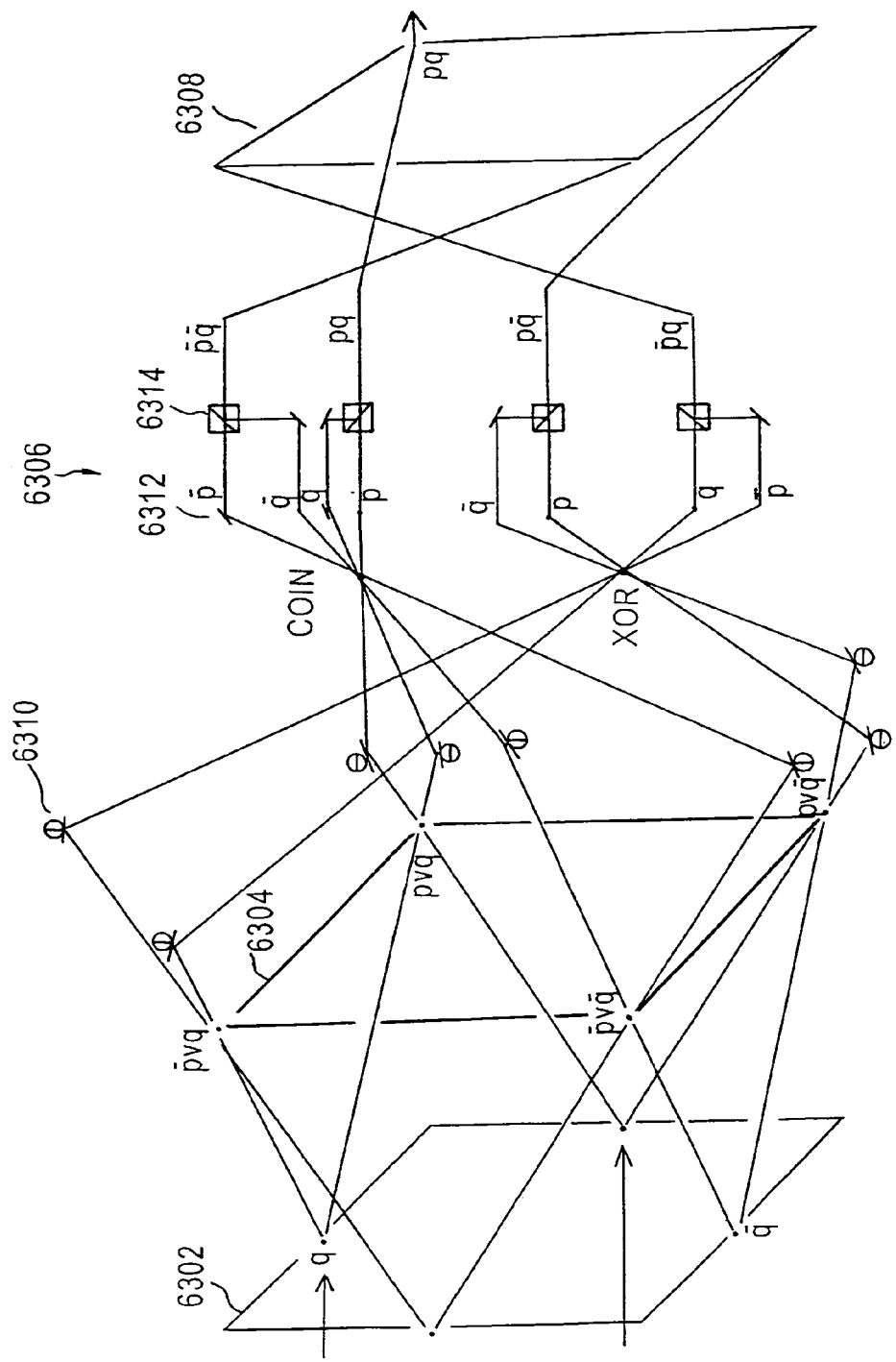
FIG. 63 is the schematic for a wholly conservative logic polarization corridor for the AND-function.

FIG. 63 also shows how the beams in the dualization or polarization corridor are to be managed to as to drop Operator S-opposed disjuncts of conjunctions. (Conjunctions of disjunctions with opposite literal values are Operator S-opposed, disjunctions of conjunction are Operator N-opposed.). When p and q are entered on the input plane, in the lower four lines of polarization corridor (representing the XOR-function) we get p from p v −q and −p from −p v q. But these are orthogonally polarized and cancel. In the upper four lines of the polarization corridor representing pq and −p−q, the so-called COIN-function for (COINcidence), the p and q beams have the same plane of polarization and so do not cancel one another. The polarizations governing the XOR-function in the bottom for lines of the dualization corridor ensure that the extraneous non-AND elements of the conjunctive normal form expansion for any coincident conjunction are extinguished, and the COINfunction dos the same for the non-coincident conjunctions such as p and −q.

Figure 65:
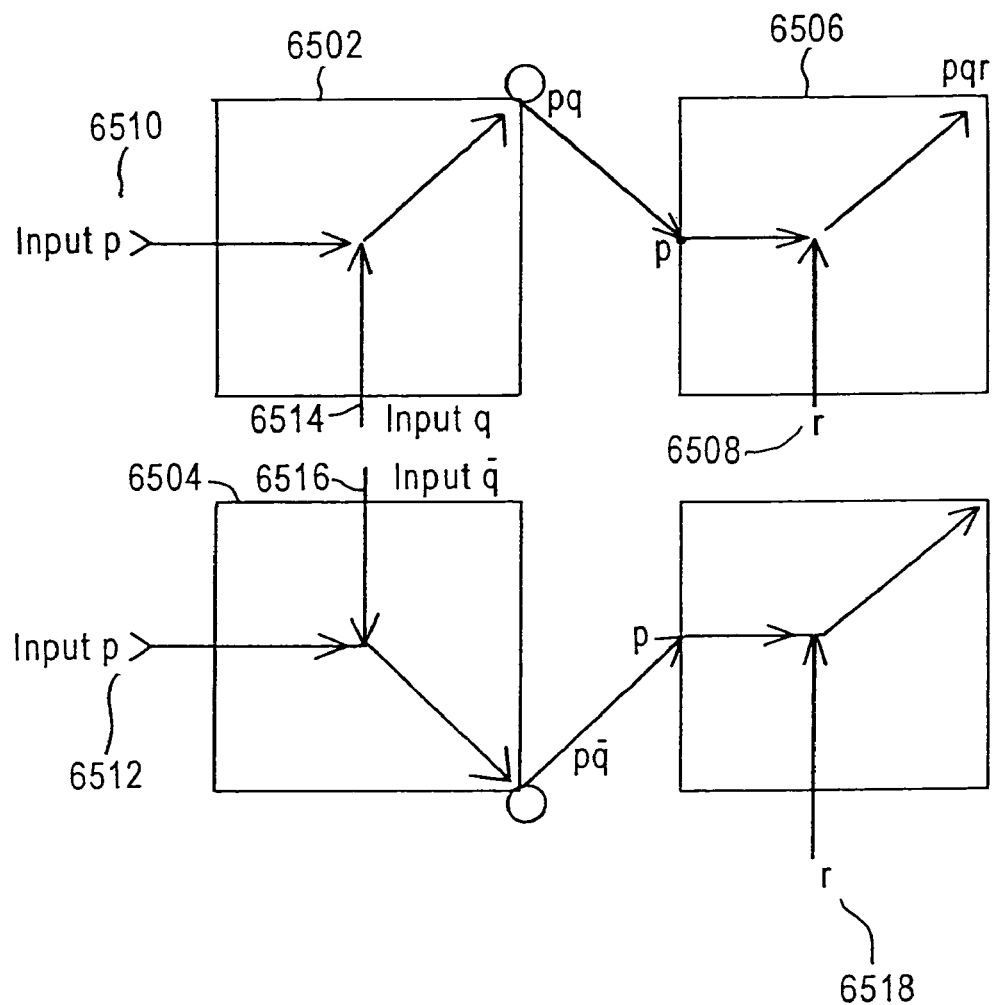
FIG. 65 is a MUX using the principle of FIG. 63.

FIG. 65 shows an all-optical data distributor, decoder or DMUX (logical demultiplexer), with a message r being delivered to Alice, at address pq, or to Bob, at p−q.

Figure 66:
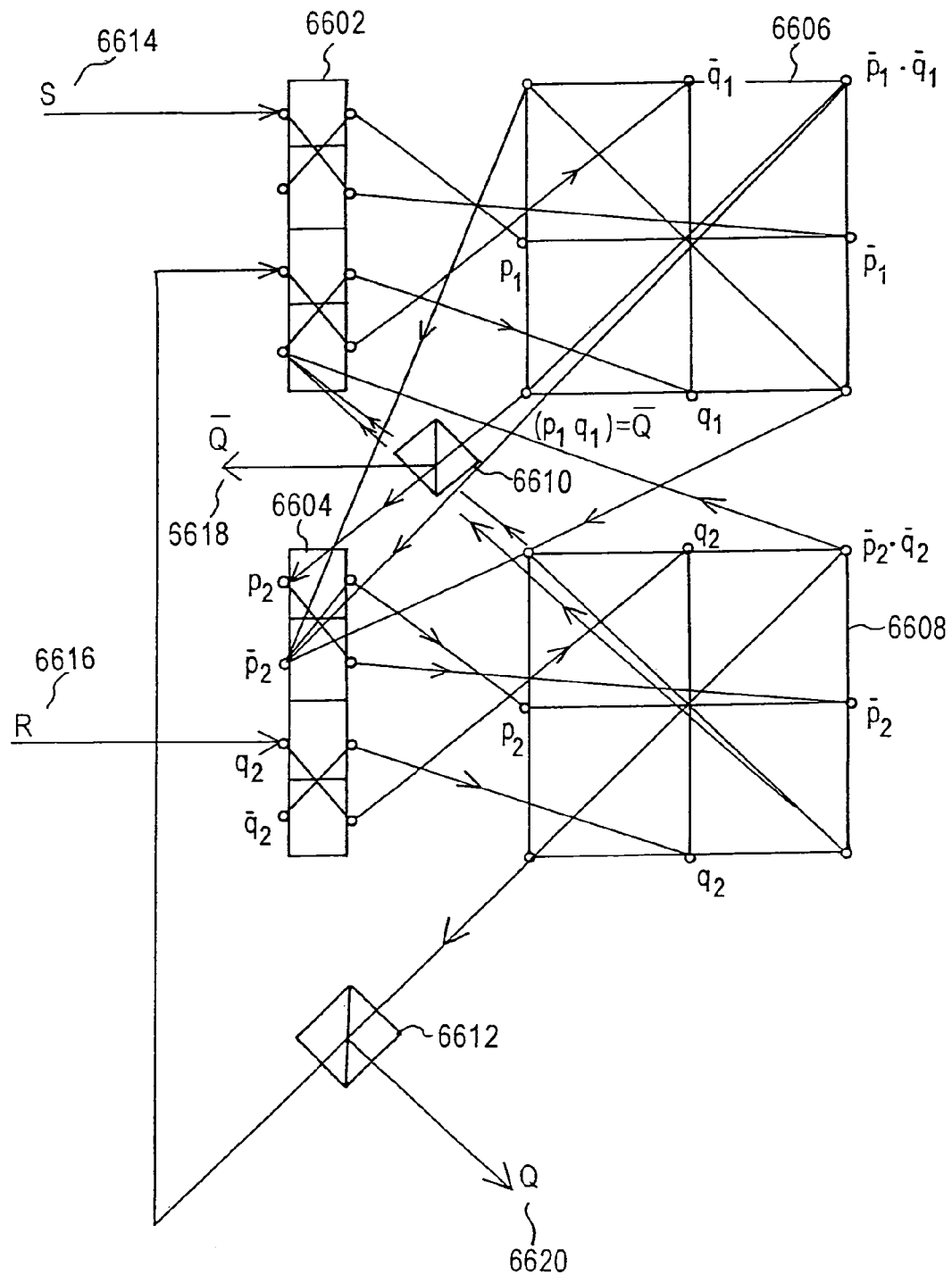
FIG. 66 is a flip-flop for all possible paths using the principles of FIG. 63.

FIG. 66 shows a latching function for a simple set-reset flip-flop for all the possible optical paths. Here it is important to note that even when the unit is logically off, optically it is on, and this is how the stored "set" value Q is held. In this way optical storage is achieved using the AND-function within the NOR-function version of the SR flip-flop.

Figure 67:
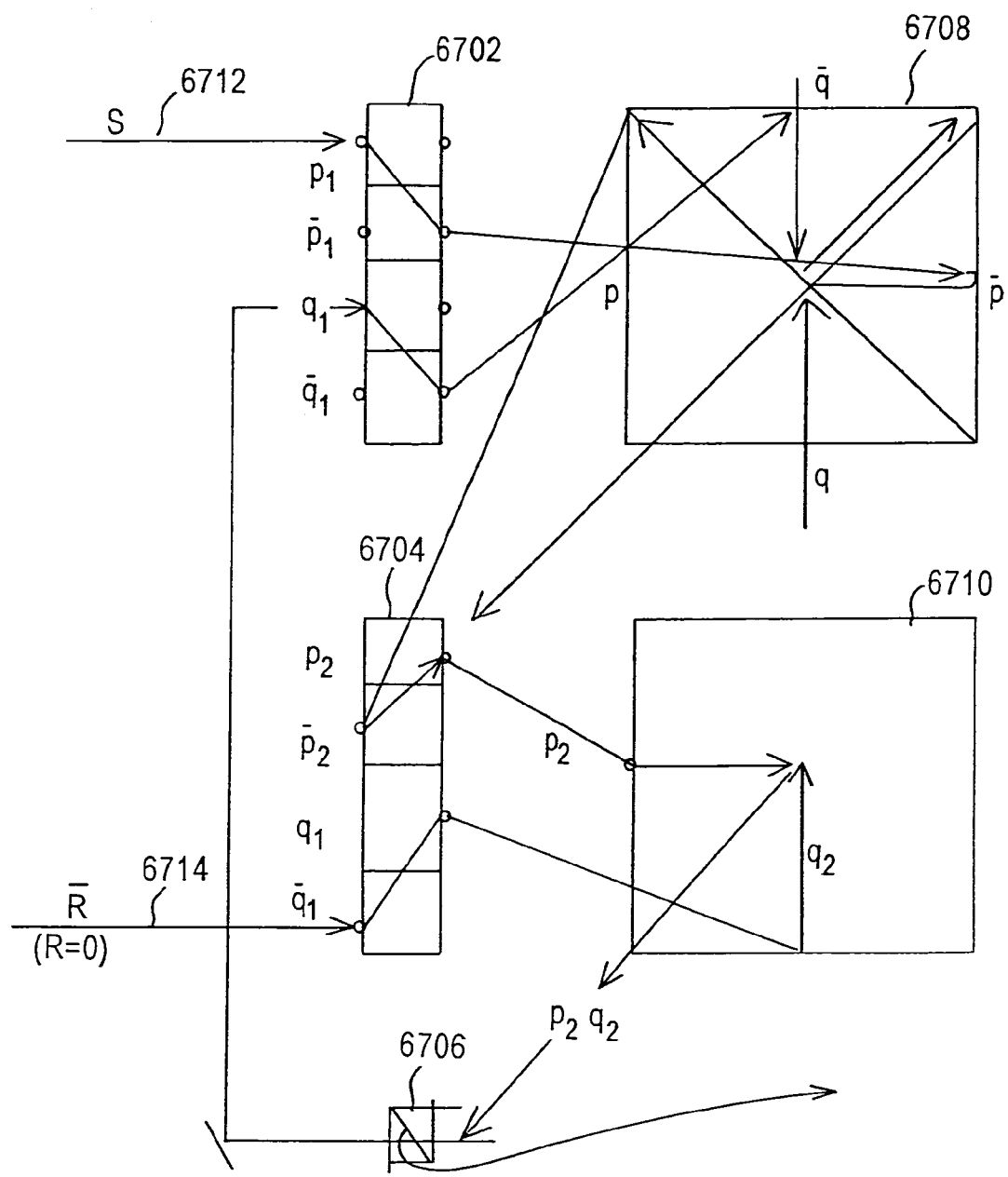
FIG. 67 is the same, for S=1, R=0, present Q=1.

FIG. 67 shows the same flip-flop for values S=1, R=O, present Q=1, for a new Q or output of 1.

In conclusion, consider four interesting features of the optical system. Interesting Feature A is that in the vector logic system there is a sense in which reverse vectors are both positive. In the implementation we see that both p and −p for example are equally real optically. So logic negative is not optical negative. Of course at the end of the desired computation, the SR flip-flop-function for example, we take account of the positive output, and ignore the negative output. At this point optical positive and logic positive will coincide. This feature is important for the flip-flop, as the light for the latched value comes from the optically positive signal even when that value is negative.

Interesting Feature B is connected with this. It is that when data is entered into the system, say p and −q, then that will be a matter of killing off the −p beam and killing off the q-beam. We must imagine that initially all the beams are optically on, and that we select our input by removing the beam in the opposite direction. Or if you like we can imagine that at the outset the default state is one in which the −p beam and the −q beam are on, and that they stay on unless redirected.

Interesting Feature C is that for any function built out of the AND and the NAND-functions if the input power of the variables such as p and q is 1, then the output is 1, leaving aside operating losses from imperfect polarization extinction ratios, losses on reflection and so forth.

Interesting Feature D is perhaps the most important. The polarization based-implementations are clearly reversible, in the sense that no information is destroyed anywhere in the system. What the vector logic implementation does is to move information around, without destroying any physically, and to selectively use the output. In the case of a NAND-cell, for example, the negative outputs are fed as parallel beams into the positive input of the next cell. They are as close together as is necessary for the next stage of processing, but they are distinct beams. Any input into a cascade is recoverable from the output, and information is conserved.

Can the implementation of the present system be reconciled with the character of the information in the bitstream emerging from a fiber optic cable? That is, is an OEO-conversion required before information in the bitstream can undergo logical processing with the vector logic system in the implementations described in (iv) and here in (v)? The answer is that the mode of the signal of the fiber can be made to encode spatial information, at least over relatively short distances, even after enormous twisting and even knotting of the cable. An initial calibration can be used to determine the exit vectors of the p and q variables at the end of the fiber.

Figure 68:
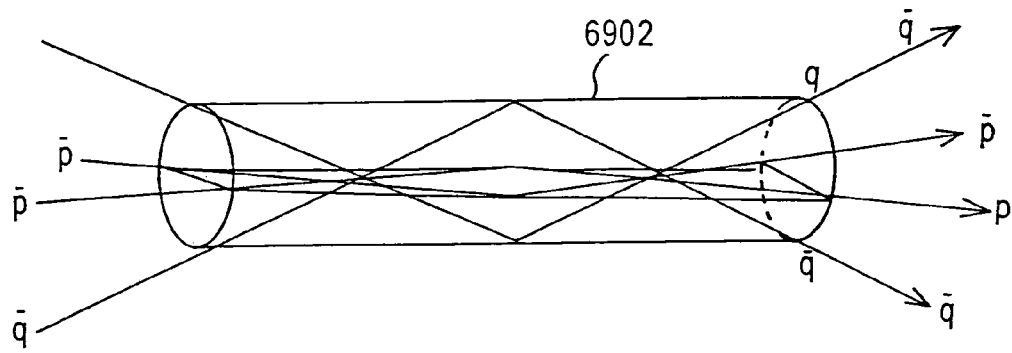
FIG. 68 is a spatial path-coding for p, q, –p, –q in the propagation of rays through a short fiber.

FIG. 68 shows the coding of p, q, −p and −q in the propagation of light rays through a short piece of fiber. For the correct length the input will match the output. So the with this method of coding the spatially or vector coded information can be introduced directly into a processing unit composed of the optical AND, NAND and other gates described.

Figure 69:
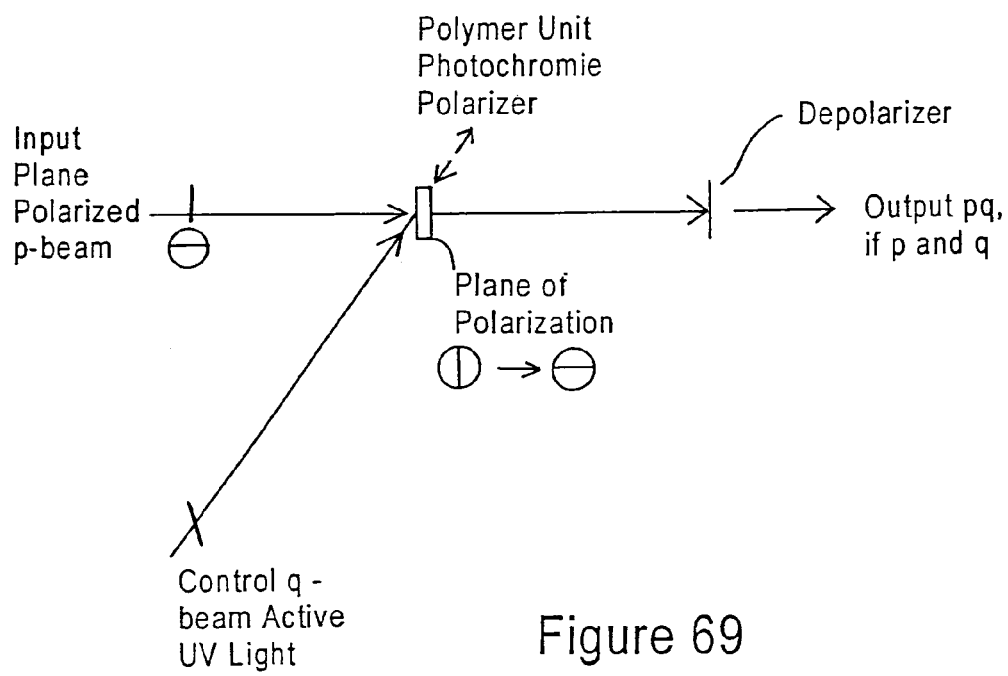
FIG. 69 illustrates an optical AND gate and switching device using polarization photochromism.

FIG. 69 illustrates an optical AND gate and switching device using polarization photochromism. The AND-gate described in FIG. 69 is a switch having an optical output in a selected direction of 1 iff (if and only if) the inputs from the incident beams, here called the p- and q-beams, are both 1. The pq-beam (p and q) is on iff the p-beam is on and the q-beam is on. This is achieved by using: a polarization photochromic with a given plane of polarization as the so-called "switching medium"; a q-beam has a control signal which shifts the polarization plane of the switching medium ninety degrees; and a p-beam whose plane of polarization is orthogonal to the original plane of polarization of the switching medium. When the q-beam is off, the p-beam suffers extinction in the switching medium. But the q-beam is directed at an angle which is not the output direction. The result is a genuine optical AND-gate which can be used in switching and processing applications.

The AND-function is basic for the other more complex logical functions necessary in high-speed photonic signal systems in telecommunications and computational applications generally. This has been the source of the great interest taken recently in optically bistable devices and materials. Yet optical materials seem intrinsically unsuited to the production of bistable state, unlike their analogs in semiconductor technology. However, the polarization photochromics are an exception, as they are materials which do exhibit the demand characteristics, in the given configuration. These characteristics are given in the truth-table:

| pq | pq |
|----|----|
| 11 | 1  |
| 10 | 0  |
| 01 | 0  |
| 00 | 0  |

More complex optical switches such as multiplexers and demultiplexers, which are themselves logical functions of input or switches can therefore be constructed. It is commonly recognized that the changes in the absorption profiles of photochromic polymers generally have optoelectronic, optical storage and logic-switching applications, but the uniqueness of the present invention is that it shows how the latter can be made specifically with the polarizing photochromics.

The heart of the optical AND-gate or switch described here (FIG. 1), which is entirely novel and for which there is no prior art, is a switching medium fabricated of a material such as but not limited to the liquid crystalline line polymers listed by Ichimura, described in the background of the invention, above, which display the required photochromism with respect to polarization In FIG. 69, the p-beam is directed towards the output through the switching medium, and is in a polarization state orthogonal to that of the polymer. It therefore suffers extinction at the surface of the polymer unit.

The q-beam acts as an angle to the p-beam. It consists of polarized actinic or UV light. It therefore induces a 90-degree photochromic change in the angle of polarization or polarization sate of the switching medium. The q-beam is arranged to strike the polymer cell before the p-beam e.g. lengthening the path of the q-beam relative to the p-beam. It reorients the plane of polarization of the polymer unit prior to the arrival of the p-beam. The result is that the unit now blocks the p-beam.

It is still true, as Norbert Streibl et. al. ("Digital Optics", (1989)) pointed out, the 'A uniform technology for digital optical information processing, comparable in its significance to microelectronics, does not yet exist and is by itself a challenging research goal.' A vector logic for optics is a source from which such a "uniform" technology can flow, just as electronics derived from the natural isomorphism of electric circuitry and truth-functional logic.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

Although certain specific embodiments of the present invention have been disclosed, it is noted that the present invention may be embodied in other forms without departing from the spirit or essential characteristics thereof. The present embodiments are therefore to be considered in all respects as illustrative and not restrictive, the scope of the invention being indicated by the appended claims, and all changes that come within the meaning and range of equivalency of the claims are therefore intended to be embraced therein.

What is claimed is:

1. An optical NAND-gate comprising:
    first, second, third, fourth, fifth, and sixth optical inputs;
    first, second, third, fourth, fifth, and sixth optical outputs;
    first and second optical paths leading from said first and second respective optical inputs to said first optical output;
    third and fourth optical paths leading from said third and fourth respective optical inputs to said second optical output;
    fifth and sixth optical paths leading from said fifth and sixth respective optical inputs to said third optical output; intensity filters located within each of said first, second, third, fourth, fifth, and sixth optical paths;
    a first optical filter having a sigmoid characteristic located at a position common to both said first and said second optical paths;
    a second optical filter having a sigmoid characteristic located at a position common to both said third and said fourth optical paths; and
    a third optical filter having a sigmoid characteristic located at a position common to both said fifth and said sixth optical paths;
    wherein said fourth, fifth, and sixth optical outputs from said respective first, second, and third optical filters having a sigmoid characteristic being in communication with a fourth optical filter having a sigmoid characteristic.

* * * * *